(12) United States Patent
Zeiler et al.

(10) Patent No.: US 7,659,696 B2
(45) Date of Patent: Feb. 9, 2010

(54) BATTERY CHARGER AND ASSEMBLY

(75) Inventors: Jeffrey M. Zeiler, Delafield, WI (US);
Todd W. Johnson, Wauwatosa, WI (US);
David J. Rozwadowski, Greenfield, WI (US);
Kevin L. Glasgow, Lomira, WI (US);
George L. Santana, Jr., New Berlin, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 18 days.

(21) Appl. No.: 11/877,387

(22) Filed: Oct. 23, 2007

(65) Prior Publication Data
US 2008/0036420 A1 Feb. 14, 2008

Related U.S. Application Data

(62) Division of application No. 10/840,703, filed on May 6, 2004, now abandoned.

(60) Provisional application No. 60/468,556, filed on May 7, 2003.

(51) Int. Cl.
*H02J 7/00* (2006.01)

(52) U.S. Cl. ................ 320/115; 320/107; 320/113; D13/107

(58) Field of Classification Search .......... 320/107, 320/110–115
See application file for complete search history.

(56) References Cited

U.S. PATENT DOCUMENTS 2,266,686 A 12/1941 Emanuel
3,579,075 A 5/1971 Floyd
3,950,688 A * 4/1976 Sancey et al. .......... 320/114

(Continued)

FOREIGN PATENT DOCUMENTS

DE 3734120 4/1989

(Continued)

OTHER PUBLICATIONS

PBS 3000 Battery Tools 7.2/9.6 volt (1999).

*Primary Examiner*—Patrick J Assouad
*Assistant Examiner*—Richard V Muralidar
(74) *Attorney, Agent, or Firm*—Michael Best & Friedrich LLP

(57) ABSTRACT

Battery chargers and combinations. In some aspects and in some constructions, the invention may provide a combination including a battery charger having a housing and a charging circuit, and protective structure separate from and connectable with the battery charger. The protective structure, when connected, extending from the housing beyond a battery connected to the battery charger. In some aspects and in some constructions, the invention may also provide a combination including a first battery charger, a second battery charger and a connecting structure operable to connect the first battery charger and the second battery charger as a unit. In some aspects and in some constructions, the invention may further provide a combination including a battery charger and a handle separate from and connectable with the battery charger. In addition, in some aspects and in some constructions, the invention may provide a battery charger including a housing having a base and an upper portion opposite the base. A height is defined between the base and the upper portion and the base having a width less than or equal to the height.

16 Claims, 73 Drawing Sheets

U.S. PATENT DOCUMENTS

| | | | |
|---|---|---|---|
| 4,009,429 A | 2/1977 | Mullersman | |
| 4,211,968 A | 7/1980 | Sugalski | |
| 4,229,686 A | 10/1980 | Mullersman et al. | |
| 4,237,409 A * | 12/1980 | Sugalski | 320/107 |
| 4,288,733 A | 9/1981 | Bilanceri et al. | |
| 4,315,364 A | 2/1982 | Leffingwell | |
| 4,612,491 A | 9/1986 | McCarty et al. | |
| 4,629,962 A | 12/1986 | Arakawa | |
| 4,639,655 A | 1/1987 | Westhaver et al. | |
| 4,641,076 A | 2/1987 | Linden | |
| 4,641,077 A | 2/1987 | Pascaloff | |
| 4,716,352 A | 12/1987 | Hurn | |
| D298,119 S | 10/1988 | Richards et al. | |
| 4,997,731 A | 3/1991 | Machida et al. | |
| 5,028,859 A | 7/1991 | Johnson et al. | |
| 5,039,929 A | 8/1991 | Veistroffer et al. | |
| D327,669 S | 7/1992 | Sakamoto et al. | |
| 5,144,217 A | 9/1992 | Gardner et al. | |
| 5,191,276 A | 3/1993 | Zainalcain | |
| 5,192,904 A | 3/1993 | Leiserson | |
| 5,206,576 A | 4/1993 | Jasinski | |
| 5,280,229 A | 1/1994 | Faude et al. | |
| 5,287,013 A | 2/1994 | Adair | |
| D348,461 S | 7/1994 | Peersmann | |
| D348,649 S | 7/1994 | Richards et al. | |
| 5,366,827 A * | 11/1994 | Belanger et al. | 429/99 |
| D355,887 S | 2/1995 | Rodeffer et al. | |
| 5,391,972 A | 2/1995 | Gardner et al. | |
| 5,394,073 A | 2/1995 | Nagai | |
| 5,457,376 A | 10/1995 | Chong et al. | |
| 5,486,749 A | 1/1996 | Brainard | |
| 5,523,666 A | 6/1996 | Hoelzl et al. | |
| 5,525,888 A | 6/1996 | Toya | |
| 5,539,297 A | 7/1996 | Fiebig | |
| 5,621,301 A | 4/1997 | Allen et al. | |
| 5,640,078 A | 6/1997 | Kou et al. | |
| 5,656,914 A | 8/1997 | Nagele et al. | |
| 5,684,384 A | 11/1997 | Barkat et al. | |
| 5,691,618 A | 11/1997 | Kobayashi et al. | |
| 5,717,309 A | 2/1998 | Cho | |
| 5,734,253 A | 3/1998 | Brake et al. | |
| 5,747,964 A | 5/1998 | Turnbull | |
| 5,757,163 A | 5/1998 | Brotto et al. | |
| D396,210 S | 7/1998 | Shiga et al. | |
| 5,780,991 A | 7/1998 | Brake et al. | |
| 5,821,733 A | 10/1998 | Turnbull | |
| 5,856,038 A | 1/1999 | Mason | |
| 5,903,133 A | 5/1999 | Amero et al. | |
| 5,910,380 A | 6/1999 | Taraboulos et al. | |
| D412,487 S | 8/1999 | Nagele et al. | |
| 5,939,858 A | 8/1999 | Dodd et al. | |
| 5,959,434 A | 9/1999 | Park et al. | |
| 5,998,961 A | 12/1999 | Brown | |
| D418,836 S | 1/2000 | Matt et al. | |
| 6,018,227 A * | 1/2000 | Kumar et al. | 320/106 |
| 6,025,699 A | 2/2000 | Cummings | |
| 6,049,192 A | 4/2000 | Kfoury et al. | |
| D424,515 S | 5/2000 | Sage | |
| D429,211 S | 8/2000 | Ohi et al. | |
| 6,104,292 A | 8/2000 | Rombom et al. | |
| 6,124,699 A | 9/2000 | Suzuki et al. | |
| 6,127,802 A | 10/2000 | Lloyd et al. | |
| 6,140,798 A | 10/2000 | Krieger | |
| 6,204,632 B1 * | 3/2001 | Nierescher et al. | 320/116 |
| D440,202 S | 4/2001 | Heun | |
| D442,924 S | 5/2001 | Dermikaelian et al. | |
| 6,246,211 B1 | 6/2001 | Dalton et al. | |
| D449,270 S * | 10/2001 | Banks et al. | D13/107 |
| 6,308,059 B1 | 10/2001 | Domes | |
| 6,346,793 B1 | 2/2002 | Shibata et al. | |
| 6,427,070 B1 | 7/2002 | Smith | |
| 6,456,837 B1 | 9/2002 | Domes | |
| D472,875 S | 4/2003 | Garvis et al. | |
| D474,175 S | 5/2003 | Furusho et al. | |
| D474,176 S | 5/2003 | Furusho et al. | |
| D474,177 S | 5/2003 | Furusho et al. | |
| 6,597,152 B1 | 7/2003 | Jacobs et al. | |
| D479,223 S | 9/2003 | Furusho et al. | |
| D487,059 S | 2/2004 | Glasgow et al. | |
| D488,438 S | 4/2004 | Zick et al. | |
| 6,765,366 B2 | 7/2004 | Maggert et al. | |
| D494,940 S | 8/2004 | Fiocchi | |
| D505,913 S | 6/2005 | Kam Lun et al. | |
| D506,972 S | 7/2005 | Parel et al. | |
| D507,234 S | 7/2005 | Heun | |
| D507,525 S | 7/2005 | Heun | |
| 6,982,541 B2 | 1/2006 | Zick et al. | |
| D537,410 S | 2/2007 | Yuen | |
| D539,732 S | 4/2007 | Aglassinger | |
| 7,309,928 B2 * | 12/2007 | Grant et al. | 290/1 A |
| 2003/0040296 A1 * | 2/2003 | Smith | 455/347 |
| 2003/0090234 A1 | 5/2003 | Glasgow et al. | |
| 2003/0117107 A1 | 6/2003 | Zick et al. | |
| 2003/0197485 A1 * | 10/2003 | Miller et al. | 320/112 |

FOREIGN PATENT DOCUMENTS

| | | |
|---|---|---|
| DE | 4010780 | 10/1991 |
| DE | 4026020 | 12/1991 |
| EP | 1 311 012 A2 | 5/2003 |
| EP | 1 315 266 A2 | 5/2003 |
| EP | 1282212 | 1/2005 |
| GB | 2286493 | 8/1995 |
| GB | 2313722 | 12/1997 |
| JP | 3182048 | 8/1991 |
| WO | WO 03/085800 | 10/2003 |

* cited by examiner

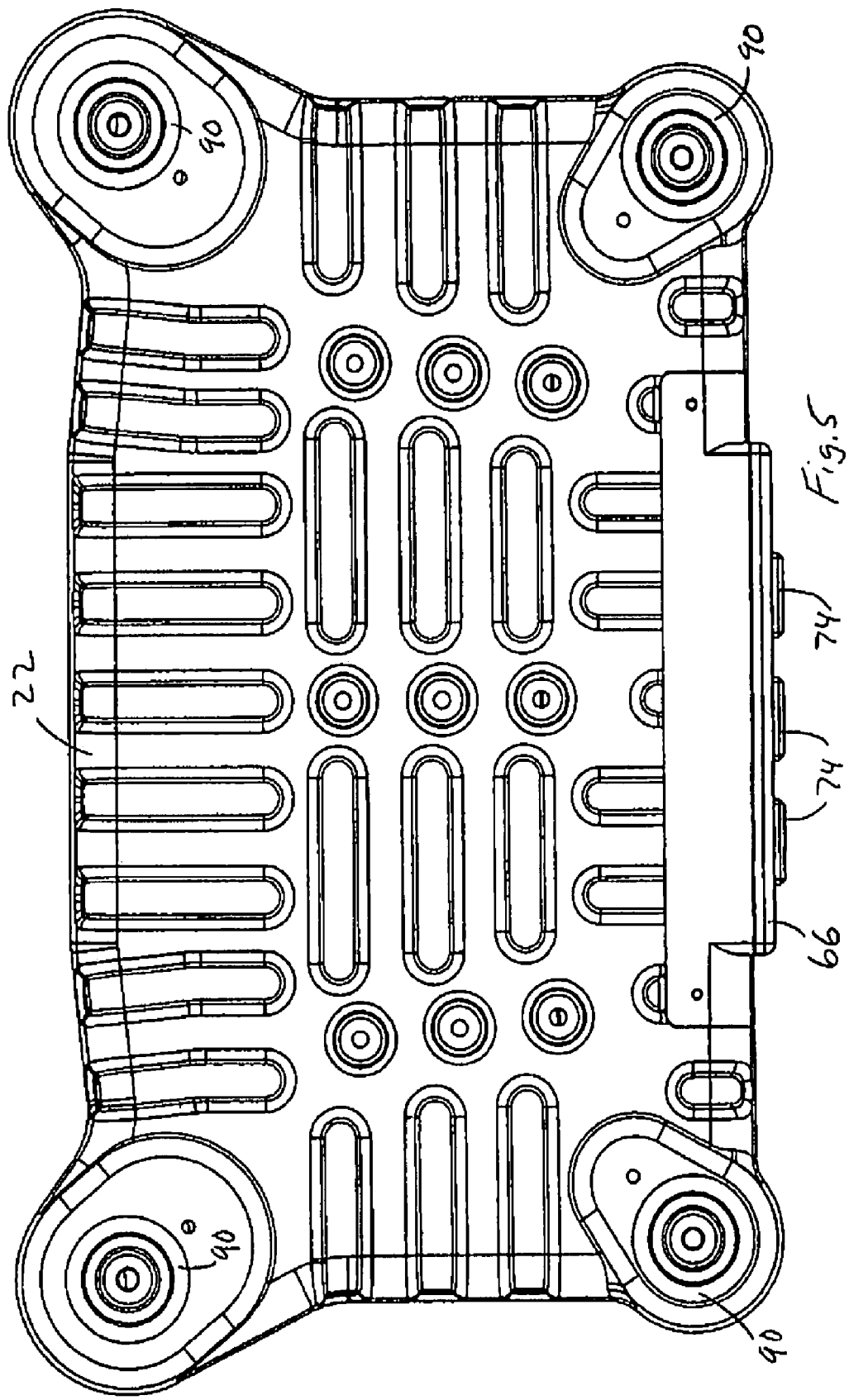

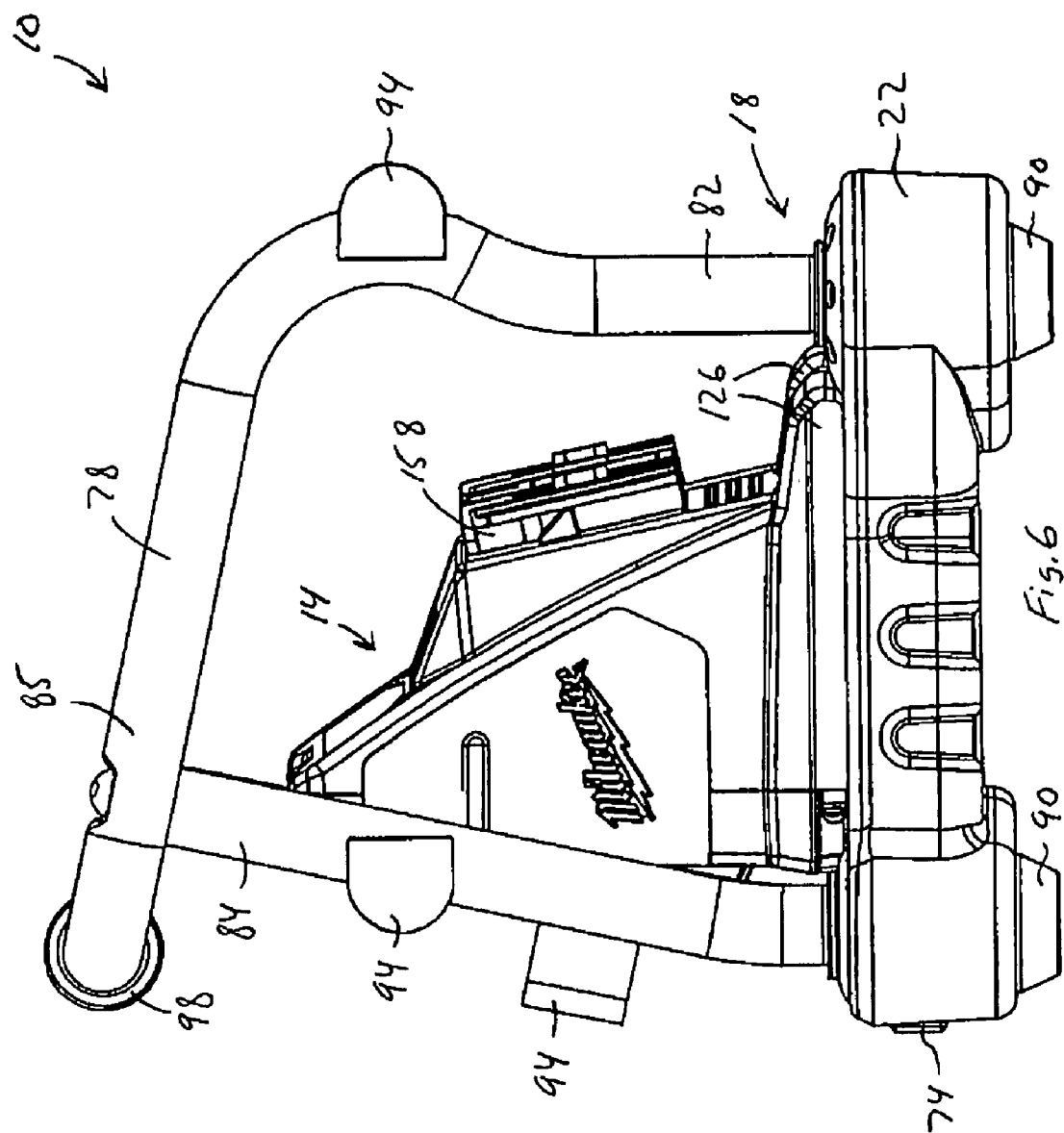

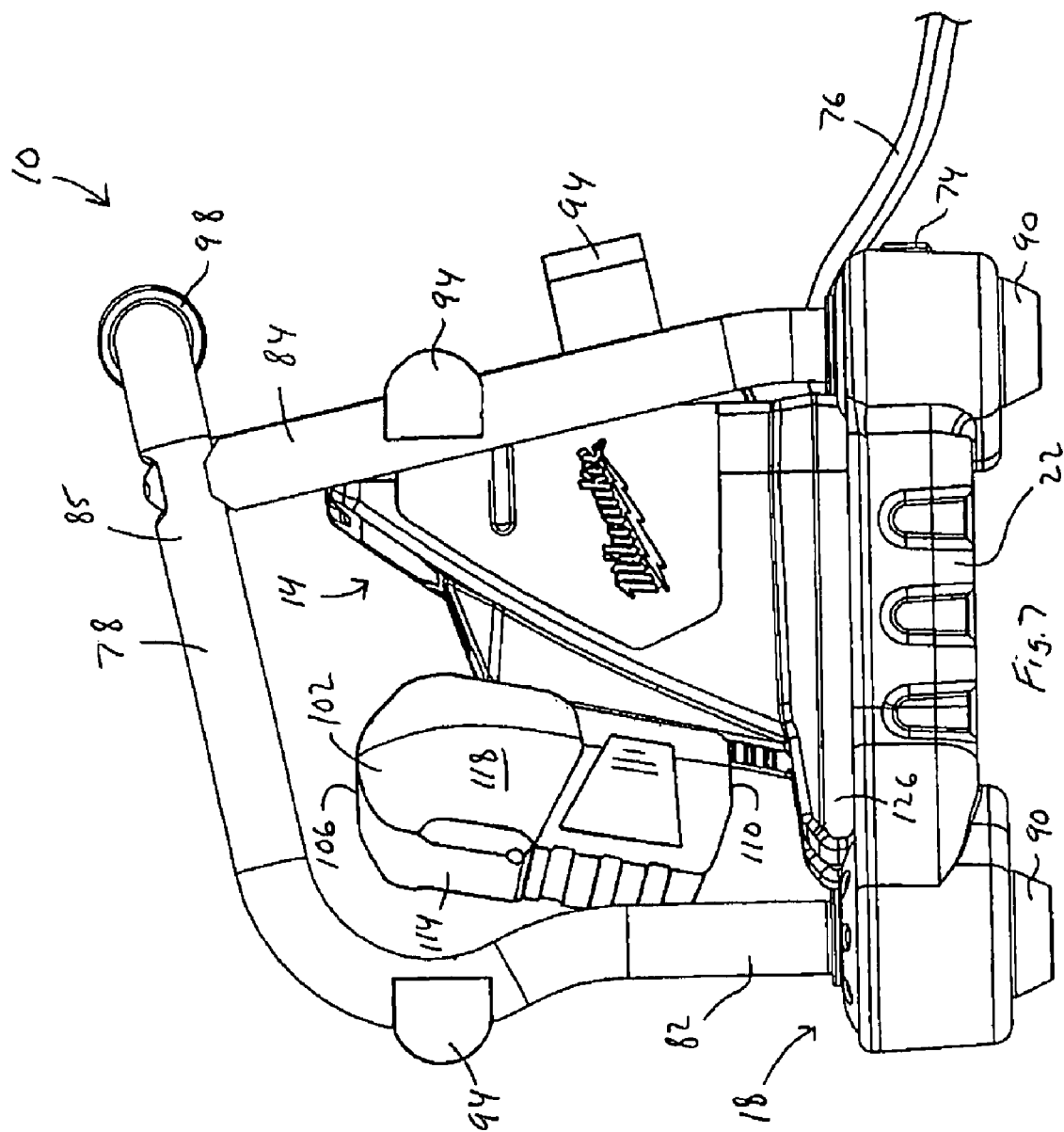

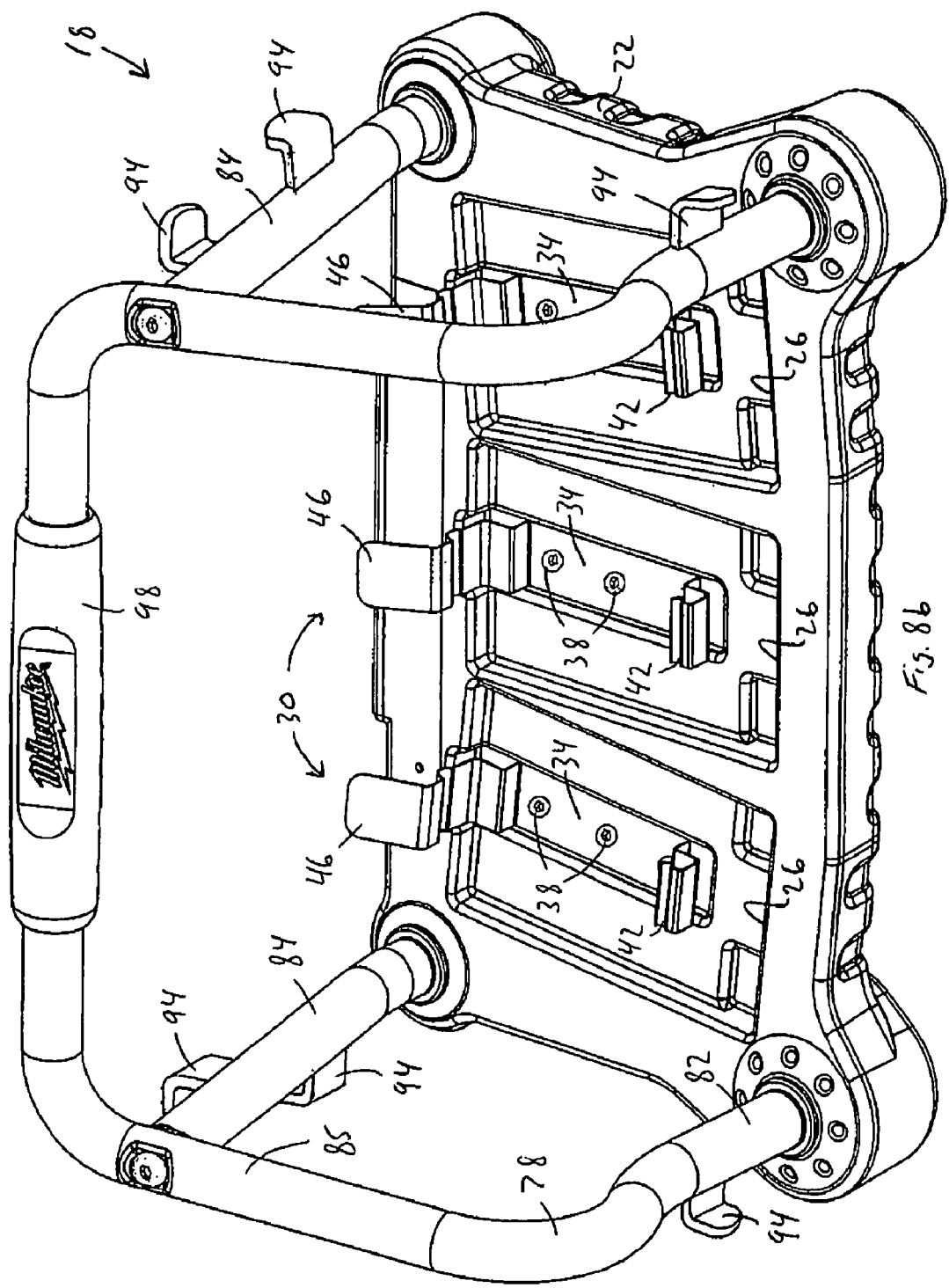

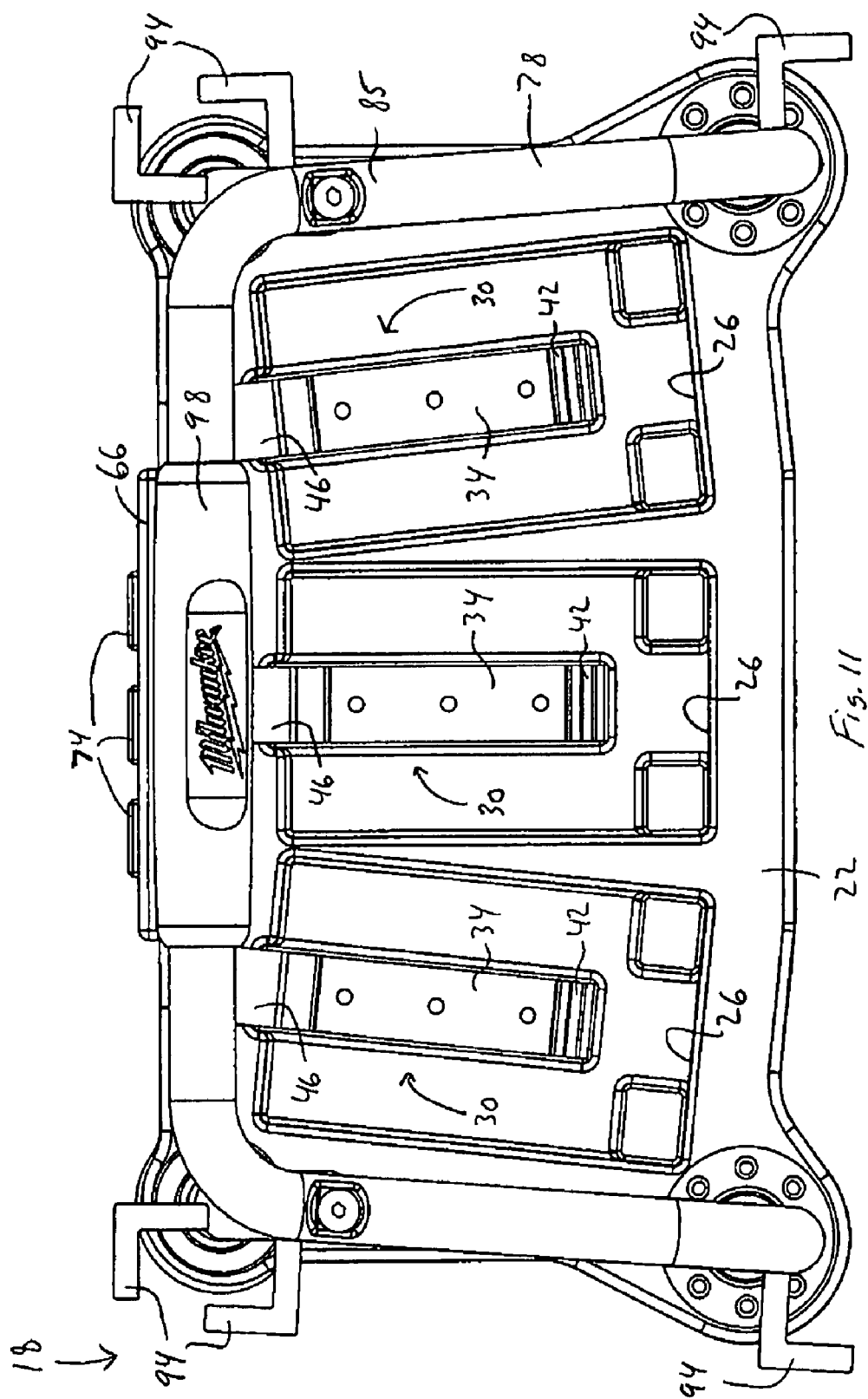

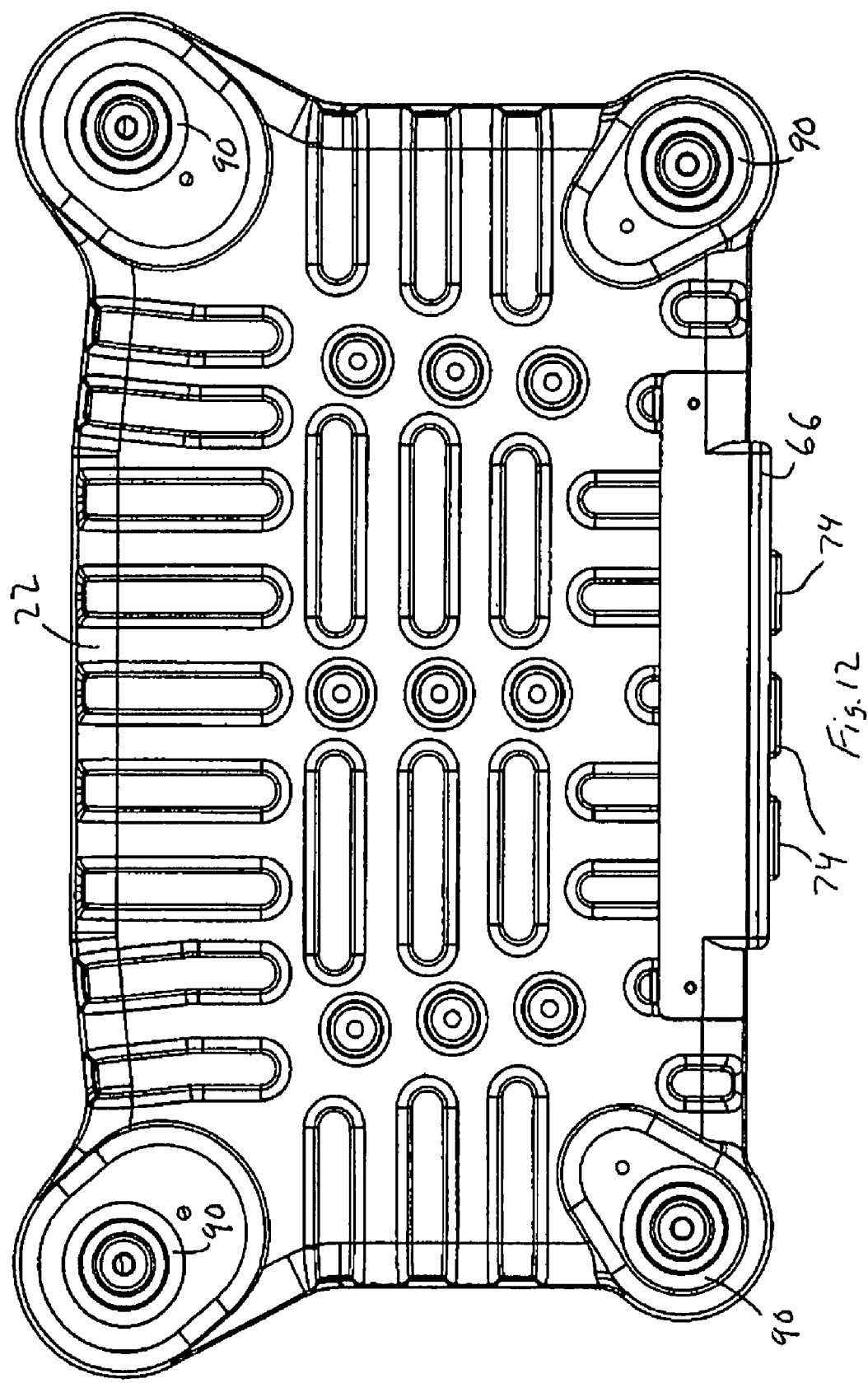

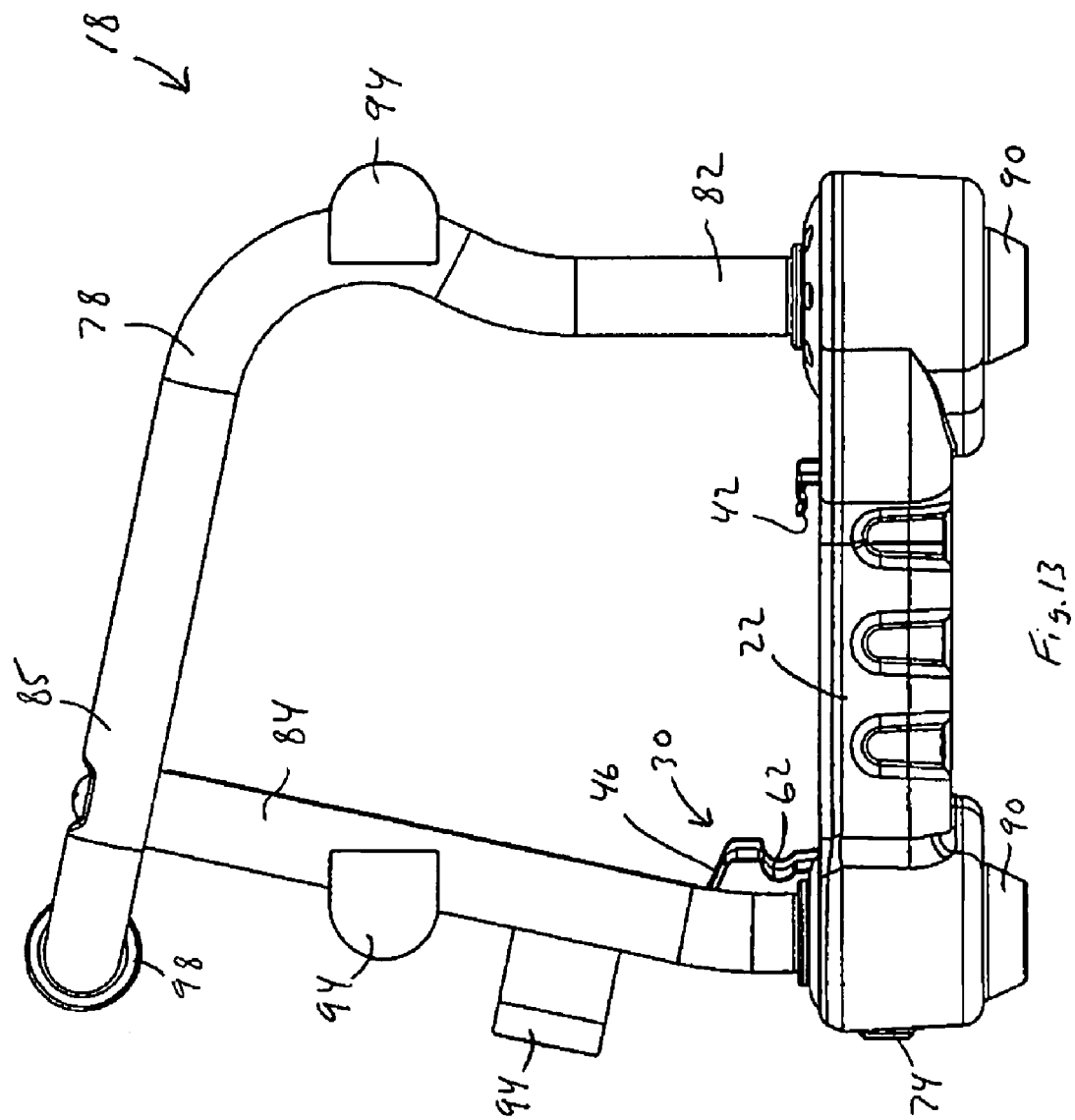

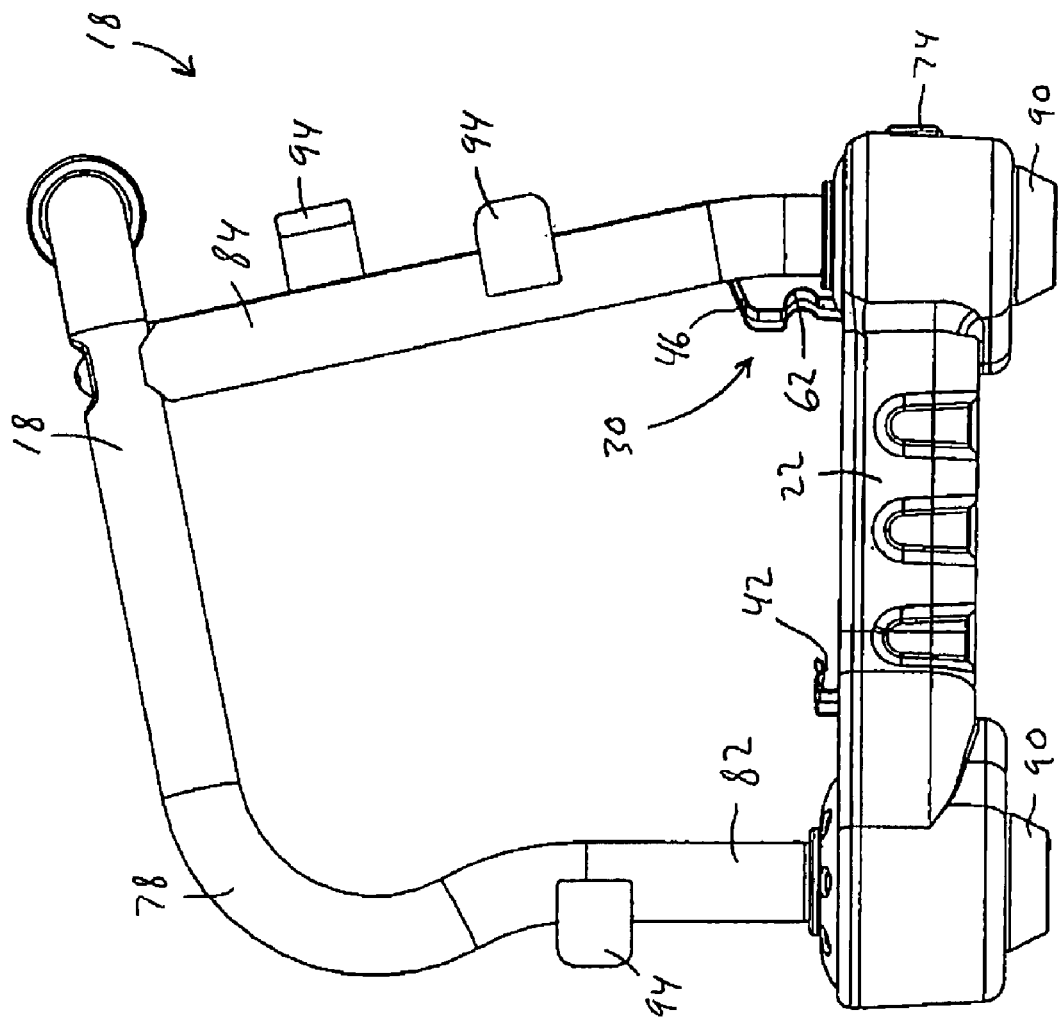

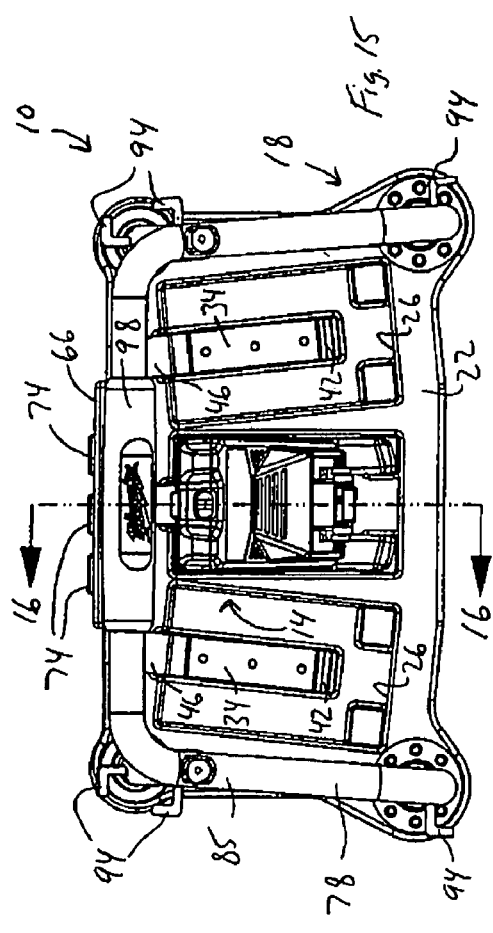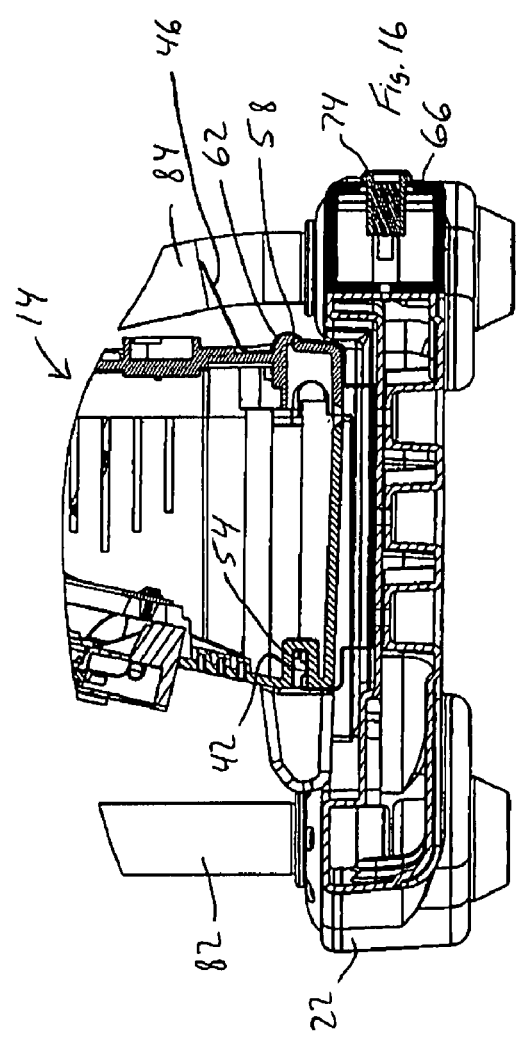

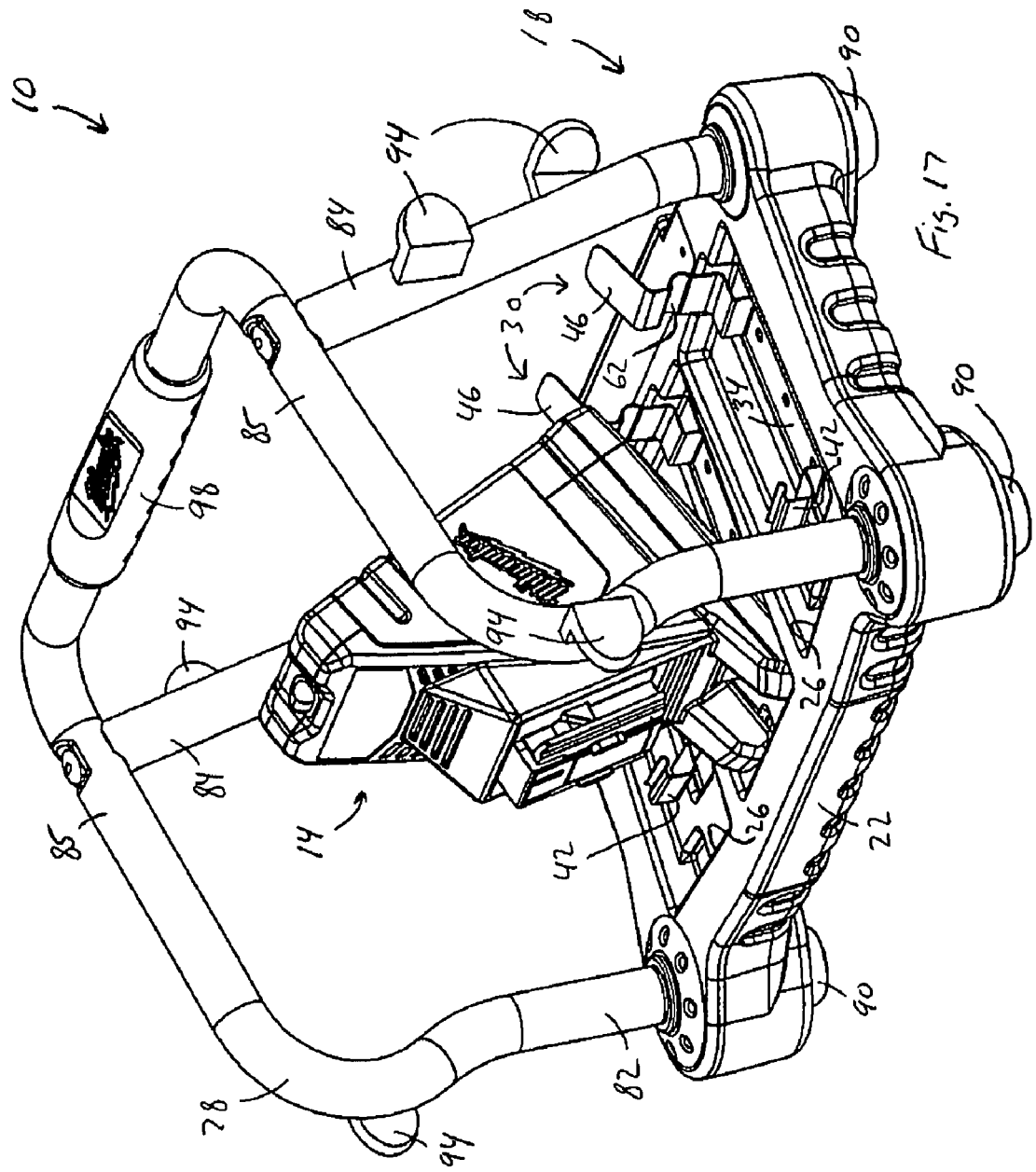

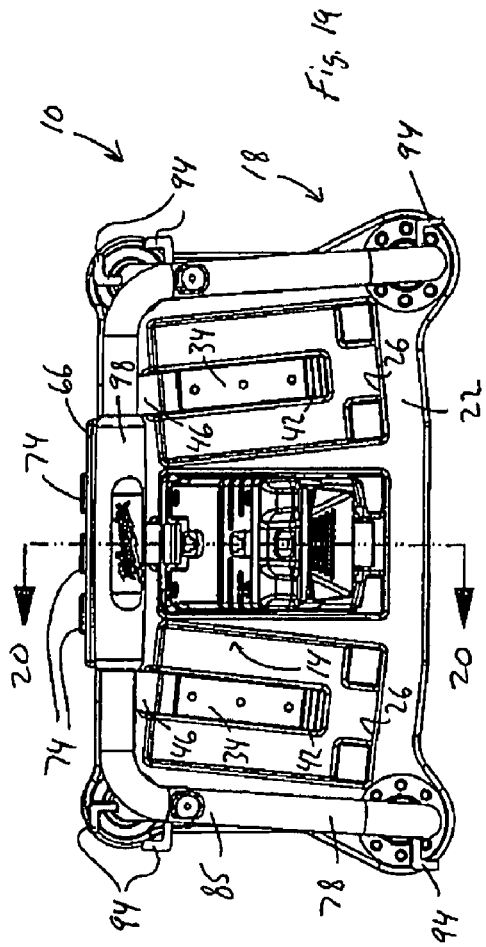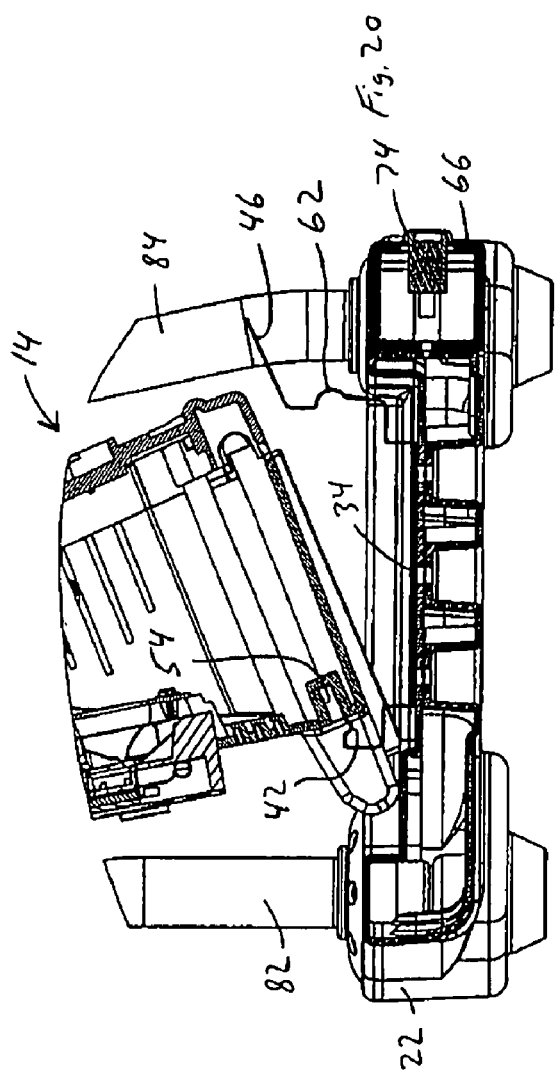

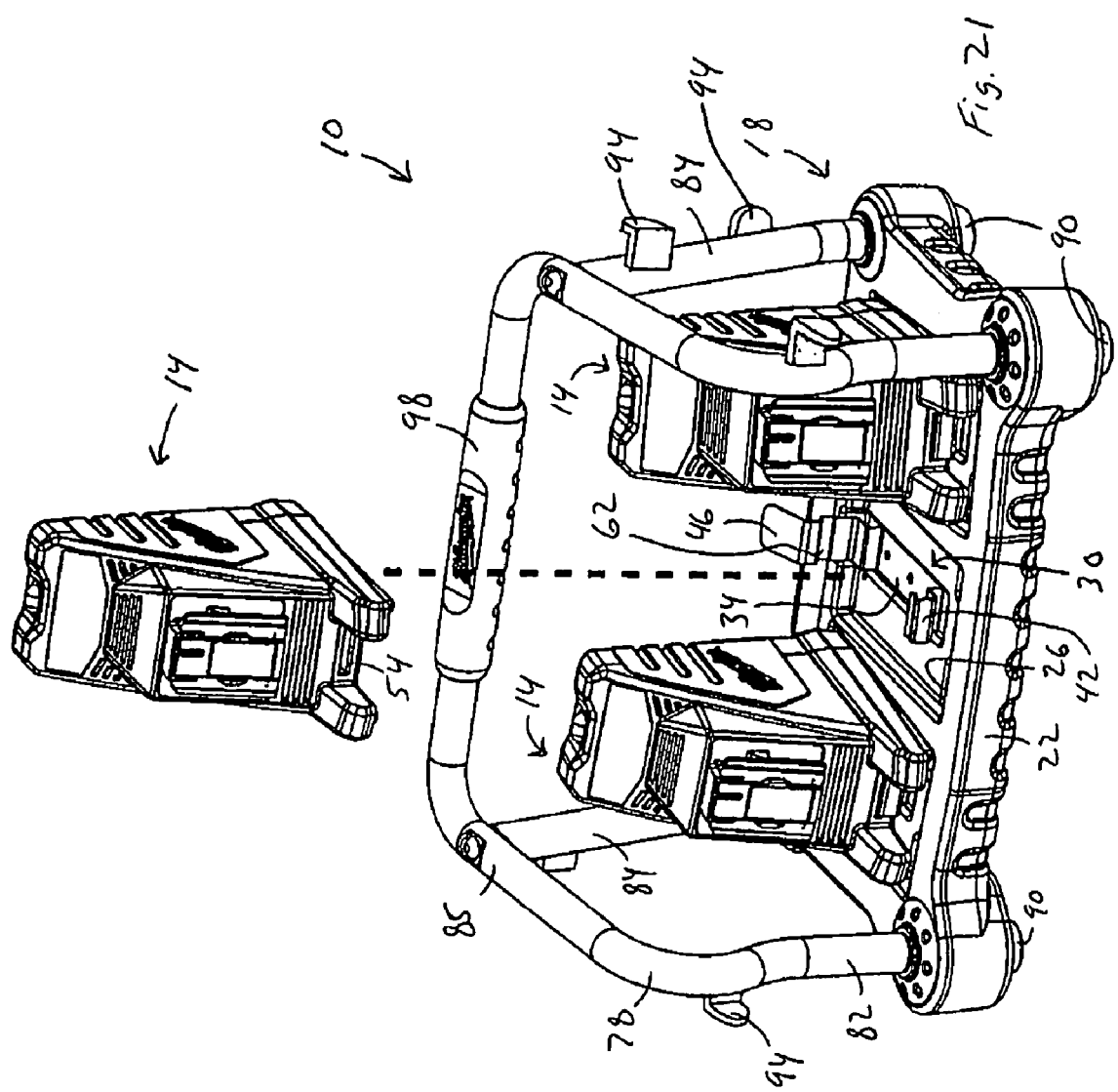

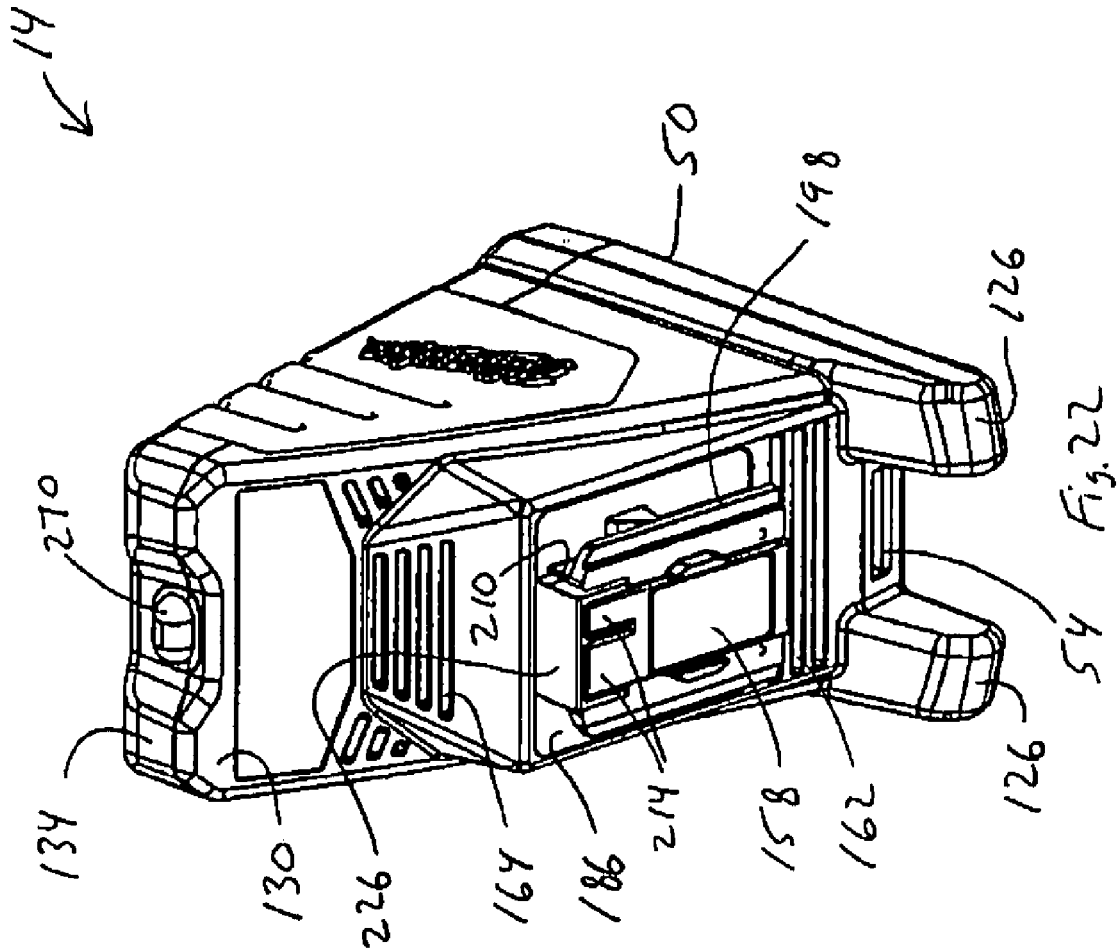

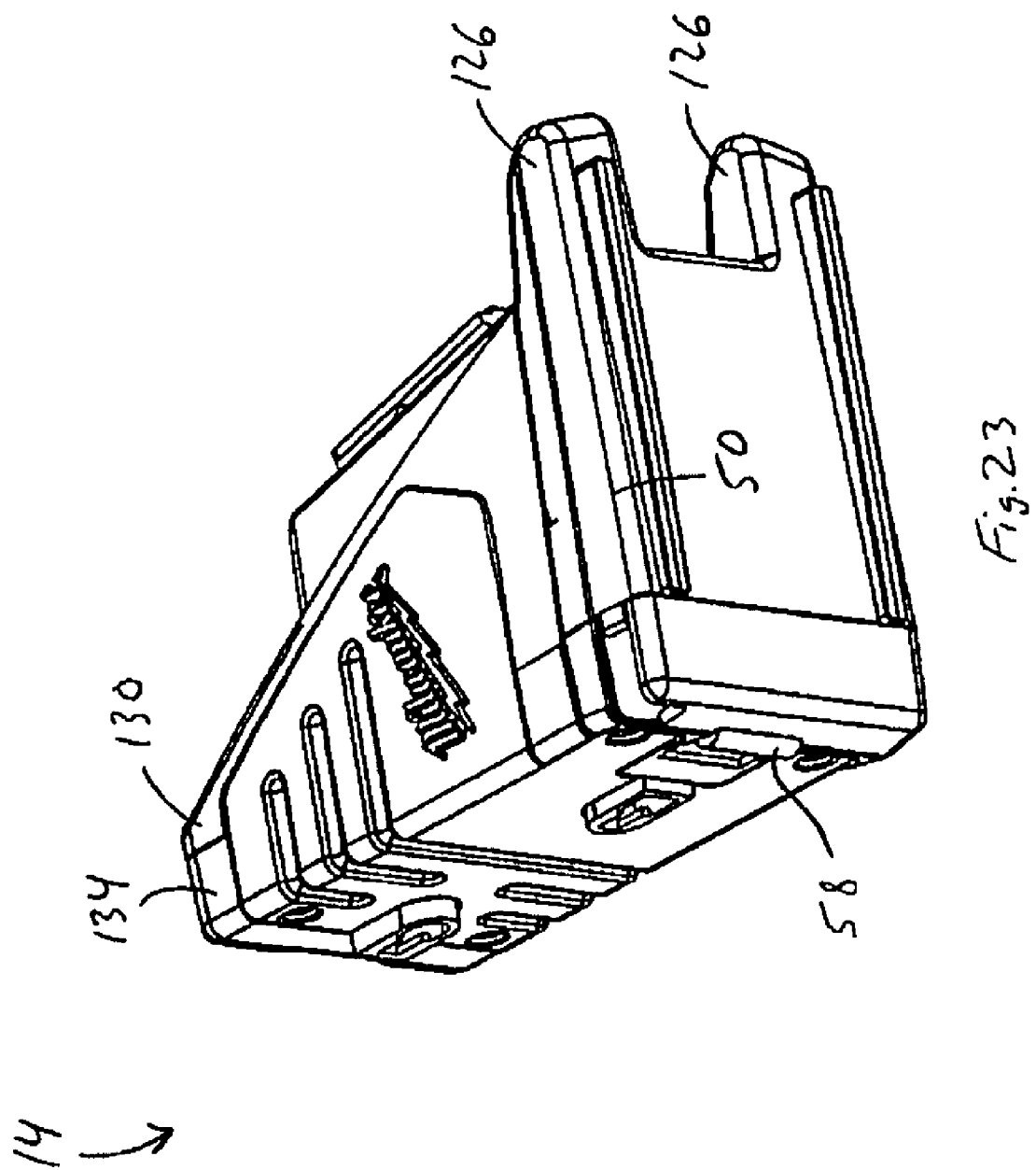

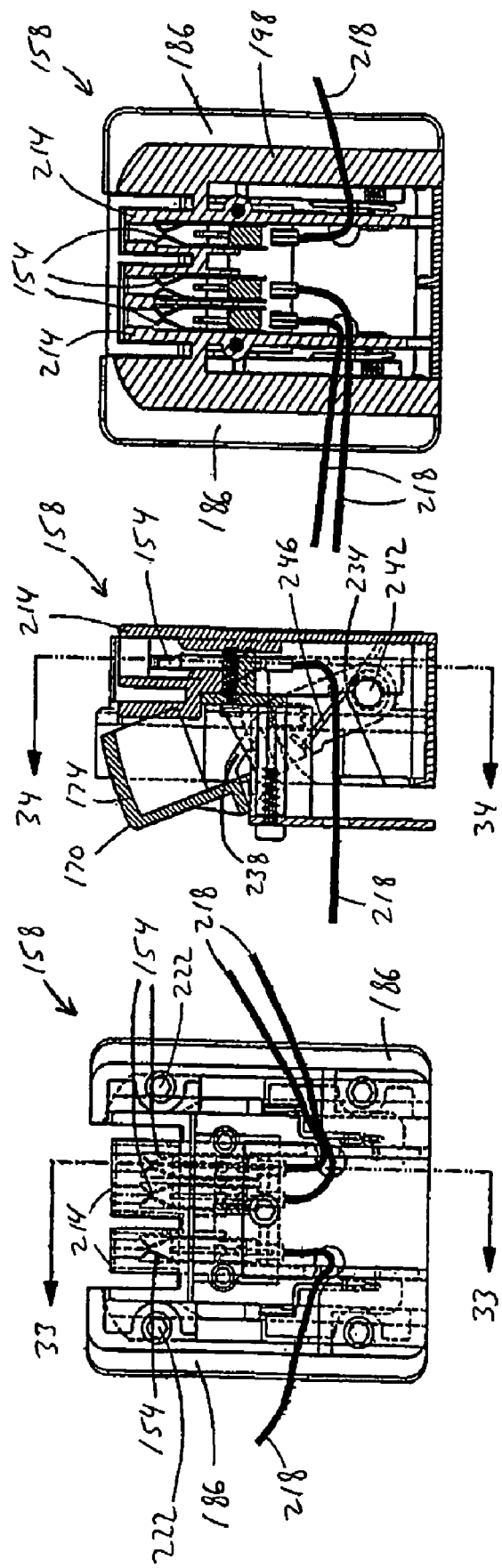

BATTERY CHARGER AND ASSEMBLY

RELATED APPLICATIONS

This application is a divisional application of co-pending U.S. patent application Ser. No. 10/840,703, filed May 6, 2004, which claims the benefit of prior filed Provisional Patent Application No. 60/468,556, filed May 7, 2003.

FIELD OF THE INVENTION

The present invention relates to batteries and, more particularly, to battery chargers.

SUMMARY OF THE INVENTION

Some existing battery chargers, such as power tool battery chargers, are capable of charging only a single battery at a time (i.e., a single battery charger). Also, some other existing battery chargers are capable of charging multiple batteries at a time (i.e., a multiple battery charger). A single battery charger is typically smaller and less expensive than a multiple battery charger. However, for applications in which multiple batteries need to be charged, a multiple battery charger may be preferred by an operator.

In some cases, with the purchase of a rechargeable battery or a battery-powered device, such as a cordless power tool, a customer receives at least one battery and a single battery charger. When the customer purchases additional cordless power tools or kits of power tools, each with a battery and a single battery charger, the customer will continue to accumulate single battery chargers. The customer may have an excess of single battery chargers when a multiple battery charger may be desired.

Accordingly, the invention provides an apparatus that can, in some constructions and in some aspects, convert two or more single battery chargers into a multiple battery charger. In such aspects and in such constructions, the apparatus can support several single battery chargers to form a battery charger capable of charging multiple batteries.

In some aspects and in some constructions, the invention provides a combination generally including a battery charger including a housing having an outer surface, a battery being supportable on the outer surface, and a charging circuit supported by the housing and electrically connectable to a power source and to the battery; and a protective structure separate from and connectable with the battery charger, the protective structure, when connected, extending from the housing beyond the battery.

Also, in some aspects and in some constructions, the invention provides a combination generally including a first battery charger including a first housing and a first charging circuit supported by the first housing and electrically connectable to a power source and to a battery; a second battery charger including a second housing and a second charging circuit supported by the second housing and electrically connectable to a power source and to a battery; and a connecting structure operable to connect the first battery charger and the second battery charger as a unit.

In addition, in some aspects and in some constructions, the invention provides a combination generally including a battery charger including a housing and a charging circuit supported by the housing and electrically connectable to a power source and to a battery; and a handle separate from and connectable with the housing, the handle, when connected, being operable to carry the battery charger.

Further, in some aspects and in some constructions, the invention provides a battery charger generally including a housing having a base for supporting the battery charger on a surface and an upper portion opposite to the base, a height being defined between the base and the upper portion, the base having a width, the width being less than or equal to the height, a battery being supportable by the housing; and a charging circuit supported by the housing and electrically connectable to a power source and to the battery.

In some aspects and in some constructions, the invention provides an assembly for supporting a first battery charger and a second battery charger. The assembly may generally include a frame formed to support the first battery charger and the second battery charger. The frame may at least partially define a handle. The assembly may also include a locking subassembly connected to the frame and formed to secure at least one of the first battery charger and the second battery charger to the frame.

Also, in some aspects, the invention provides a battery charging system generally including a first battery charger connectable to a power source and operable to charge a first battery and a second battery charger connectable to the power source and operable to charge a second battery. The system may also include a frame configured to support the first battery charger and the second battery charger. Further, the system may include a first locking mechanism connected to the frame and connectable with the first battery charger. The first locking mechanism is selectively actuated between a locked position, in which the first battery is secured to the frame, and an unlocked position, in which the first battery is releasable from the frame. Also, the system may include a second locking mechanism connected to the frame and connectable with the second battery charger. The second locking mechanism is selectively actuated between the locked position, in which the second battery is secured to the frame, and the unlocked position, in which the second battery is releasable from the frame.

In addition, in some aspects and in some constructions, the invention provides an assembly for supporting a first battery charger and a second battery charger. The assembly may generally include a heavy-duty frame for supporting the first battery charger and the second battery charger. The frame may include a base defining a first charger position to support the first battery charger and a second charger position to support the second battery charger. The base extends beyond the first battery charger and the second battery charger when the first battery charger is in the first charger position and when the second battery charger is in the second charger position. The frame may also include a bar connected to the base. The bar extends beyond the first battery charger and the second battery charger when the first battery charger is in the first charger position and when the second battery charger is in the second charger position.

The assembly may also include a first locking mechanism connected to the frame and connectable with the first battery charger. The first locking mechanism is selectively actuated between a locked position, in which the first battery charger is secured to the frame, and an unlocked position, in which the first battery charger is releasable from the frame. Further, the assembly may include a second locking mechanism connected to the frame and connectable with the second battery charger. The second locking mechanism is selectively actuated between the locked position, in which the second battery charger is secured to the frame, and the unlocked position, in which the second battery charger is releasable from the frame.

Further, in some aspects and in some constructions, the invention provides a battery charger and a handle connectable to the battery charger.

In addition, in some aspects and in some constructions, the invention provides an impact resistant, protective battery charger frame that is connectable to a battery charger.

In some aspects and in some constructions, multiple single battery chargers are connected to the frame to provide a multiple battery charger.

In some aspects and in some constructions, the first locking mechanism secures the first battery charger to the frame, and the second locking mechanism secures the second battery charger to the frame.

In some aspects and in some constructions, the heavy-duty construction of the frame allows the single battery chargers to withstand impacts after falling several feet or being impacted by other objects, in addition to protecting the batteries attached to the single battery chargers from jarring loose as a result of the impact.

Existing single battery chargers and their individual components are not suited for outdoor use including being exposed to weather (i.e. sun, rain, wind, etc.) and other contaminants (i.e. dirt, sand, gravel, mud, sawdust, etc.). Weather and contaminants can damage the components of the single battery chargers and may render the battery chargers inoperable.

In existing single battery chargers, the charging terminals are typically exposed to the outside environment. Contaminants (such as dirt, sand, mud, sawdust, etc.) may block the charger terminals and prevent electrical connection between the charger terminals and the battery (and charging circuit) or cause a short circuit of the charging circuit. Also, with existing single battery chargers, the charge status indicators are not easily seen in outdoor sunlight.

Further, existing single battery chargers may employ an inefficient charging routine when charging batteries. Some battery chargers maintain charging even after the battery has reached full charge. Such a routine leads to unnecessary heating of the battery, therefore, decreasing the cycle life of the battery. Other battery chargers terminate charging when a pre-set time limit is reached. This routine can also result in overheating and a decrease in battery cycle life or may result in a battery not being fully charged when the charging routine has terminated.

Accordingly, in some aspects and in some constructions, the invention also provides a single battery charger which substantially alleviates one or more problems with existing single battery chargers. In some aspects, the battery charger is a single battery charger for charging power tool batteries. In other aspects, the battery charger is a heavy-duty battery charger designed to be used outdoors and/or in harsh working conditions.

More particularly, in some aspects and in some constructions, the invention provides a battery charger generally including a housing having an outer surface, a battery being supportable on the outer surface, a charging circuit supported by the housing and electrically connectable to a power source and to the battery, and protective structure connected to and extending from the outer surface of the housing, the protective structure extending from the outer surface beyond the battery.

Also, in some aspects and in some constructions, the invention provides a single battery charger generally including a housing having an outer surface, a battery being supportable on the outer surface, and a charging circuit supported by the housing and electrically connectable to a power source and to the battery.

In addition, in some aspects and in some constructions, the invention provides a single battery charger generally including a housing, a charging circuit supported by the housing and electrically connectable to a power source and to a battery, a vent defined by the housing, the vent releasing heated air from the housing and impeding entry of contaminants into the housing, the vent causing the heated air to turn downwardly turn through the vent before being released from the housing, and a drain defined by the housing, the drain releasing contaminants from the housing.

Further, in some aspects and in some constructions, the invention provides a single battery charger generally including a housing, a charging circuit supported by the housing and electrically connectable with a power source, and a battery port connected to the housing and operable to support a battery. The battery port includes a charger terminal electrically connectable to the charging circuit to electrically connect the battery to the charging circuit, a charger terminal support defining an opening, the terminal being supported in the opening, and a charger terminal cover supported by the battery port, the terminal cover closing the opening when the battery is not supported by the battery port.

In addition, in some aspects and in some constructions, the invention provides a single battery charger generally including a housing, a charging circuit supported by the housing and electrically connectable to a power source and a battery, an LED positioned at least partially outside of the housing and electrically connected to the charging circuit, the LED being operable to display a charge status of the battery, and a translucent cover connected to the housing and at least partially enclosing the LED.

Also, in some aspects and in some constructions, the invention provides a single battery charger generally including a charging routine having a temperature rate termination technique. This charging routine is designed to function with, for example, Nickel-Metal Hydride (NiMH), Nickel-Cadmium (NiCd), Lithium-ion (Li-ion) etc. battery cells and includes a maintenance routine and boost routine that follows the normal charge execution.

In some aspects and in some constructions, the contaminant-resistant air vents prevent any liquid or solid contaminants from entering the charger housing. Also, a series of drains are incorporated within the charger to purge any contaminant that may enter the housing, and the suspended charging circuits are kept out of contact from such contaminants.

In some aspects and in some constructions, the terminal cover prevents any contaminants from contacting the charger terminals when a battery is not connected with the battery charger. The cover also provides a sweeping action to keep clean the interconnection between the charging terminals and the battery.

In some aspects and in some constructions, the LED charge status indicators are bright enough to see in the outdoor sunlight and are viewable from a long distance about a wide range of viewing angles.

In some aspects and in some constructions, the temperature rate termination technique of the charging routine reduces charge time by several minutes, reduces heat due to charging, and/or increases the cycle life of the battery.

Independent features and independent advantages of the present invention will become apparent to those skilled in the art upon review of the following detailed description, claims and drawings.

BRIEF DESCRIPTION OF THE DRAWINGS

FIG. 5 is a bottom view of the assembly of FIG. 1.

FIG. 6 is a left side view of the assembly of FIG. 1.

FIG. 7 is a right side view of the assembly of FIG. 1, illustrating a battery charger having an attached battery.

FIG. 8b is a front perspective view of the caddy of the assembly of FIG. 1, illustrating the cleats positioned on the caddy in a second configuration.

FIG. 9 is a front view of the caddy of FIG. 8a.

FIG. 10 is a rear view of the caddy of FIG. 8a.

FIG. 11 is a top view of the caddy of FIG. 8a.

FIG. 12 is a bottom view of the caddy of FIG. 8a.

FIG. 13 is a left side view of the caddy of FIG. 8a.

FIG. 14a is a right side view of the caddy of FIG. 8a.

FIG. 14b is a right side view of the caddy of FIG. 8b.

FIG. 15 is a top view of the caddy of FIG. 8a, illustrating an attached battery charger.

FIG. 16 is a cross-sectional view of the caddy and attached charger along line 16-16 in FIG. 15.

FIG. 17 is a front perspective view of the caddy of FIG. 8a, illustrating a partially attached charger.

FIG. 19 is a top view of the caddy and partially attached charger of FIG. 17.

FIG. 20 is a cross-sectional view of the caddy and partially attached charger along line 20-20 in FIG. 19.

FIG. 21 is a front perspective view of the assembly of FIG. 1, illustrating a charger being removed from the caddy.

FIG. 22 is a front perspective view of a charger of the assembly of FIG. 1.

FIG. 23 is a rear perspective view of the charger of FIG. 22.

FIG. 32 illustrates a battery port as viewed from the inside of the charger.

FIG. 33 is a cross-sectional view of the port along line 33-33 in FIG. 32.

FIG. 34 is a cross-sectional view of the port along line 34-34 in FIG. 33, illustrating charging terminals and their respective electrical leads extending away from the terminals.

Figure 1:
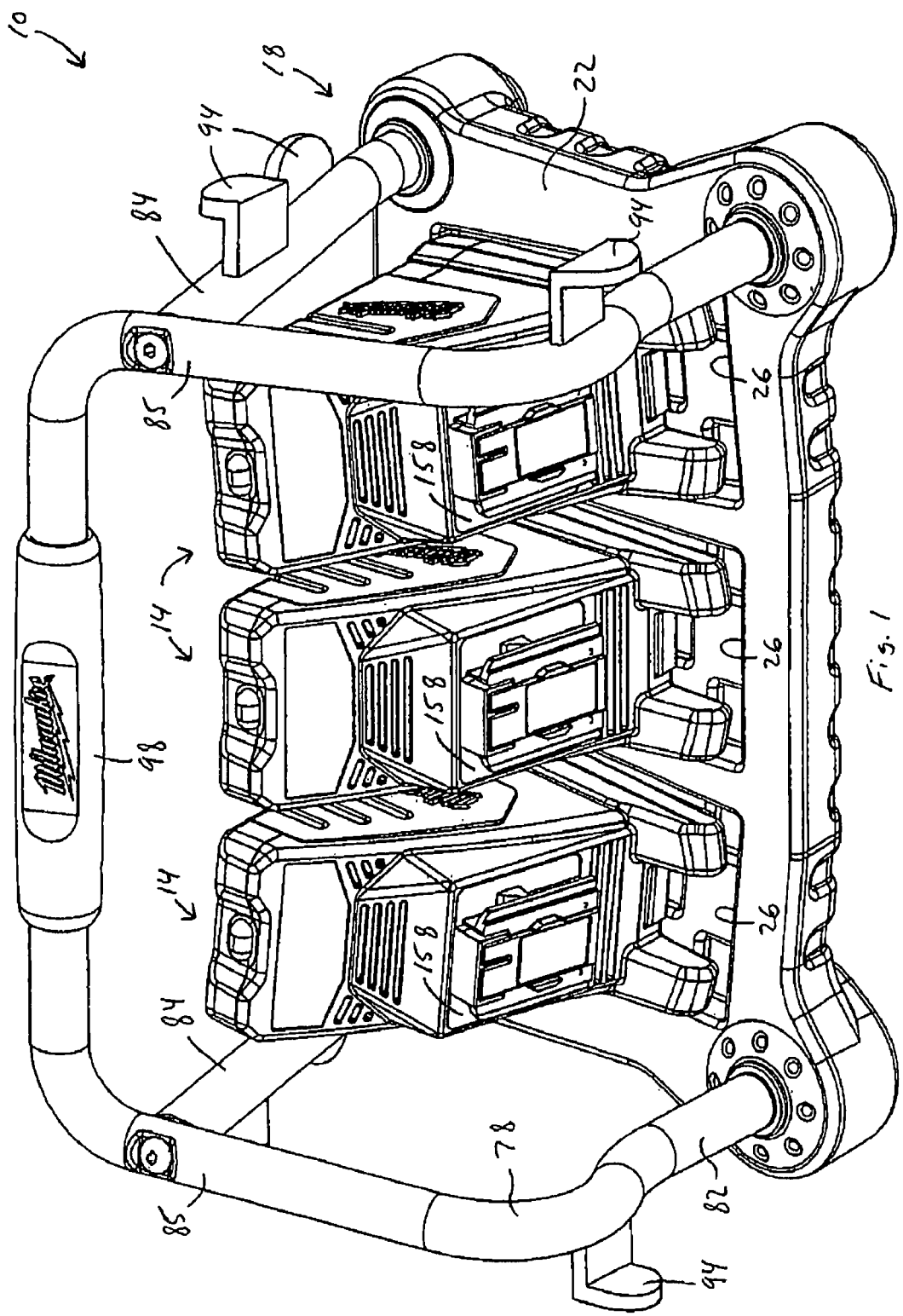
FIG. 1 is a front perspective view of a battery charger assembly embodying independent aspects of the present invention.
Figure 2:
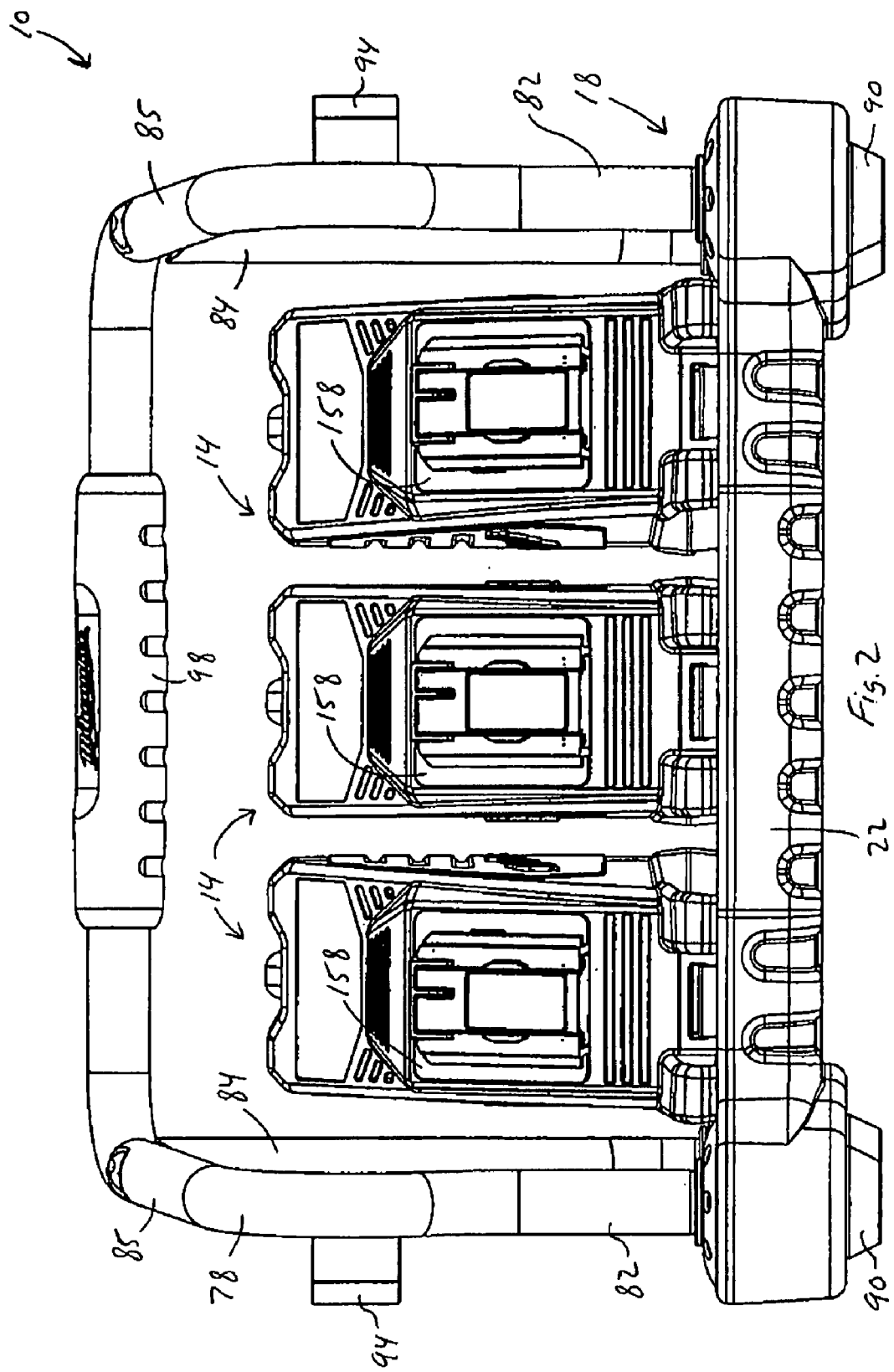
FIG. 2 is a front view of the assembly of FIG. 1.

Before at least one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION

A battery charger assembly 10 embodying independent aspects of the invention is illustrated in FIGS. 1-7. Generally, the assembly 10 includes at least one and, in the illustrated construction, multiple chargers 14 supported by a frame, or battery charger caddy 18. As shown in FIGS. 1-7, the caddy 18 is configured to support three chargers 14. However, the caddy 18 may alternatively be configured to support any number of chargers 14.

Figure 8A:
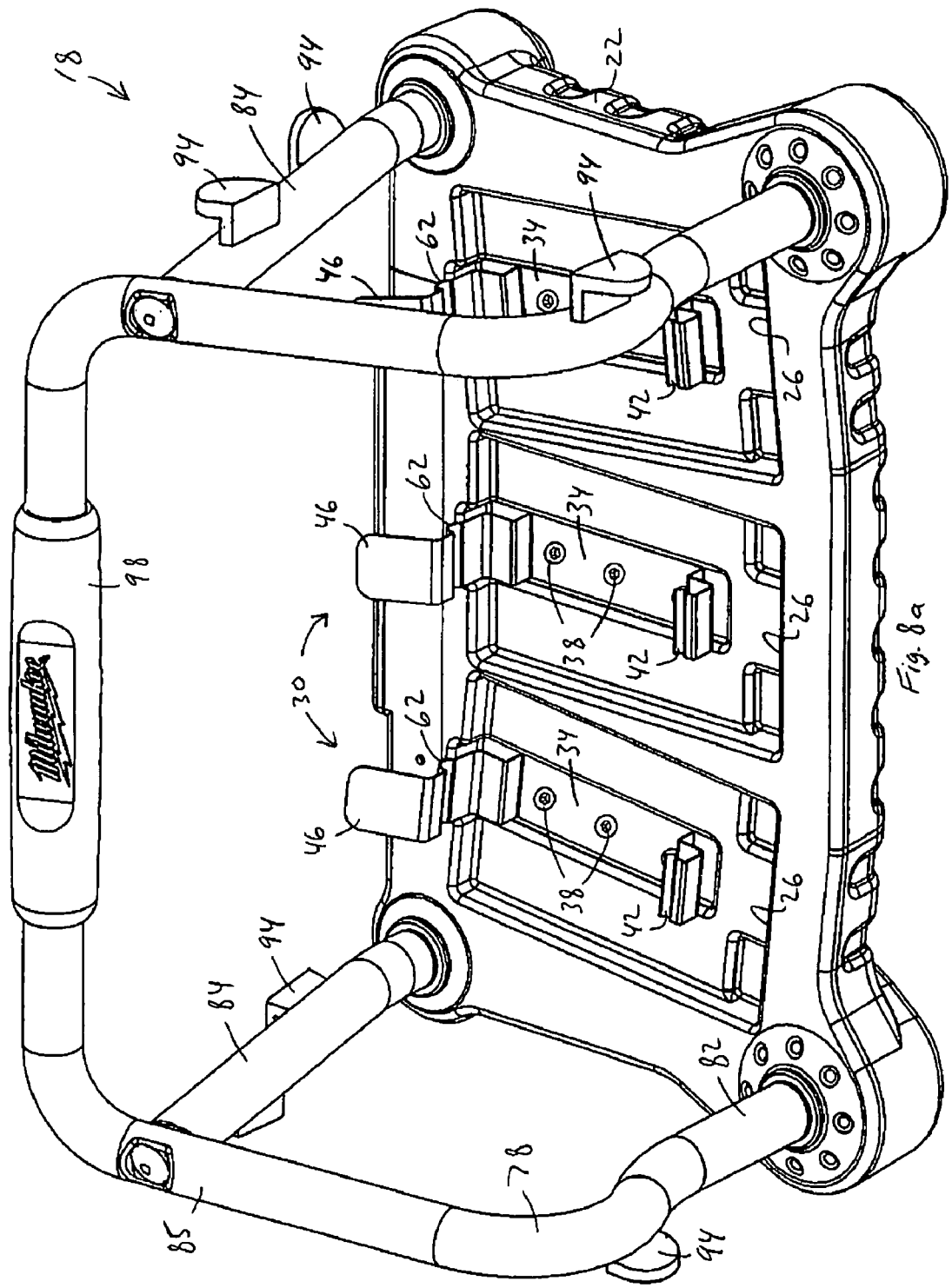
FIG. 8a is a front perspective view of a caddy of the assembly of FIG. 1, illustrating multiple cleats positioned on the caddy in a first configuration.
Figure 9:
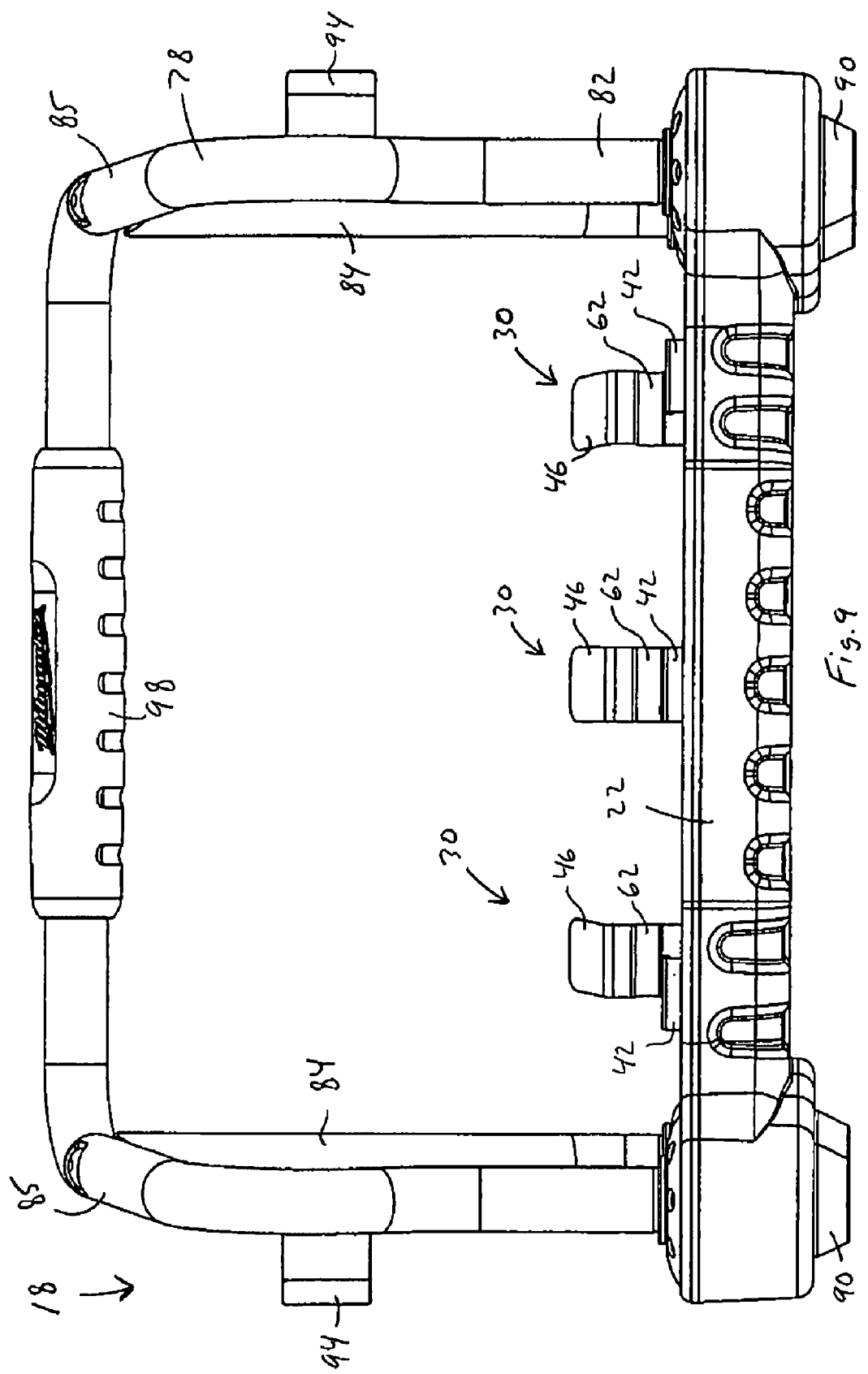
Figure 10:
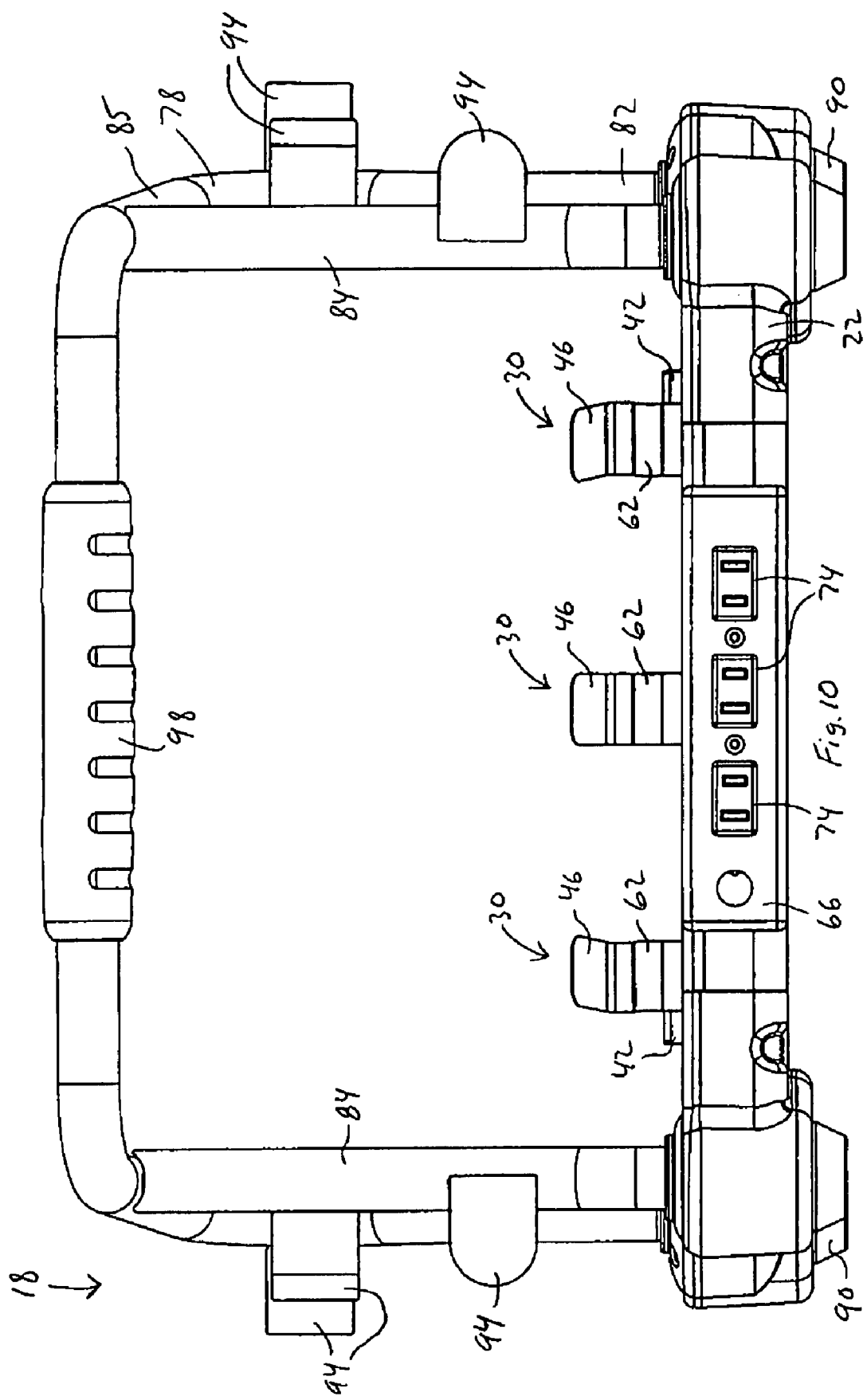

As shown more clearly in FIG. 8a, the caddy 18 includes a base 22 designed to buffer and cushion the chargers 14 supported by the base 22. Multiple insets 26 formed in the base 22 define multiple locations in which respective chargers 14 may be supported. However, in other constructions of the caddy (not shown), the base may be substantially flat, such that pre-defined charger support locations are not formed in the base.

Locking structure or a locking subassembly including multiple, individual locking mechanisms 30 corresponding with each inset 26 secures the chargers 14 to the base 22. In the illustrated construction, the base 22 and the locking structure may at least partially provide connecting structure for connecting one charger 14 to another charger 14.

As shown in FIG. 8a, the locking mechanisms 30 include resilient members 34 secured to the base 22. In the illustrated construction, the resilient members 34 are fastened to the base using ordinary fasteners 38. However, the resilient members 34 may alternatively be snap-fit with the base 22, welded to the base 22, adhesively attached to the base 22, or integrally formed with the base 22. Each resilient member 34 includes a hook portion 42 engageable with one portion of the charger 14, and a tab portion 46 releasably engageable with another portion of the charger 14. The tab portion 46 is movable between a locked position, in which the charger 14 is secured to the base 22, and an unlocked position, in which the charger 14 is releasable from the base 22.

In the illustrated construction (see FIGS. 16 and 20), the charger 14 includes a housing 50 configured with a slot 54 in the front and toward the bottom of the housing 50. The slot 54 is configured to receive the hook portion 42 of the resilient member 34 to partially secure the charger 14 to the base 22.

Also, in the illustrated construction (see FIGS. 16 and 20), the housing 50 is configured with a projection 58 in the rear and toward the bottom of the housing 50. The tab portion 46 of the resilient member 34 includes a locking portion 62 having a similar shape as the projection 58 on the housing 50. The charger 14 is completely secured to the base 22 when both the hook portion 42 engages the slot 54 in the housing 50 and when the locking portion 62 engages the projection 58 of the housing 50.

As shown in FIGS. 16 and 20, to attach a charger 14 to a resilient member 34, the charger 14 is first angularly positioned in the inset 26 such that the hook portion 42 of the resilient member 34 is allowed to engage the slot 54 in the front of the housing 50 to partially secure the housing 50 to the base 22 (see FIG. 20). After the hook portion 42 is engaged with the slot 54, the charger 14 is pivoted toward the inset 26 such that the tab portion 46 is initially deflected by the projection 58. The charger 14 is further pivoted until the tab portion 46 is allowed to return to its undeflected shape upon the locking portion 62 encountering the projection 58 in the housing 50 (see FIG. 16). The mating contact between the locking portion 62 and the projection 58 positively and fully secures the charger 14 to the base 22.

To release the charger 14 from the resilient member 34, the tab portion 46 is depressed so that the locking portion 62 is moved away from mating contact with the projection 58 of the housing 50, therefore allowing the housing 50 to be pivoted away from the inset 26 to partially release the housing 50 from the resilient member 34. The housing 50 is then moved so that the hook portion 42 disengages the slot 54 in the housing 50 to completely release the charger 14 from the resilient member 34 and the base 22. However, in other constructions of the caddy (not shown), the resilient members 34 may be configured in alternate forms, such that the hook and tab portions 42, 46 utilize alternate shapes to engage respective portions of the housing 50. Further, the locking mechanisms 30 may take other forms (rather than the resilient members 34) to secure the chargers 14 to the base 22.

However, in other constructions of the caddy (not shown), the locking subassembly may comprise a one-piece design, such that the one-piece locking subassembly is operable to secure multiple chargers 14 to the base 22. Also, the locking subassembly may include inter-engaging structure, such as a projection and a groove defined by the base 22, and a projection and a groove defined by the housing 50, whereby the housing 50 may be secured to the base 22 by engaging the groove of the base 22 with the projection of the housing 50, and engaging the groove of the housing 50 with the projection of the base 22. Such a locking subassembly may be similar to the inter-engaging structure generally provided by a battery and a battery charger, described below, or by the battery and a power tool.

Further, one of the housing 50 and the base 22 may include a locking member movable between a locked position, in which the housing 50 is locked to the base 22, and an unlocked position. Such a locking subassembly may be similar to the locking arrangement generally provided between a battery and a power tool.

Also, other items and/or components may be supported and/or secured to the base 22 in locations defined by the insets 26. For example, a storage container may include a housing defining similar structure (i.e., a slot 54 and a projection 58) engageable with the locking mechanisms 30. Also, other electrical components, for example, audio components, such as a radio, a MP3 player, a CD player, speaker(s), video components, etc., may be supported and/or secured to the base 22.

Figure 3:
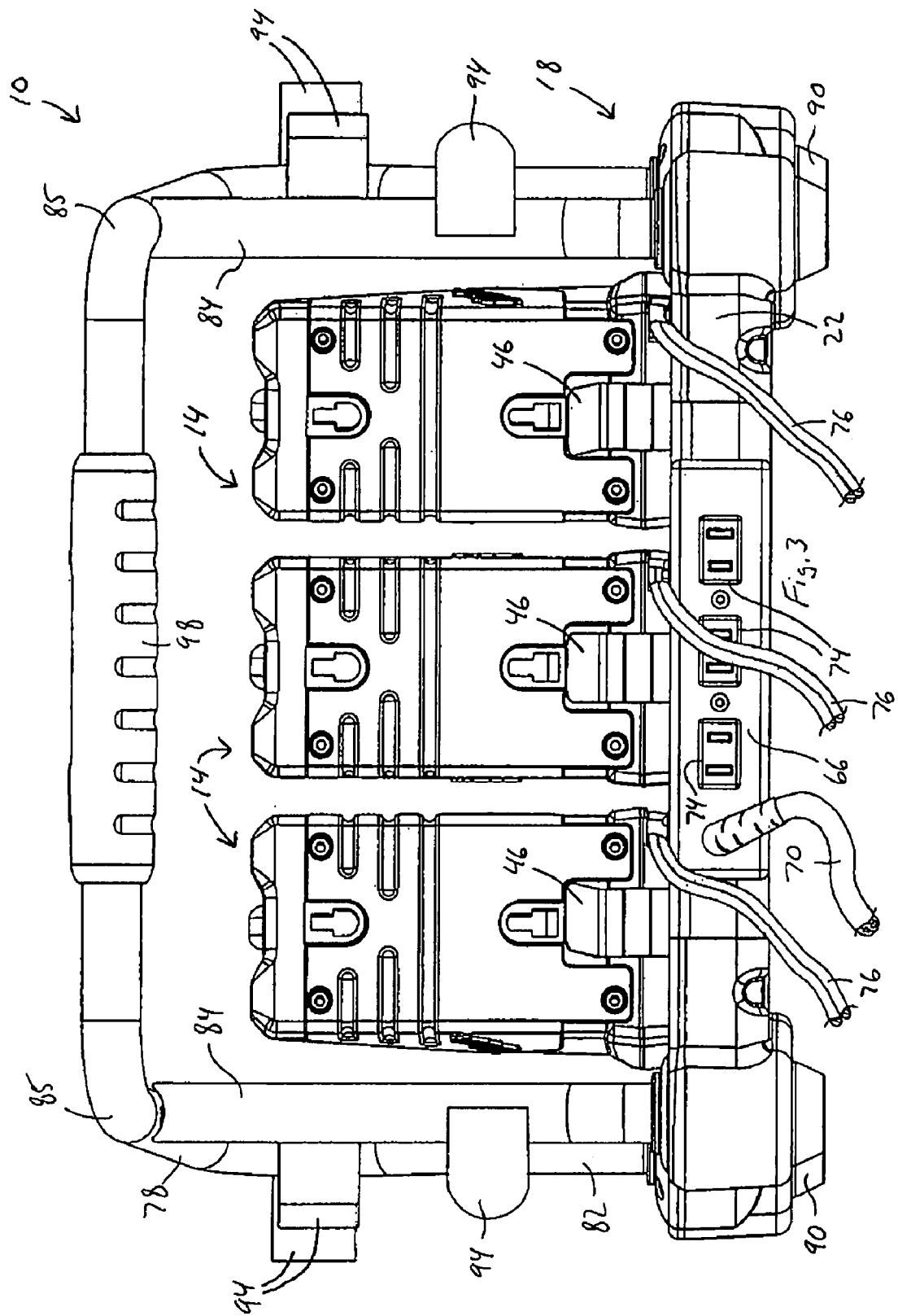
FIG. 3 is a rear view of the assembly of FIG. 1.
Figure 4:
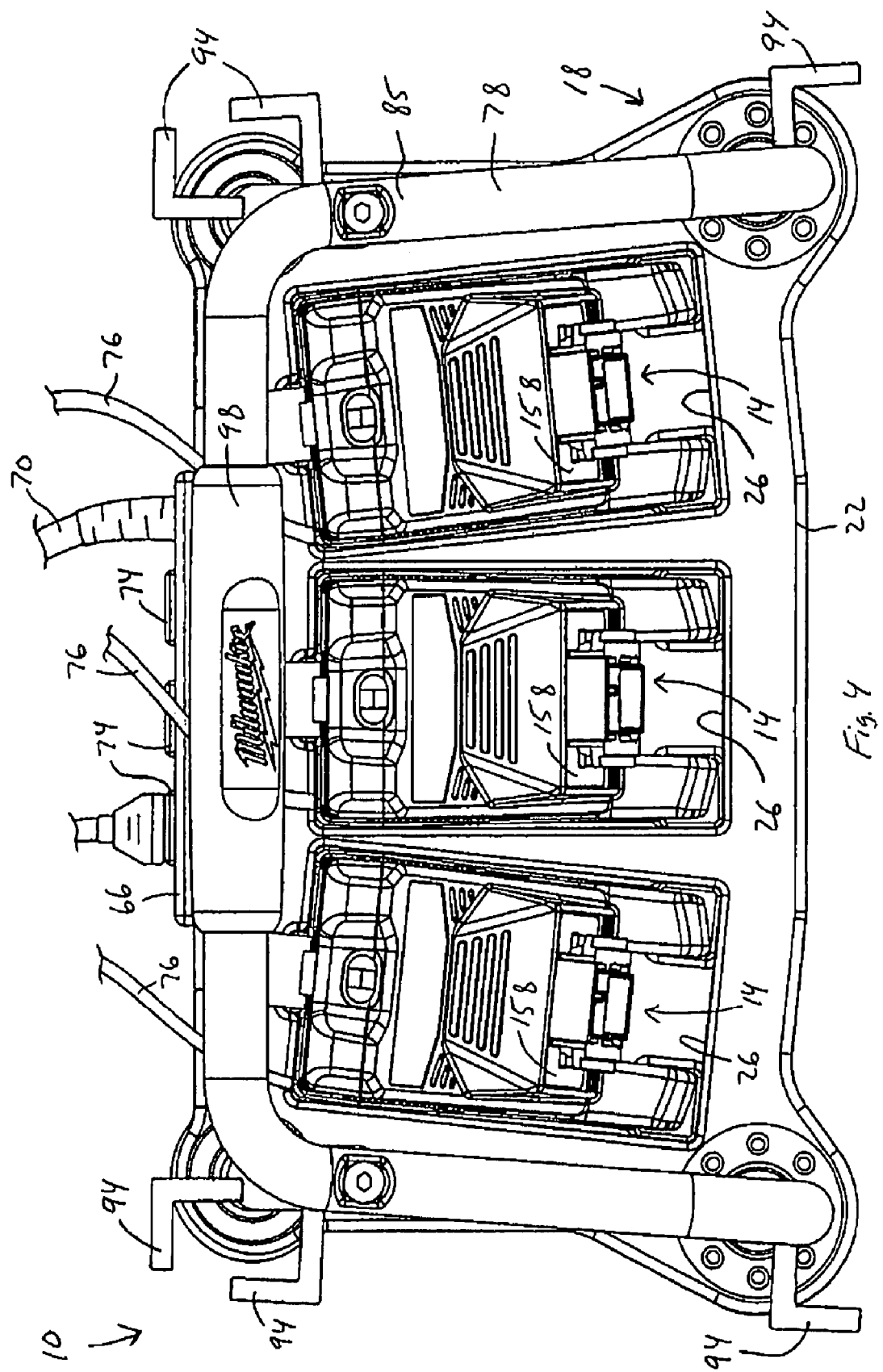
FIG. 4 is a top view of the assembly of FIG. 1.

With reference to FIGS. 3-4, the base 22 also includes a power strip 66 connected thereto in the rear of the base 22. The power strip 66 is electrically connected to a power source (not shown), such as 110-VAC line power, through a main power cord 70 (shown only in FIGS. 3-4). However, the power strip 66 may alternatively be electrically connected to a DC power source. In the illustrated construction, the power strip 66 is configured with three power outlets 74 capable of receiving power from the power source. However, in other constructions of the power strip (not shown), the power strip 66 may be configured with any number of power outlets 74. The power outlets 74 provide a location for the chargers 14 to plug their respective power cords 76 (shown only in FIGS. 3-4) so that each charger 14 can receive power from the power source. The power strip 66 may also include a circuit breaker (not shown) therein configured to protect the electrically-connected chargers 14 from power surges from the power source. Further, any electrical component configured to receive 110-VAC line power may be electrically connected to the outlets 74 to receive power. The power strip 66 includes other internal electrical components (not shown) similar to components utilized in conventional power strips. As such, description of those components will not be discussed herein.

In the illustrated construction, the base 22 is blow molded from a high density polyethylene (HDPE) which is a very strong and impact-resistant material. This material selection allows the base 22 to more effectively absorb the energy associated with an impact. In the illustrated construction, a uniform wall thickness of about 0.100" around the base 22 prevents its collapse (especially near the corners) when the base 22 is impacted after a fall or some other impacting event.

Also, in the illustrated construction, the resilient members 34 are made from a thin gauge metal. However, in other constructions of the caddy (not shown), the resilient members 34 may alternatively be made from plastic. Further, plastic resilient members 34 may be integrally formed with the plastic base 34.

Figure 31:
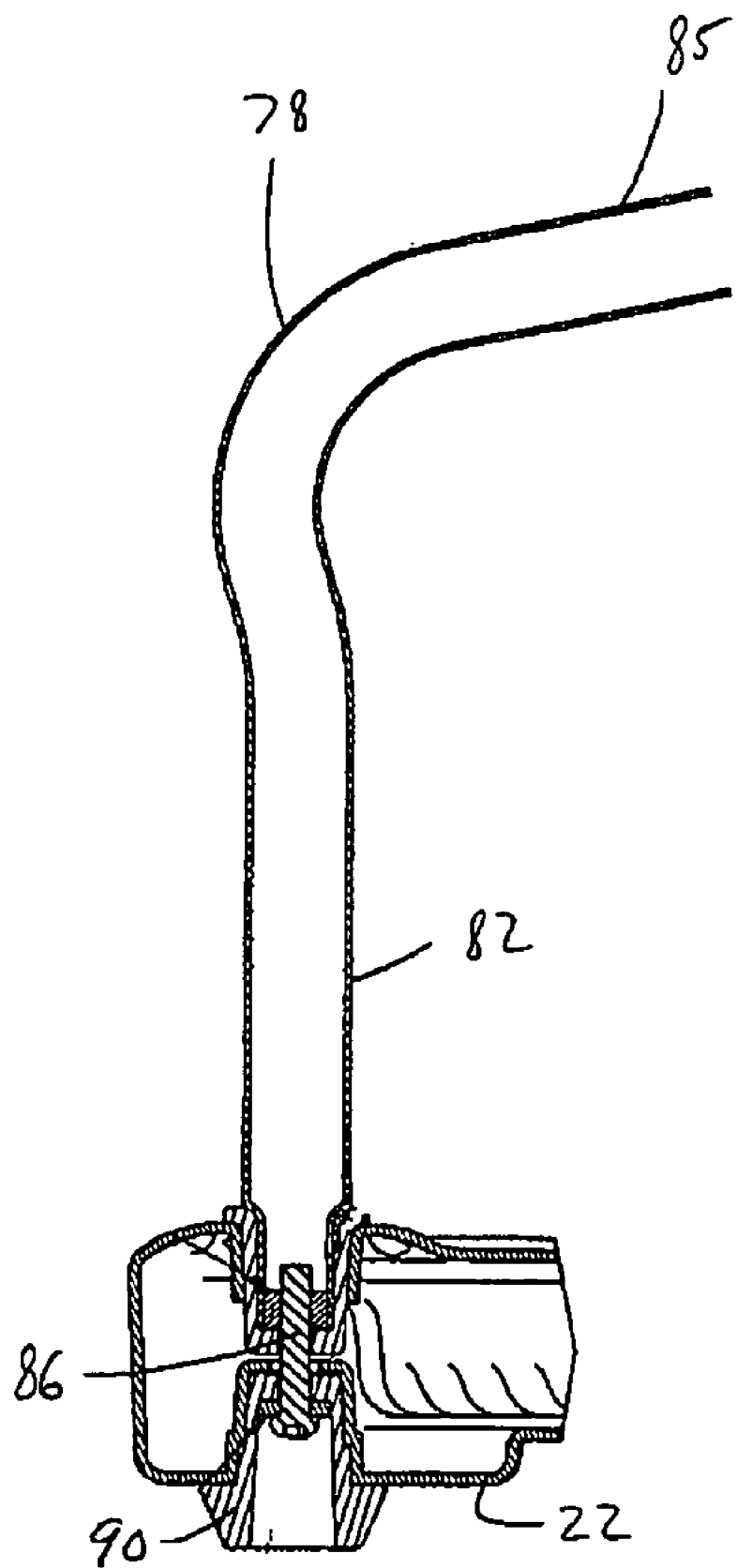
FIG. 31 is a cross-sectional view of a portion of the caddy along line 31-31 in FIG. 11.

As shown in FIGS. 1-4, 6-11 and 13-14b, a handle 78 is connected to the base 22. A lower portion 82 of the handle 78 connects to a front portion of the base 22 (see FIG. 31), while multiple braces 84 connect an upper portion 85 of the handle 78 and a rear portion of the base 22. The lower portion 82 of the handle 78 is connected to the front portion of the base 22 using a fastener 86, which also connects a foot 90 to a bottom portion of the base 22. The respective braces 84 are also fastened, at one end, to the upper portion 85 of the handle 78, and at an opposite end to the base 22. The braces 84 connect to the base 22 using a common fastener (not shown) as another foot 90 connected to the bottom portion of the base 22. Alternatively, in other constructions of the caddy (not shown), the handle 78 and braces 84 may be integrally formed. Further, in yet other constructions of the caddy (not shown), the handle 78 and braces 84 may be integrally formed with the base 22.

Figure 14A:
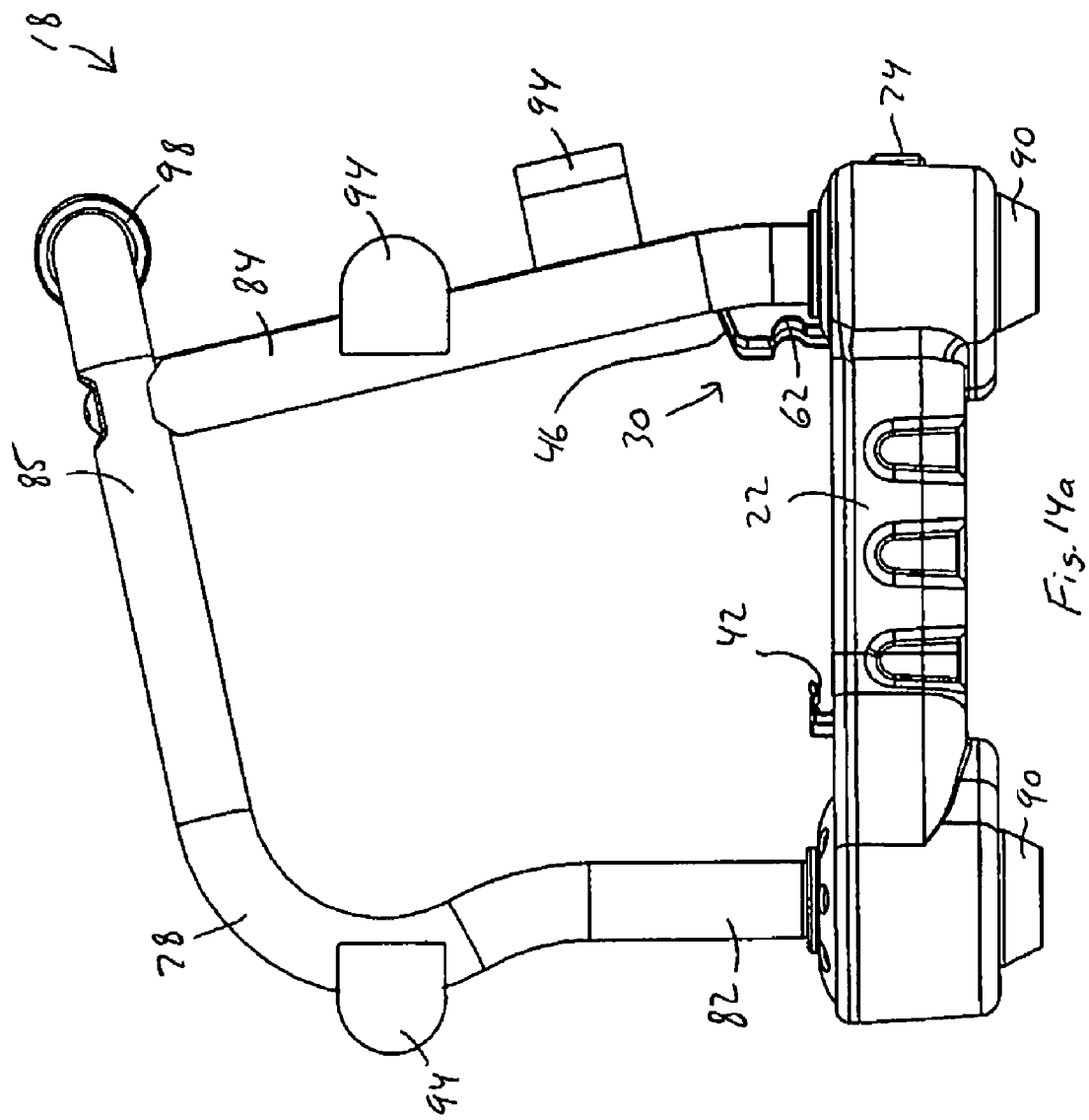
Figure 18:
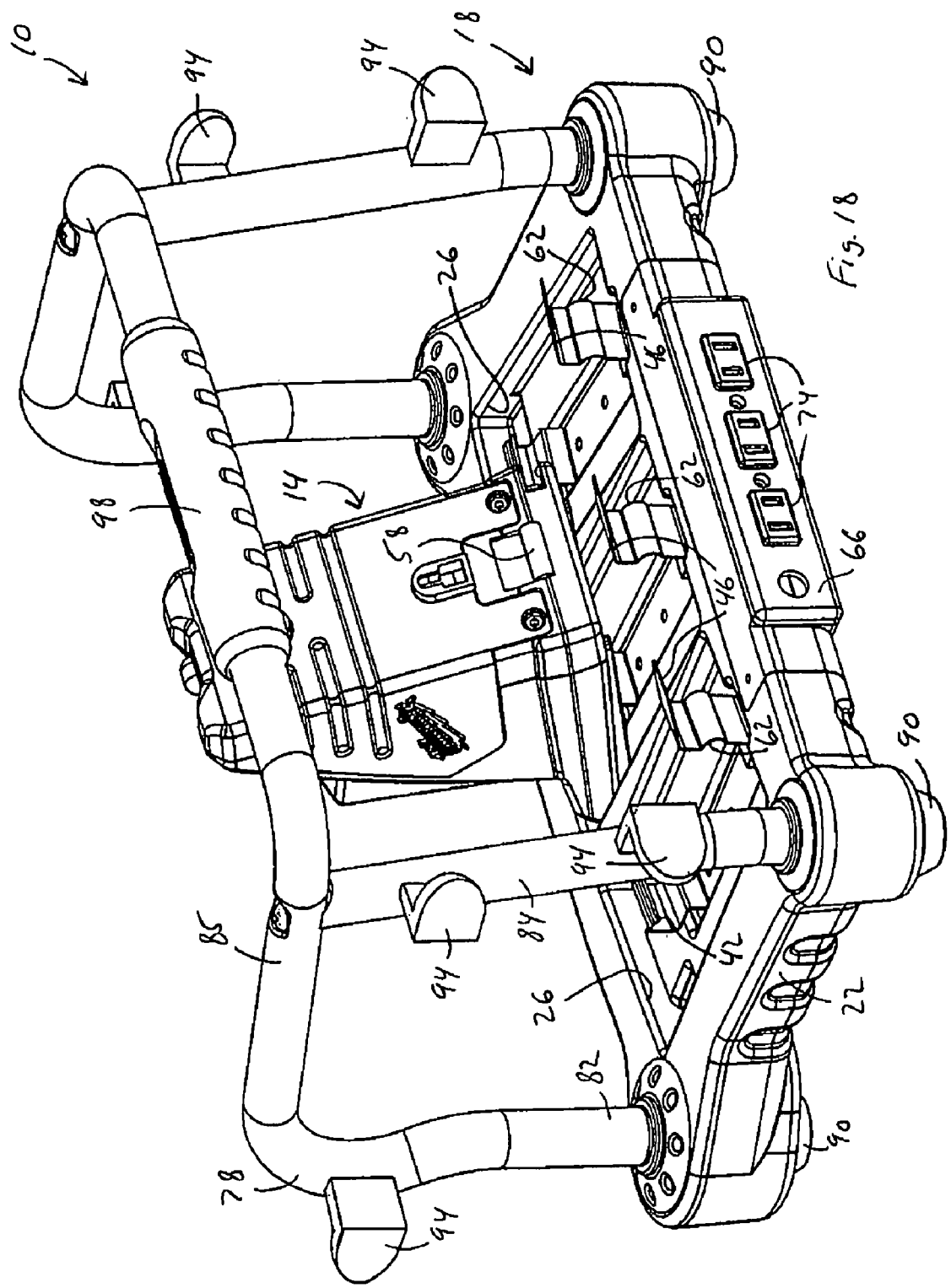
FIG. 18 is a rear perspective view of the caddy and partially attached charger of FIG. 17.
Figure 24:
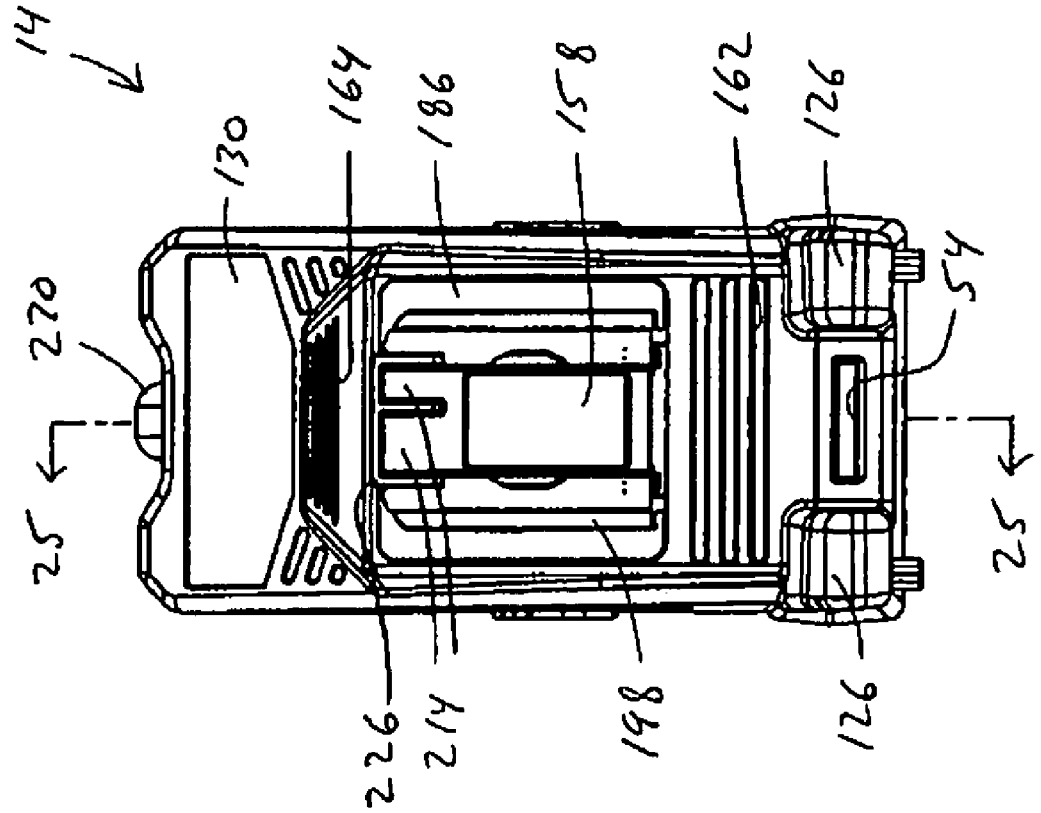
FIG. 24 is a front view of the charger of FIG. 22.

Also, as shown in FIGS. 1-4, 6-11 and 13-14b, multiple cleats 94 are connected to the handle 78 and braces 84. In the illustrated construction, the cleats 94 are utilized in three pairs to secure thereon the respective three power cords 76 of the three illustrated chargers 14. However, in other constructions of the battery charger assembly (not shown), more or less than three pairs of cleats 94 may be utilized depending on the number of corresponding attached chargers 14. Also, an additional pair of cleats (not shown) may be connected to the handle 78 and/or the braces 84 for securing thereon the main power cord 70 of the power strip 66. In the illustrated construction, the cleats 94 are integrally formed with the handle 78 and braces 84. FIGS. 8a and 14a illustrate the cleats 94 in a first configuration, while FIGS. 8b and 14b illustrate the cleats 94 in a second configuration.

An ergonomic grip 98 is centrally positioned on the handle 78 to provide a comfortable, sure and steady grip on the handle 78. The grip 98 may include an elastic, non-slip material covering to provide comfort while the battery charger caddy 18 is carried. In the illustrated construction, the handle 78 is made of two halves connected by the grip 98. However, in other constructions (not shown), the handle 78 may be made of a single component, such as, for example, a bar, having the grip 98 overmolded or integrally formed with the handle 78.

The handle 78 allows the user to carry the assembly 10 to and from a work site, with or without chargers 14 connected to the caddy 18, and with or without batteries 102 connected to the chargers 14. As shown in FIG. 7, the attached chargers 14 (one with an attached battery 102) are generally encompassed by a boundary defined by the base 22 and handle 78. As a result, the handle 78 also functions as a "roll bar," or protective structure. More particularly, the lower portion 82 of the handle 78 protects the front surfaces of the chargers 14 (and any attached batteries 102) from being impacted by an object or surface wider than the distance between the lower portion 82 of the handle 78. Similarly, the lower portion 82 of the handle 78, in combination with the braces 84, protects the side surfaces of the chargers 14 (and any attached batteries 102) from being impacted by an object or surface wider than the distance between the lower portion 82 and the braces 84. The base 22 protects the bottom surfaces of the chargers 14 (and any attached batteries 102) from being impacted during a fall or other impacting event.

While the top surfaces of the chargers 14 are generally unimpeded to allow easy connection and removal of the chargers 14 (and the connection and removal of batteries 102 relative to the chargers 14), the upper portion 85 may provide some protection to the top surfaces of the chargers 14 (and any attached batteries 102) from being impacted by an object or surface wider than the distance defined by the upper portion 85. In other constructions (not shown), an additional top cover (not shown) may be provided to protect the top surfaces of the chargers 14 (and any attached batteries 102).

If the assembly 10 were to fall or be impacted during movement around a work site, a combination of the base 22, handle 78 and braces 84 of the battery charger caddy 18 would help prevent the chargers 14, and any attached batteries 102, from jarring loose upon impact because the base 22, handle 78, or braces 84 will be impacted first. Therefore, one or more of the base 22, the handle 78 and the braces 84 protect stored chargers 14 and stored batteries 102 on the chargers 14 and at least partially provide protective structure.

In the illustrated construction, the bar-like handle 78 at least partially provides protective structure for the assembly 10. In other constructions (not shown), the protective structure may include a solid wall (not shown) that may extend from the outer surfaces of the housings 50 and surround surfaces of the chargers 14 (and any attached batteries 102) to recess the chargers 14 into the wall, while allowing access to the chargers 14 (and any attached batteries 102).

In yet other constructions (not shown), a cover or multiple covers (not shown) may enclose or partially enclose the chargers 14, with or without attached batteries 102, to protect them from impact. The cover or multiple covers may be removable/retractable manually or with insertion of the charger 14 and/or the battery 102.

Figure 43:
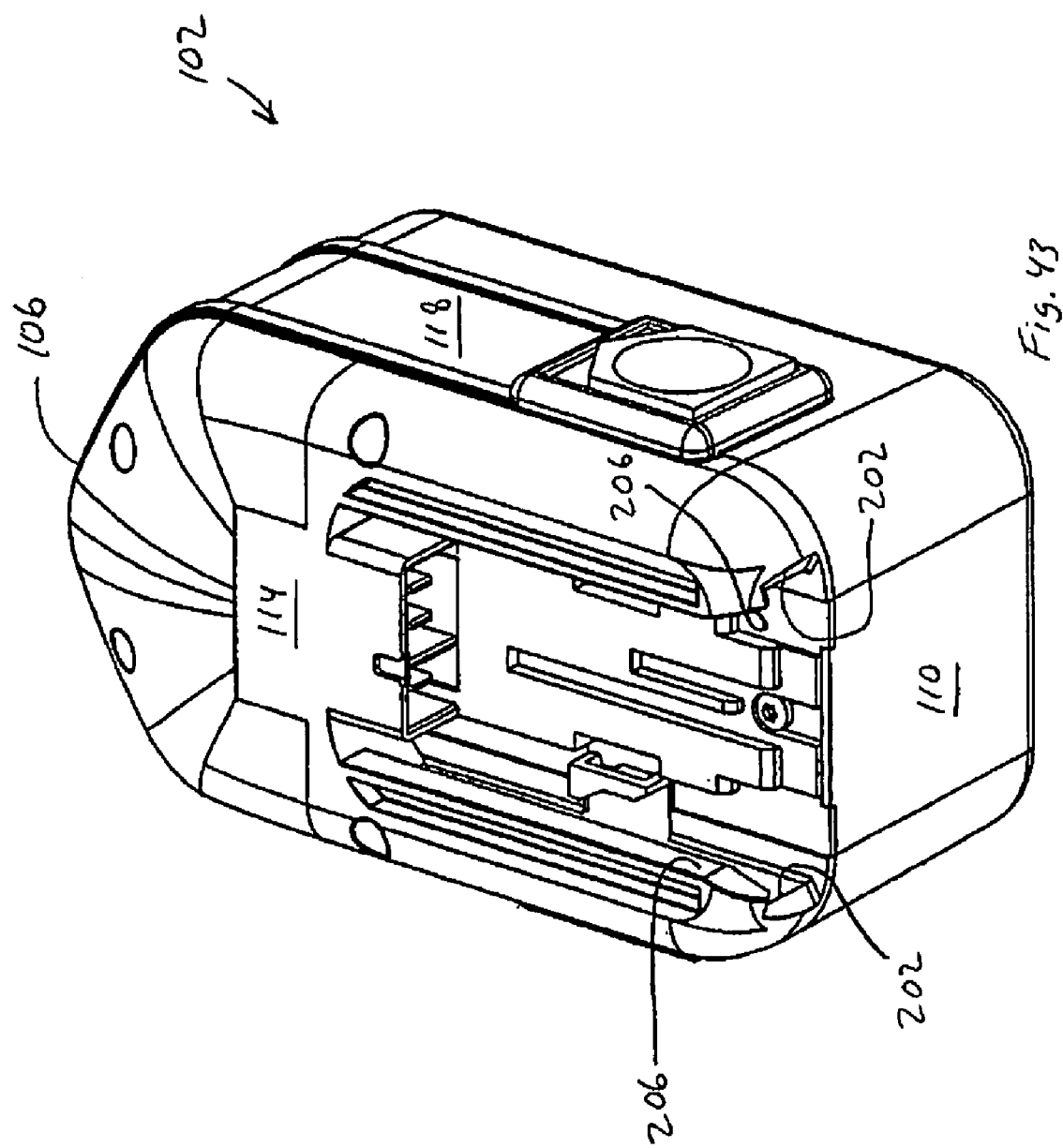
FIG. 43 is a top perspective view of a battery connectable with the port.

The chargers 14 also embody independent aspects of the invention. In some aspects and in some constructions, the chargers 14 are constructed for heavy-duty use in a harsh working environment (for electrical equipment) such as outdoor construction sites, machine shops, manufacturing floors, etc. The chargers 14 are operable to support and charge batteries 102, such as, for example, 12V, 14.4V, 18V, 24V, etc., or similar power tool or other equipment batteries 102 of various chemistries (NiCd, NiMH, Li, Li-ion, etc.). Generally, the batteries 102 include a top surface 106, a bottom surface 110, a front surface 114 and two side surfaces 118 to define a generally rectangular shape (see FIG. 43). However, the batteries 102 may define any number of shapes.

As shown in FIGS. 22-23, 25, and 29-30, the housings 50 generally define a substantially upright (i.e., extending more vertical than horizontal, in other words, having a height which is greater than a width and/or a depth) shape such that a battery 102 supported by a charger 14 is supported substantially upright. Also, since the housings 50 are substantially upright, multiple housings 50 are allowed to be supported adjacent each other on the caddy 18. The housing 50 also includes multiple feet 126 providing stability to the housing 50 when supporting a battery 102. The feet 126 help prevent the charger 14 from tipping when supporting a battery 102, which can be heavier than the charger 14 itself depending on the size and construction of the battery 102.

Figure 25:
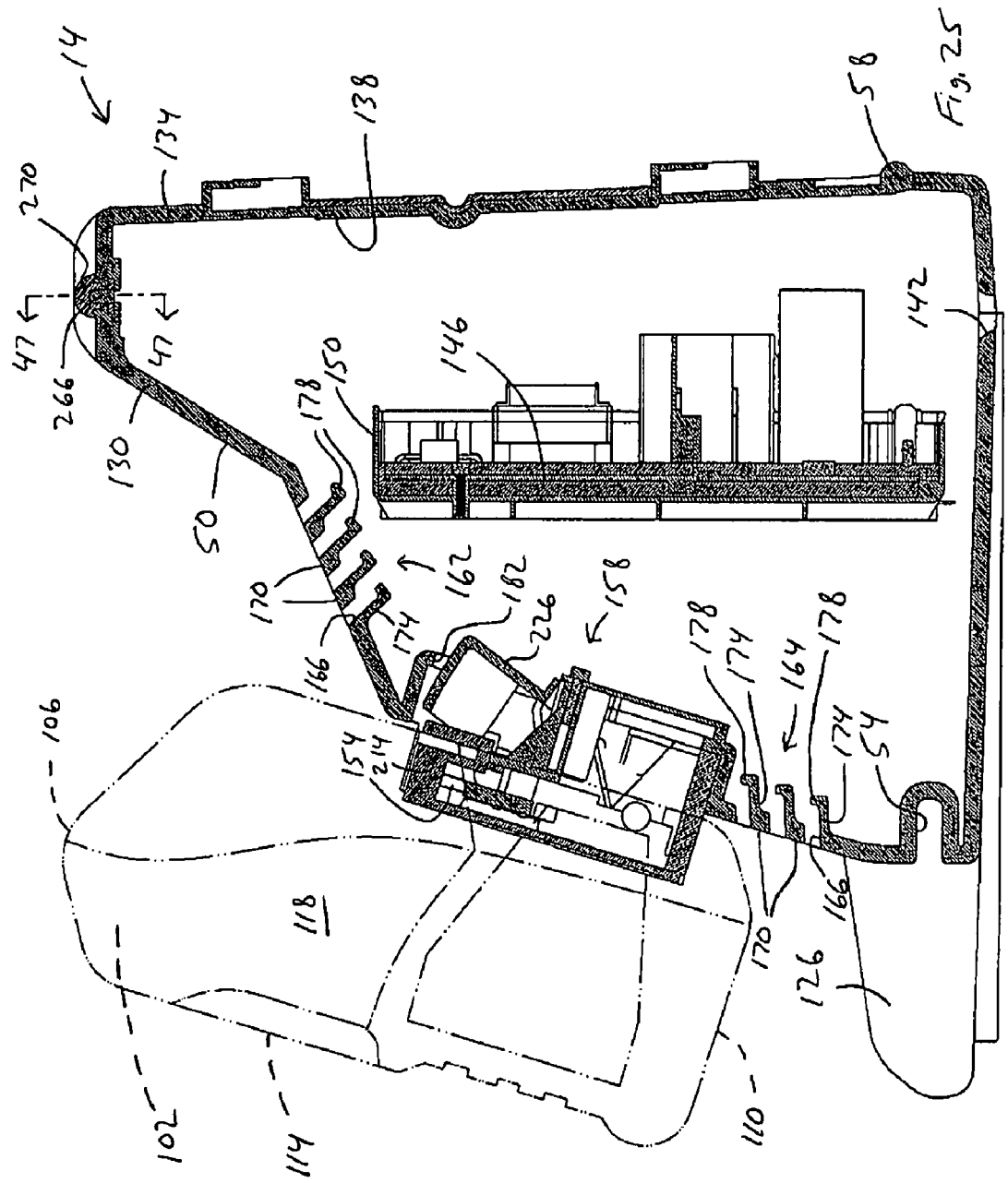
FIG. 25 is a cross-sectional view of the charger of FIGS. 22 and 24 along line 25-25 in FIG. 24, illustrating an attached battery in phantom.
Figure 26:
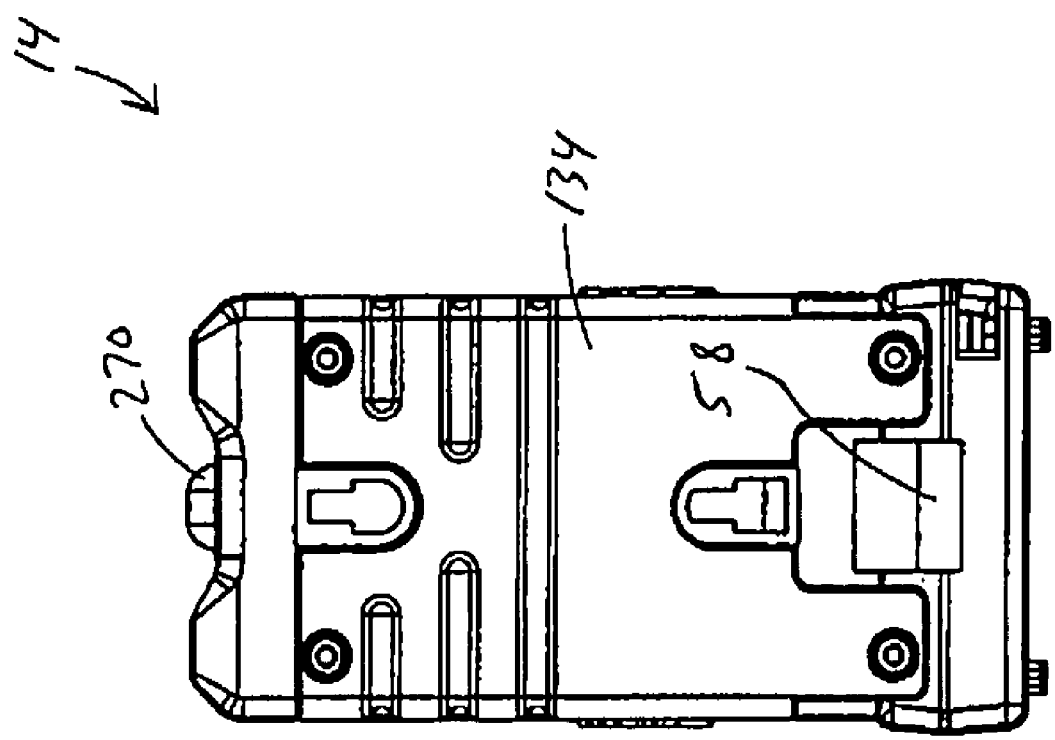
FIG. 26 is a rear view of the charger of FIG. 22.
Figure 27:
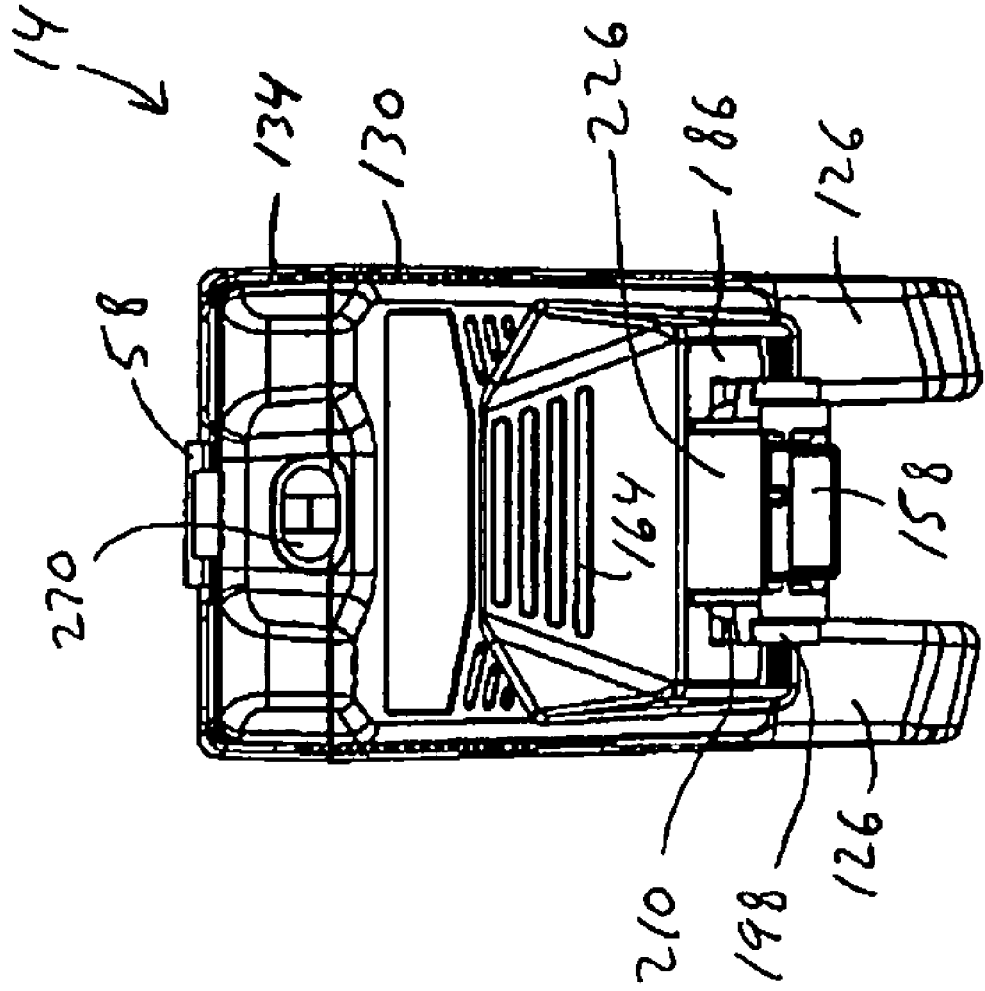
FIG. 27 is a top view of the charger of FIG. 22.
Figure 28:
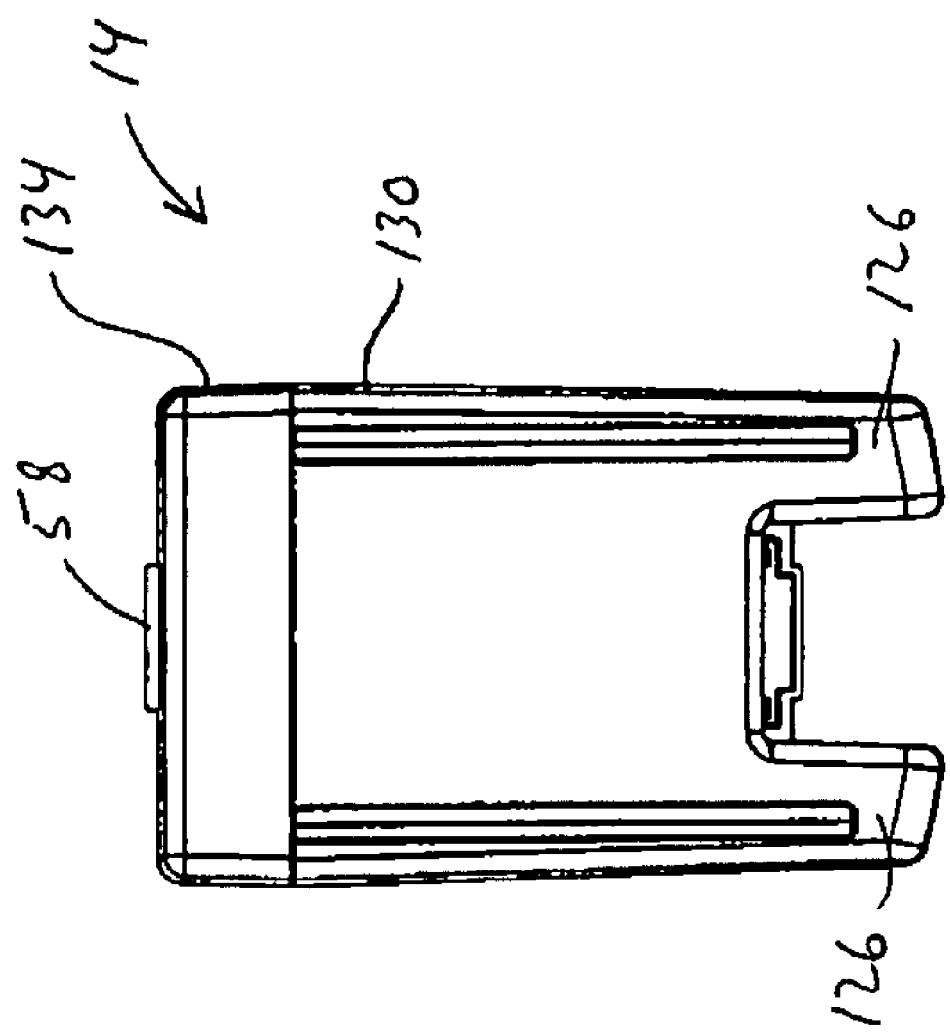
FIG. 28 is a bottom view of the charger of FIG. 22.
Figure 29:
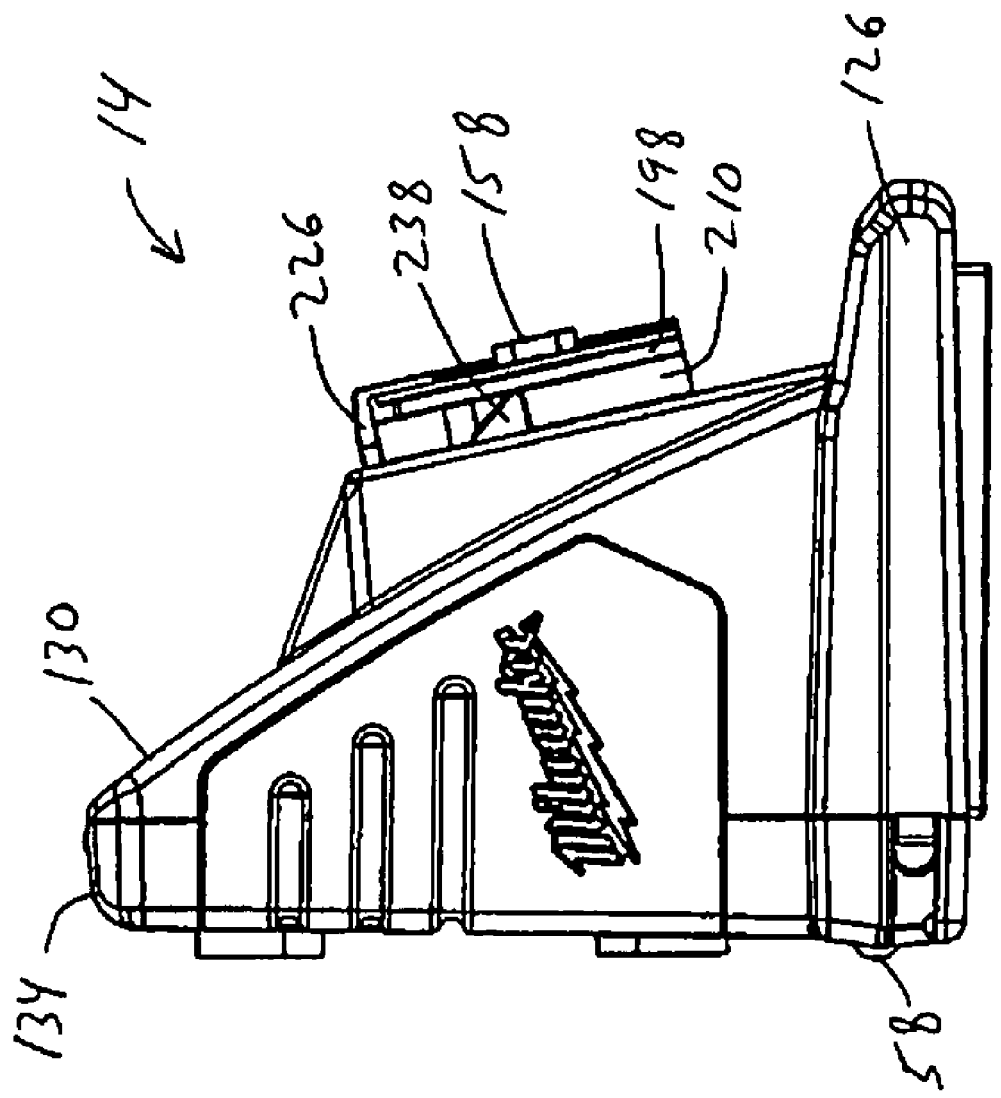
FIG. 29 is a left side view of the charger of FIG. 22.
Figure 30:
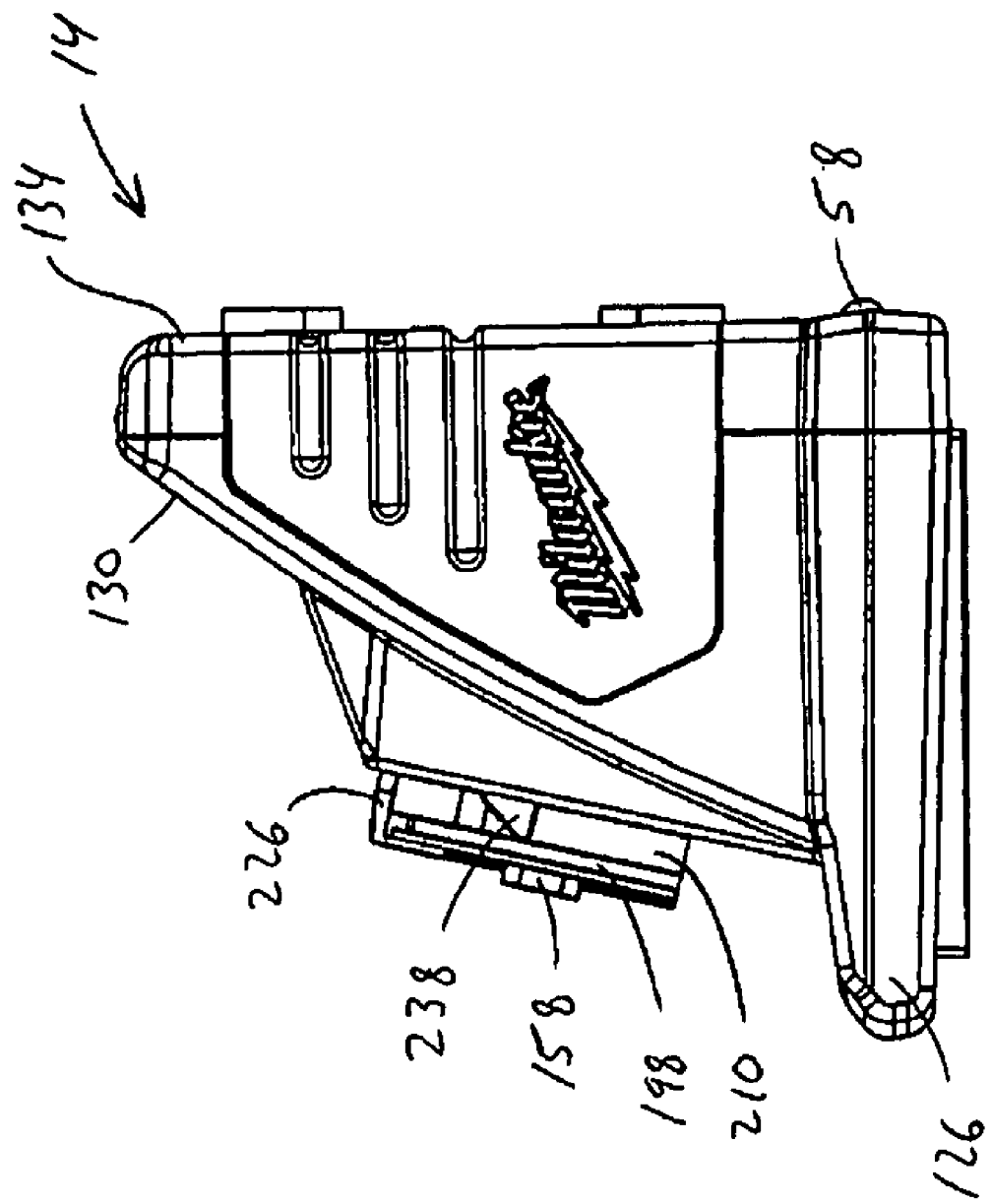
FIG. 30 is a right side view of the charger of FIG. 22.

As shown in FIG. 25, the charger housing 50 is manufactured of a plastic material as a two-piece design. A first shell 130 is connected to a second shell 134 to form a cavity 138 therebetween. A tongue and a groove (not shown) are utilized to mate the two shells 130, 134, and an o-ring (not shown) is positioned between the two shells 130, 134 to seal the interface between the two shells 130, 134. The two shells 130, 134 are also molded to define a low spot at the bottom of the housing 50 when the shells 130, 134 are mated. A drain 142 is positioned in the low spot to release any contaminant (i.e. dirt, sand, gravel, sawdust, metal shavings, water, oil, grease, etc.) that may enter the cavity 138.

The base 22 may also include one or more drains (not shown) positioned at respective low spots molded into each inset 26. Further, the drains 142 formed in the housings 50, and the one or more drains formed in the base 22 may be in fluid communication to allow any contaminants in the cavity 138 to be released through the drains. Further, the drains may be offset from one another so that direct access to the cavity 138 through the drains is prohibited.

With continued reference to FIG. 25, a charging circuit 146 is supported by a suspended and cushioned mounting board 150 housed within the cavity 138. The mounting board 150 is made of a flame-retardant material, such as a VØ-rated plastic. The charging circuit 146 and the mounting board 150 are formed as an assembly, and the charging circuit 146 is potted in the flame retardant material to seal and insulate the components of the charging circuit 146. The components of the charging circuit 146 are supported on the mounting board 150 with required spacing, sealing and insulation to meet UL requirements.

The cushioned mounting configuration of the mounting board 150 protects the charging circuit 146 during an impact. Such cushioning may be provided by any elastically deformable material (not shown), such as, for example, rubber washers, positioned between the board 150 and housing 50.

This mounting configuration also helps minimize exposure of the charging circuit 146 to any contaminant (e.g. dirt, sand, gravel, sawdust, metal shavings, water, oil, grease, etc.) that may enter the cavity 138. Any contaminant entering the cavity 138 will come to rest along an interior wall or adjacent walls of the housing 50, depending on the orientation of the housing 50. Therefore, with the charging circuit 146 suspended in the middle of the housing 50, it is unlikely any contaminants will contact or come to rest on the charging circuit 146.

The charging circuit 146 is connectable to the power source, such as the 110-VAC line power through the charger's power cord 76, or a DC power source. Charger terminals 154 on a battery port 158 connect the battery 102 to the charging circuit 146.

The charging circuit 146 may be similar to the charging circuit described in U.S. Pat. No. 6,222,343, issued Apr. 24, 2001, and U.S. patent application Ser. No. 09/672,620, filed Sep. 29, 2000, now U.S. Pat. No. 6,456,035, issued Sep. 24, 2002, which are hereby incorporated by reference.

The charging circuit 146 may also be similar to the charging circuit described in co-pending U.S. Provisional Patent Application Ser. No. 60/440,692, filed Jan. 17, 2003, which is hereby incorporated by reference.

As shown in FIG. 25, lower and upper air vents 162, 164 are defined in the first shell. The air vents 162, 164 include ascending and stepped passageways 166 into the cavity 138. Structure defining each passageway 166 includes an outer lip 170, a spacer portion 174, which may have a substantially flat surface, and an inner lip 178 toward the end of the portion 174. This structure helps to prevent any solid (i.e. dirt, sand, sawdust, metal shavings, etc.) or liquid (i.e. water, oil, grease, etc.) contaminants from entering the cavity 138. The outer lip 170 will deflect contaminants. To enter the cavity 138, the structure of the air vents 162, 164 requires any contaminant to first penetrate the exterior of the housing 50, move along the substantially flat surface of the portion 174, and then ascend past the level defined by the inner lip 178. This tortuous path prevents unforced entry of any solid or liquid contaminants into the housing 50. However, if contaminants were to enter the cavity 138, such contaminants would be released through the drain 142.

Generally, during operation of the charger 14, heat is generated by the charging circuit 146. Through unforced convection, cooling air is drawn through the lower air vents 162 into the cavity 138 and flows across the heated charging circuit 146. The cooling air is heated by the charging circuit 146, causing the heated air to rise and escape the cavity 138 through the upper air vents 164.

In other constructions of the battery charger (not shown), the charger may utilize electrically operated fans to cool the heated charging circuit 146 rather than unforced convection through air vents 162, 164. Also, heat removal elements (not shown) such as, for example, heat sinks, heat pipes, etc. may be incorporated into the battery charger to draw heat from the charging circuit 146.

Figure 35:
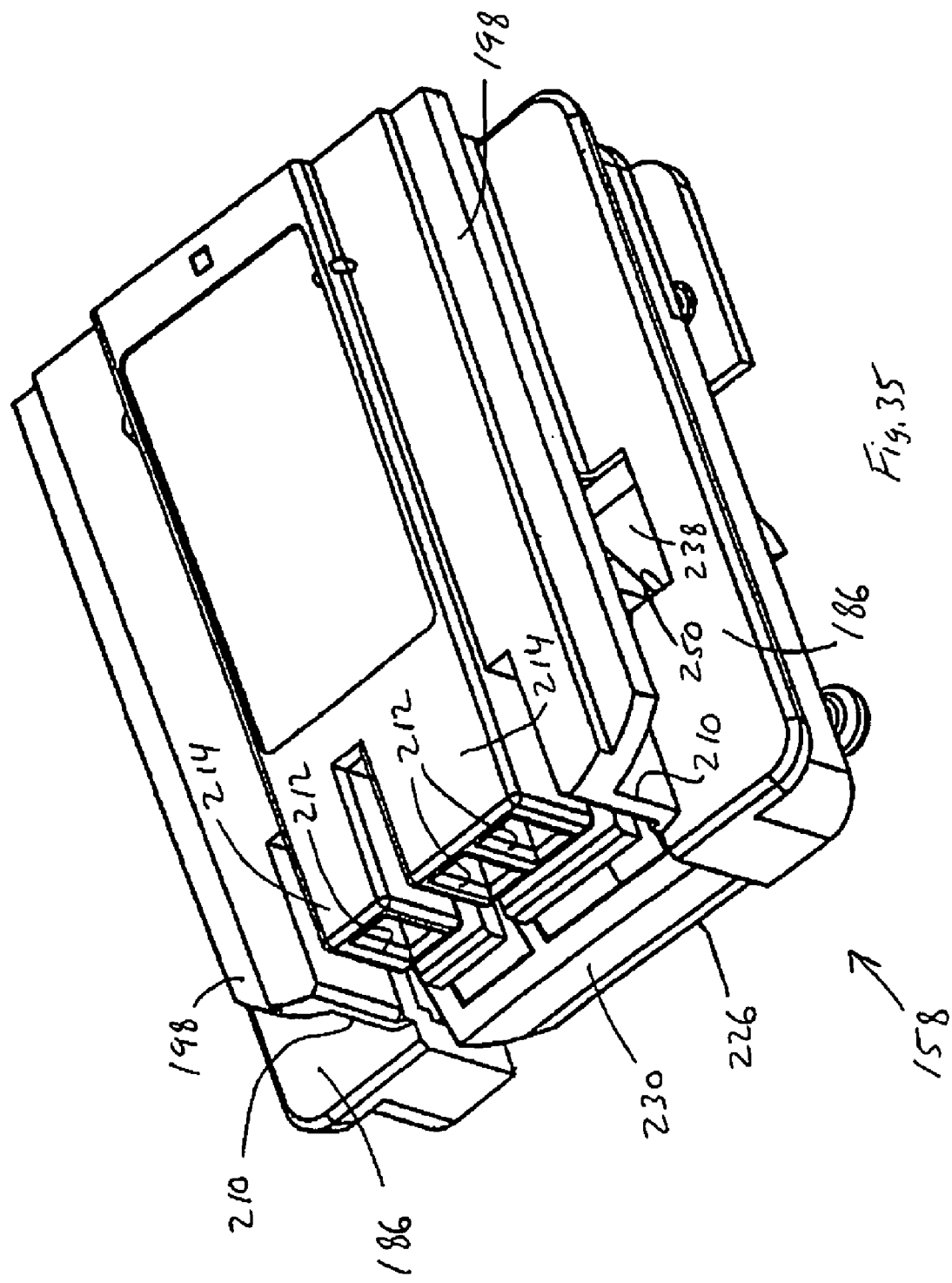
FIG. 35 is a front perspective view of the port removed from the charger.
Figure 36:
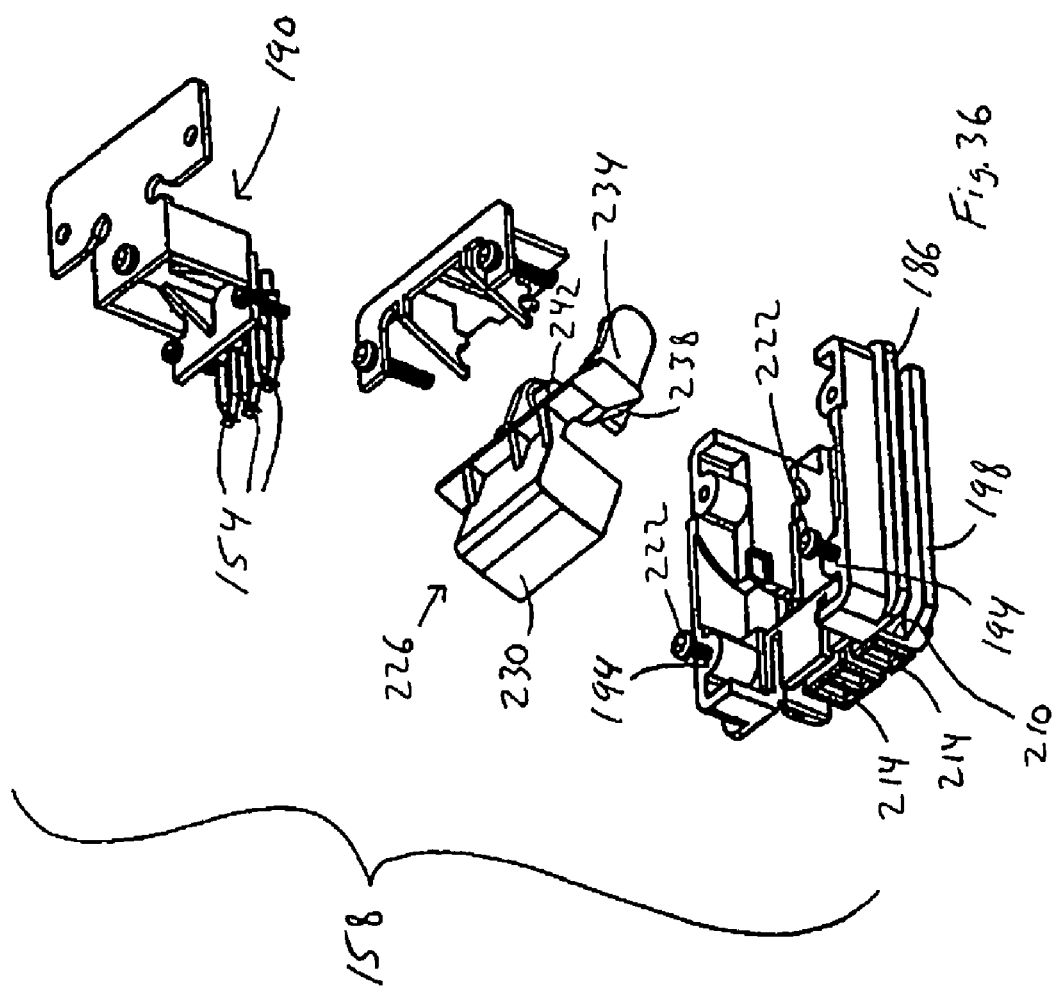
FIG. 36 is an exploded perspective view of the port of FIG. 35.
Figure 37:
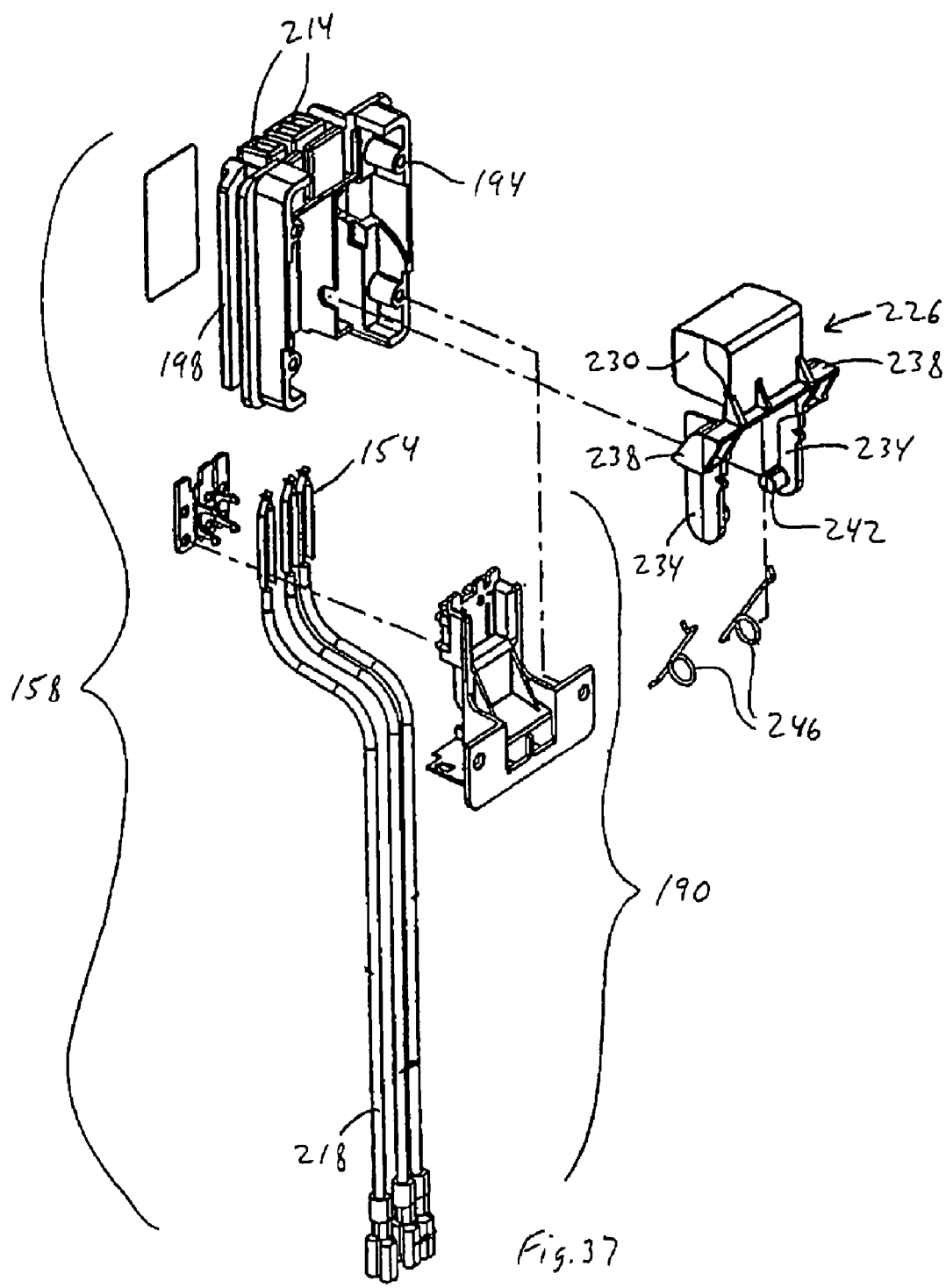
FIG. 37 is another exploded perspective view of the port of FIG. 35, illustrating electrical leads connected with the port.

As shown in FIG. 25, an opening 182 is molded into the first shell 130 to accommodate a single battery port 158. As shown in FIG. 35, the battery port 158 includes a battery mounting portion 186, a terminal assembly 190 and a mounting portion 194. The battery mounting portion 186 includes battery port projections 198 to guide the battery 102 as the battery 102 engages with the port 158. The battery port projections 198 engage matching battery grooves 202 (shown in FIG. 43) on the battery 102 to provide positive alignment with and support on the port 158. Similarly, battery projections 206 engage matching battery port grooves 210 to provide positive alignment with and support on the port 158. As shown in FIGS. 32-34, a series of charger terminals 154 (part of the terminal assembly 190) are recessed within openings 212 in terminal supports 214 on the port 158. Electrical leads 218 connect the charging circuit 146 with the terminals 154 of the port 158. The mounting portion 194 further includes fasteners 222 that connect the port 158 with the housing 50.

The battery port 158 is connected to the housing 50 in a sturdy manner such that if the charger 14 falls with the battery 102 attached, the port 158 will not break off the housing 50. The battery port 158 is designed to survive a fall from about at least 4 feet with an attached battery 102 without breaking off the housing 50.

At least portions of the charger 14 through which power is transferred are formed of flame-retardant material, such as VØ rated plastic. These portions may include the charging circuit 146, the mounting board 150 and the battery port 158. As a result, other portions of the housing 50 may be formed of other materials.

In the illustrated construction, as explained in U.S. Pat. Nos. 6,222,343 and 6,456,035, the battery 102 supplies power to the charging circuit 146 to initiate charging. Even with the charger 14 connected to a power source, no power is provided at the terminals 154 if the battery 102 is not connected to the terminals 154. Therefore, if the battery 102 is not attached to the port 158, there is zero potential between the terminals 154 of the port 158. This helps ensure the charging circuit 146 cannot be shorted out when the battery 102 is not attached to the port 158 and reduces the risk of electrical shock when the battery 102 is not attached.

Figure 38:
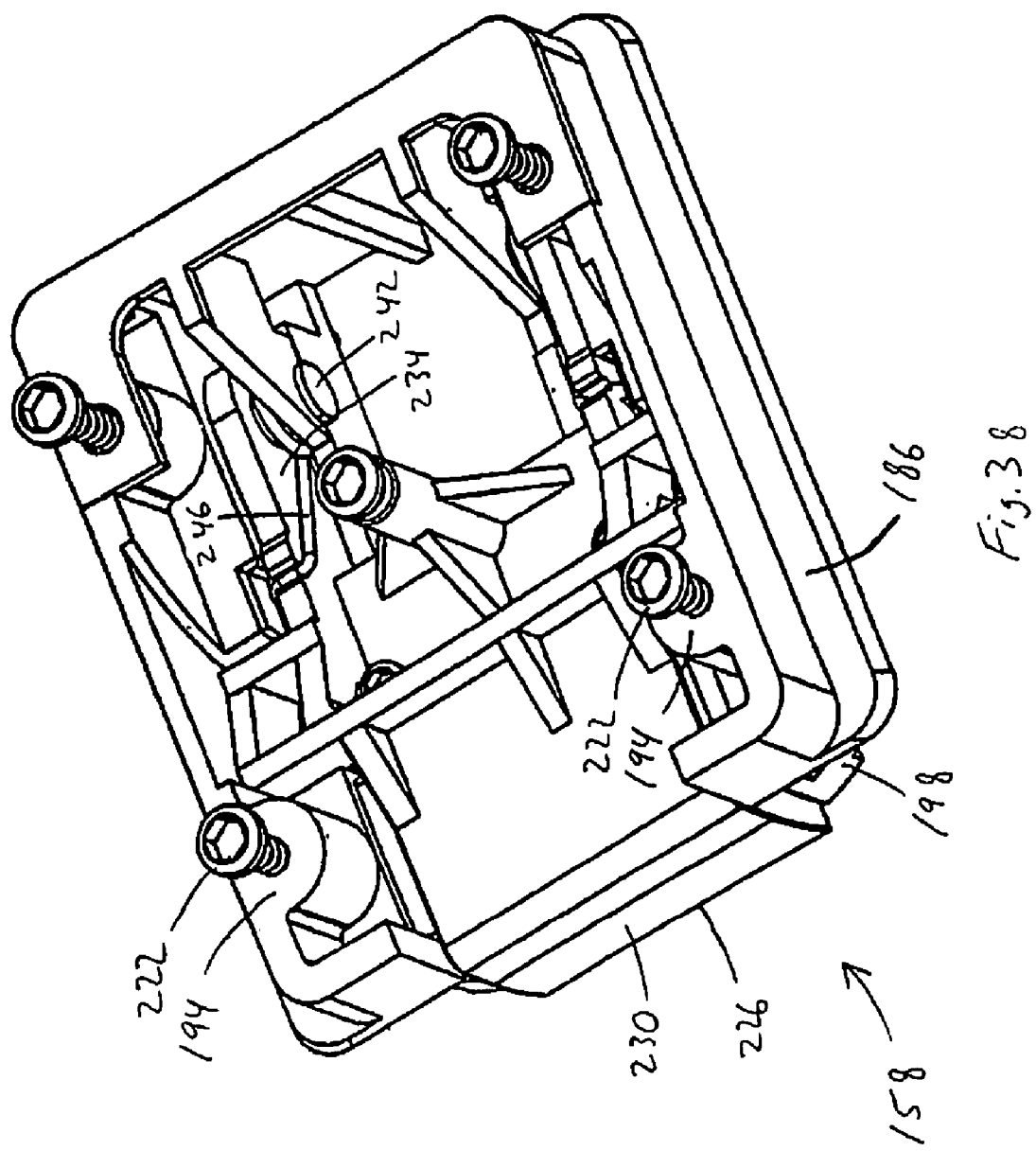
FIG. 38 is a rear perspective view of the port of FIG. 35, illustrating mounting hardware and components involved with mounting the port to the charger housing.
Figure 39:
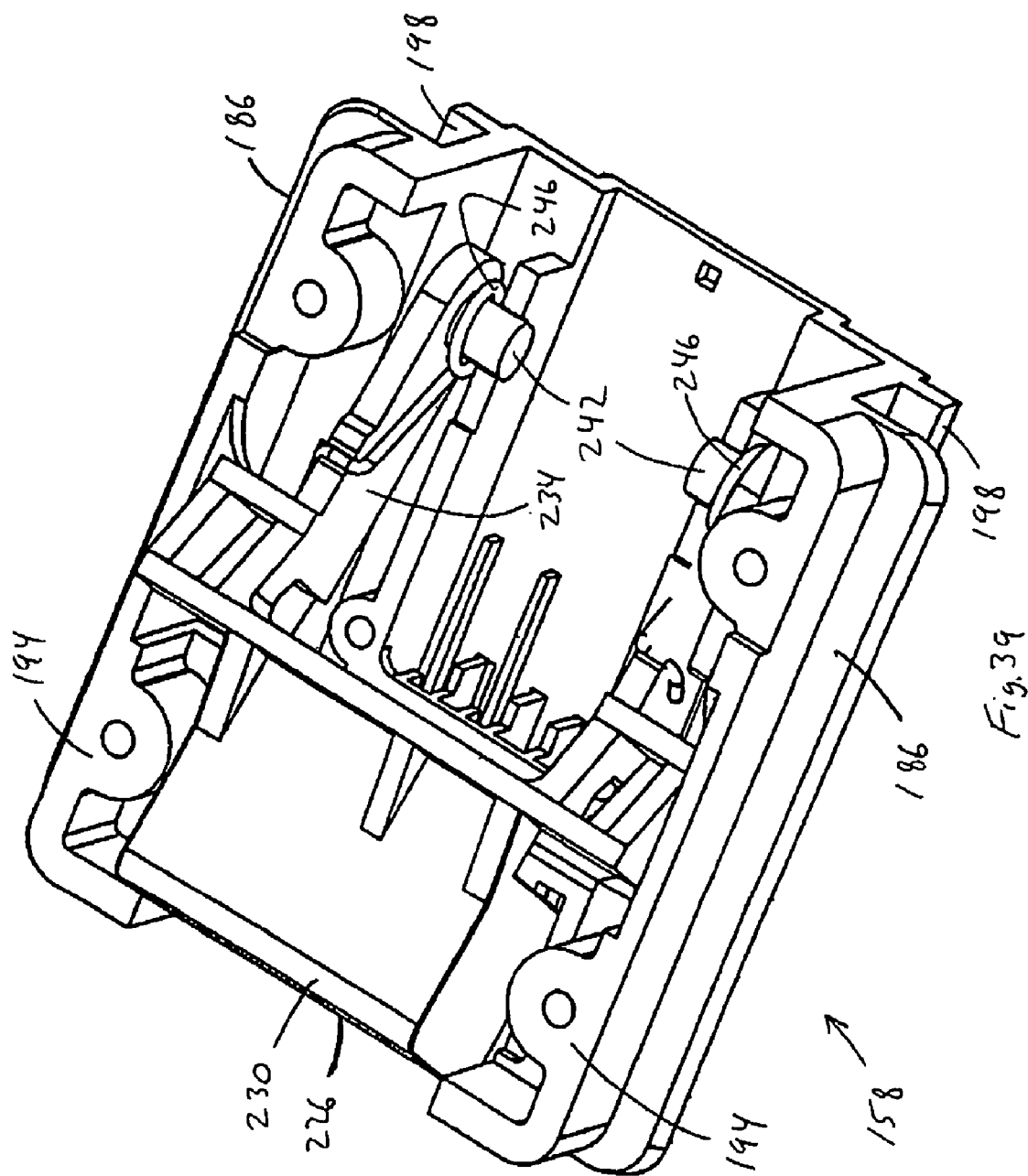
FIG. 39 is a rear perspective view similar to that of FIG. 38 with portions removed and showing the pivoting structure of a terminal cover.
Figure 40:
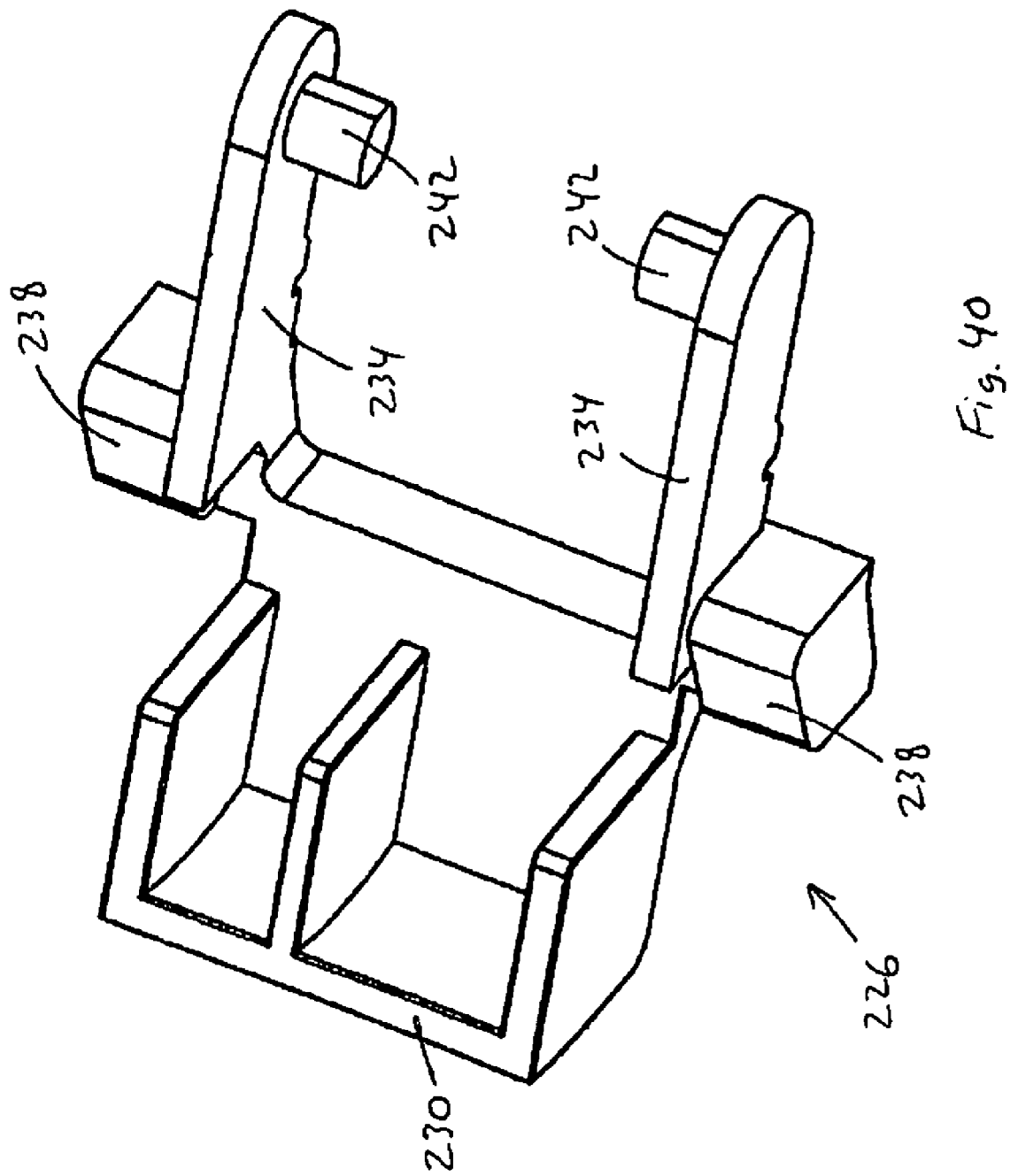
FIG. 40 is a front perspective view of the terminal cover removed from the port.
Figure 41:
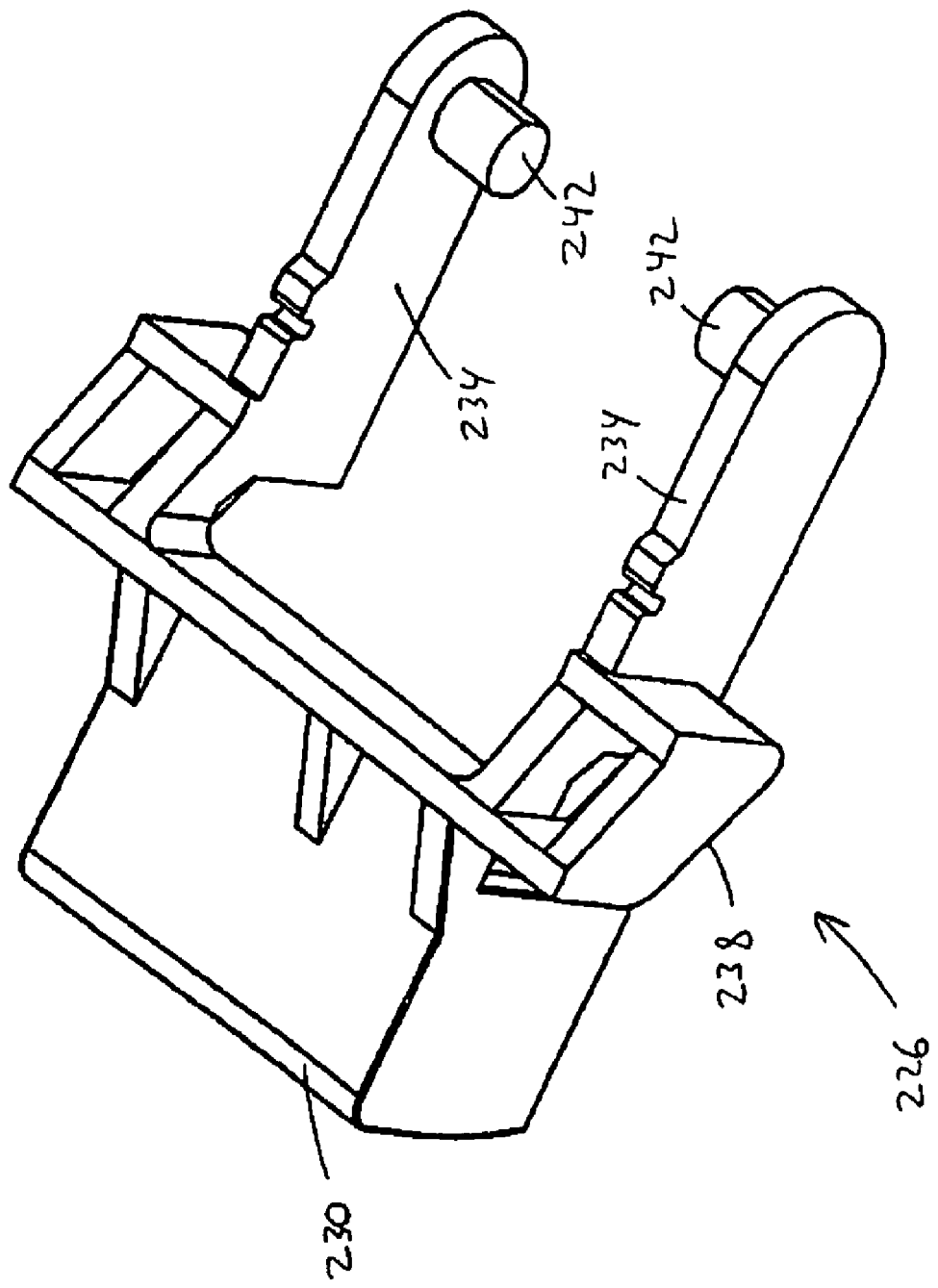
FIG. 41 is a rear perspective view of the terminal cover of FIG. 40.
Figure 42:
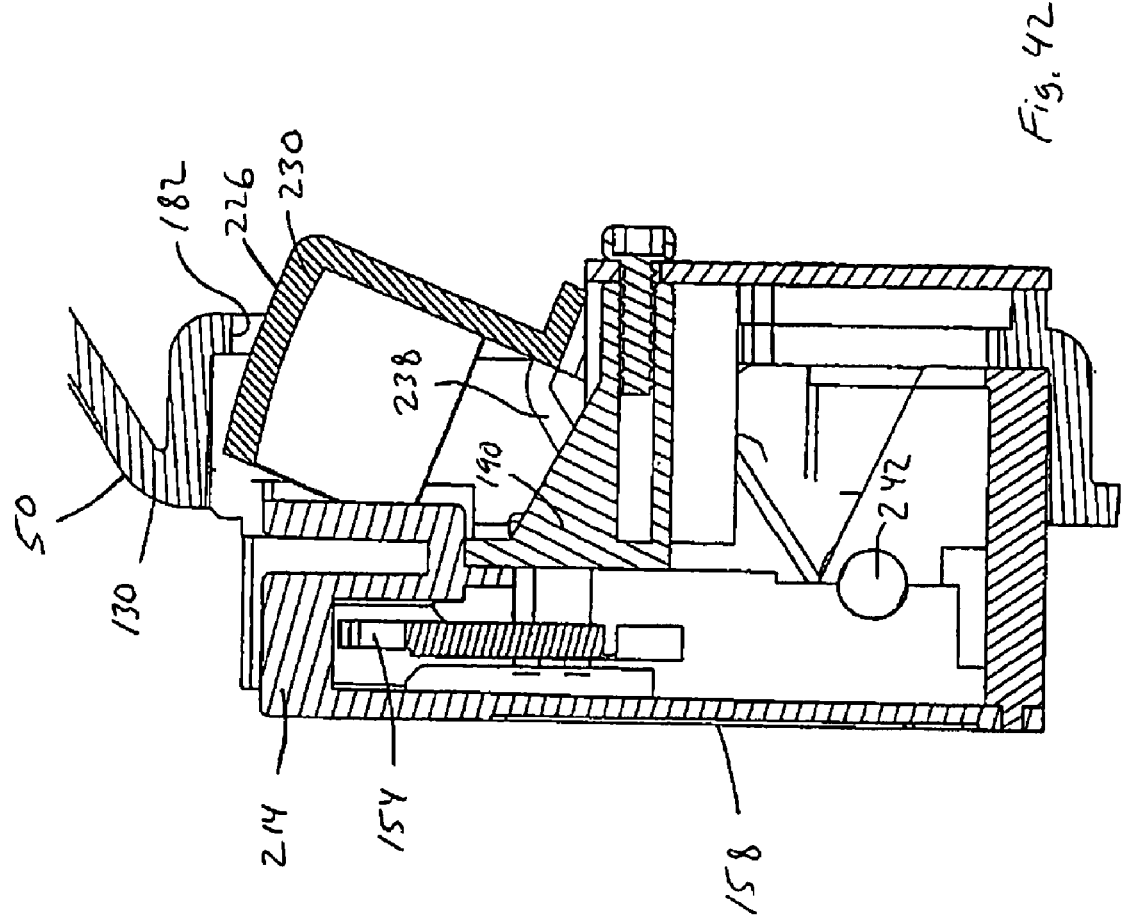
FIG. 42 is an enlarged view of a portion of the charger shown in FIG. 25, with battery removed.

As shown in FIGS. 35-39, the battery port 158 also includes a terminal cover 226 that is, in the illustrated construction, spring-biased to cover the terminal supports 214. As shown in FIGS. 40 and 41, the terminal cover 226 includes a hood 230 having a mounting stem 234 on each side. A ramp 238 is positioned on each stem 234 between the hood 230 and a pivot 242, where the cover 226 is attached to the port 158. FIGS. 33 and 38-39 illustrate the cover 226 assembled with the port 158. Biasing members, such as, in the illustrated construction, torsion springs 246, are positioned between the port 158 and the mounting stems 234 to bias the hood 230 to a covered position over the openings 212 in the terminal supports 214.

In the illustrated construction, the action of sliding the battery 102 onto the battery mounting portion 186 causes the terminal cover 226 to pivotally retract to uncover the openings 212 in the terminal supports 214 and expose the terminals 154 to the battery 102. Specifically, the battery mounting portion 186 includes an opening 250 through which the ramps 238 project. The battery projections 206 engage the ramps 238 upon engaging the battery mounting portion 186. The ramps 238 include a slope sufficient to cause the terminal cover 226 to pivot against the biasing force of the springs 246, thereby exposing the terminal supports 214 and the terminals 154 to the battery 102. When the battery 102 is removed, the springs 246 force the cover 226 to pivot back over the terminal supports 214. The biasing force is sufficient to close the cover 226 without preventing attachment of the battery 102.

As shown in FIG. 25, the terminal cover 226 retracts into the cavity 138 when actuated by battery insertion. The cover 226 moves along a path to sweep away contaminants and to clear the interconnection between the port 158 and the battery 102. The terminal cover 226 also helps minimize the exposure of the terminals 154 to the outside environment. When closed, the cover 226 deflects contaminants (i.e. dirt, dust, sand, water, oil, grease, etc.) from adhering to the terminals 154 and adversely affecting the electrical connection between the charging circuit 146 and the battery 102.

In alternate constructions (not shown) and in some aspects of the invention, the terminal cover 226 may move in a different manner, such as linearly sliding away from the terminal supports 214, rather than pivoting away from the terminal supports 214 upon the battery 102 engaging the ramps 238. Also, the terminal cover 226 may be operable by the user, such as by depressing a button to retract the terminal cover 226.

Figure 44:
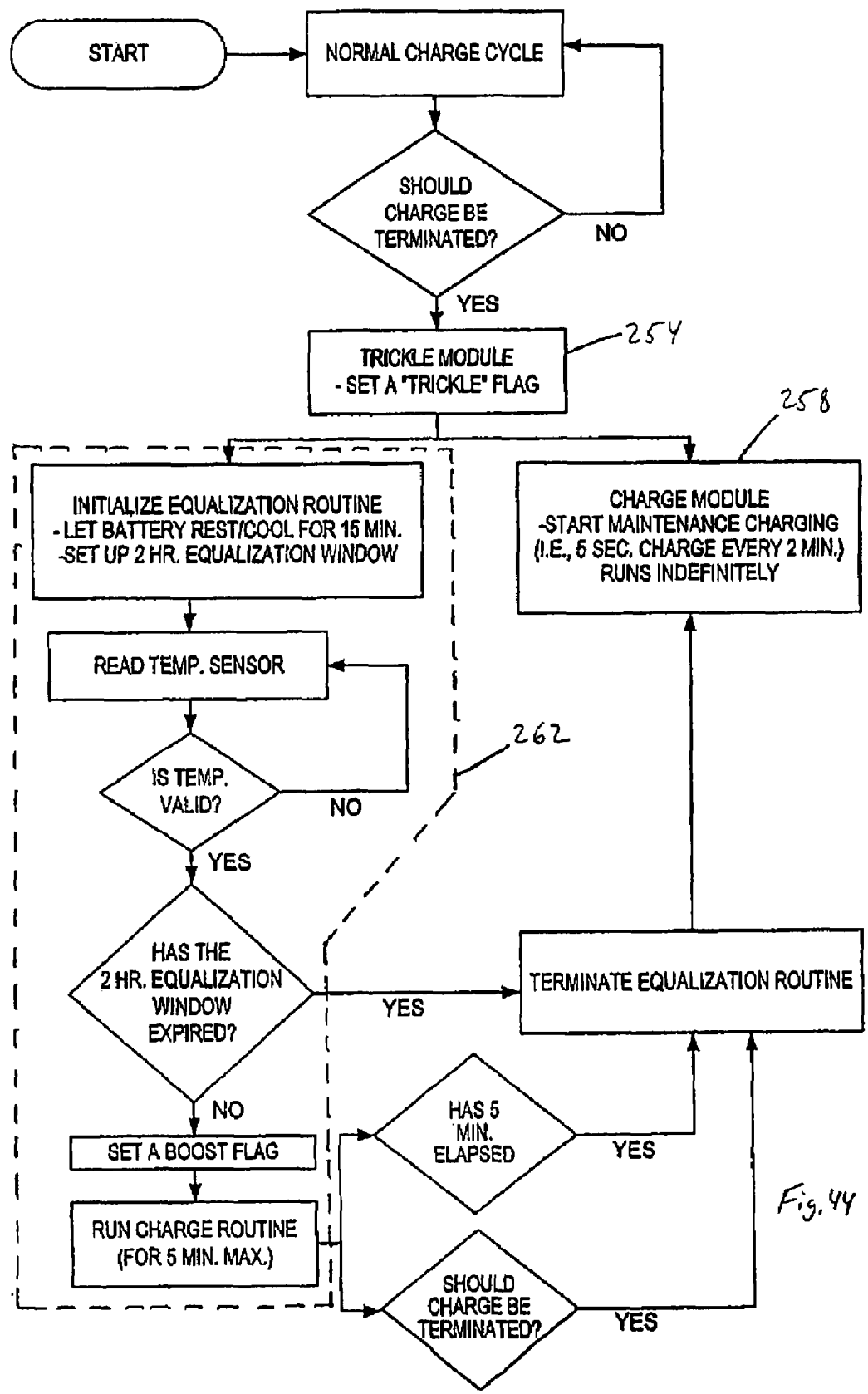
FIG. 44 is a flow chart illustrating a software functional description of the acts involved with charge execution.

As shown in FIG. 44, a plurality of charge termination protocols, including a temperature rate ("TR") termination protocol, and firmware modules, including a trickle module 254, a charge module 258 and an equalization module 262, provide control of battery charging.

The TR charge termination protocol monitors the rate of temperature increase of a battery 102 during a charging cycle and terminates the charge flow when the battery 102 reaches a predetermined rate temperature change. The TR protocol also accounts for thermal lagging which causes the battery 102 to continue heating after removal of the charging current. The TR protocol provides a reduction in battery charge time, a control of heat increase due to charging, and an increase in battery life.

The firmware executes code that monitors the normal charge cycle of a battery 102. The charge cycle may be terminated by the TR termination protocol as previously described. Termination of the normal charge cycle results in execution of code pertaining to the trickle module 254. The trickle module 254 is operable to set a "trickle" flag in software that corresponds to termination of the normal charge cycle and initiation of the trickle module 254. Setting the trickle flag initiates the charge module 258 and the equalization module 262. The charge module 258 is operable to impose a maintenance charge on the battery 102 whereby a current pulse is applied to the battery 102 for approximately five seconds every two minutes.

The equalization module 262 executes code that allows the battery 102 to rest and cool for approximately fifteen minutes and sets a time limit for the equalization to occur. If the equalization module 262 does not execute within the time limit, the module 262 terminates and the charge module 258 continues the maintenance charge. While within the time limit, a sensor monitors the temperature of the battery 102. If the temperature is in an acceptable range, a "boost" flag is set in software. Setting the boost flag initiates a boost charge cycle, for which the maximum duration is set by a boost timer. The boost timer is typically 5 minutes, however, other values are possible depending on the type and capacity of the battery 102. Either the boost timer or one of the charge termination protocols, such as the TR protocol, is operable to terminate the boost charge cycle. If the boost timer expires before a charge a termination protocol executes, the equalization module 262 terminates and the charge module 258 continues the maintenance charge.

The equalization module 262 executes once per charging cycle and serves to charge the battery 102 toward 100% of rated charge capacity. The TR termination protocol controls the charging current level during execution of the equalization module 262. The rate of heating is typically lower than seen during the normal battery charge cycle. Supplying a charge flow at a reduced heating rate increases the charge of the battery 102 toward maximum capacity while minimizing the heating stress imposed on the battery 102 by the charger 14.

For example, with Nickel metal-Hydride ("NiMH") batteries, a NiMH battery is charged at a normal current level (about 3.0 amps) using the TR termination protocol. The expected temperature at the point of charge termination should be about 40 degrees Celsius, or about 15 degrees above the ambient air temperature. Due to thermal lagging, the NiMH battery may continue to heat for between about 15-30 minutes after charge termination, where an additional 5-7 degree Celsius rise is usually experienced.

The equalization module 262 includes the following operating steps upon TR charge termination. If the battery 102 is left on the charger 14, the battery 102 will eventually cool. After cooling, the battery 102 is between about 90-95% charge capacity. When the battery 102 has cooled below 30 degrees Celsius, the equalization module 262 executes code that initiates further charging at a specific charge rate, such as, for example, a rate that provides a one degree Celsius battery temperature increase per minute. Using this routine, the NiMH battery is capable of accepting the remaining 5-10% of charge capacity.

Figure 45:
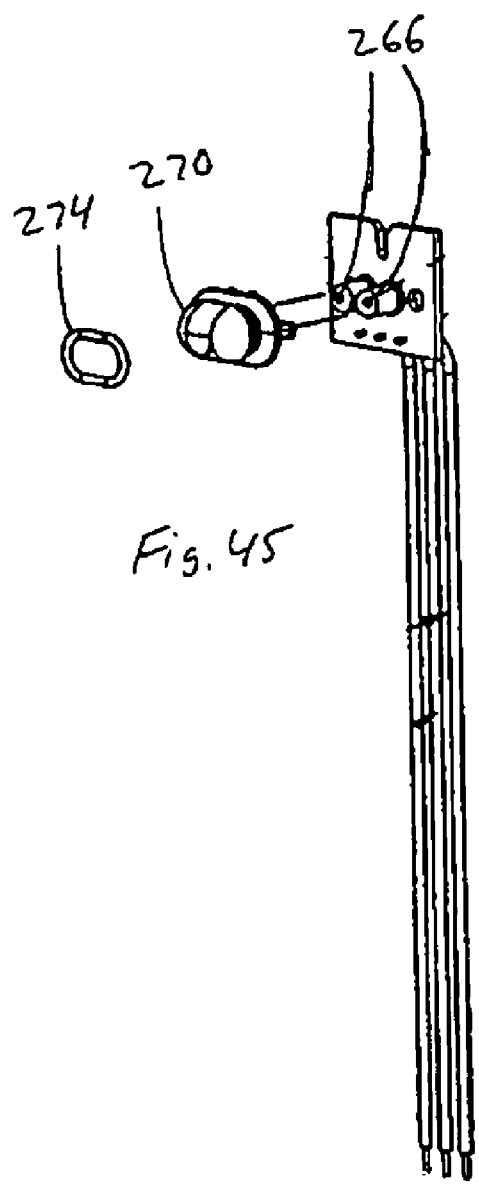
FIG. 45 is an exploded perspective view of an LED charge status indicator assembly.
Figure 47:
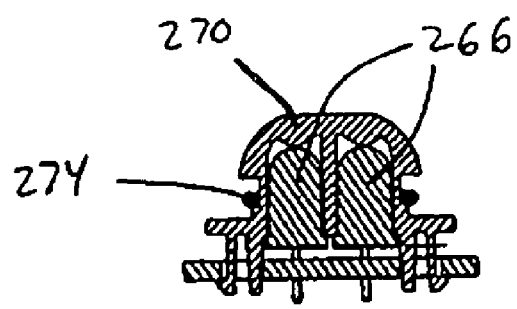
FIG. 47 is a cross-sectional view of the indicator assembly along line 47-47 of FIG. 25.
Figure 46:
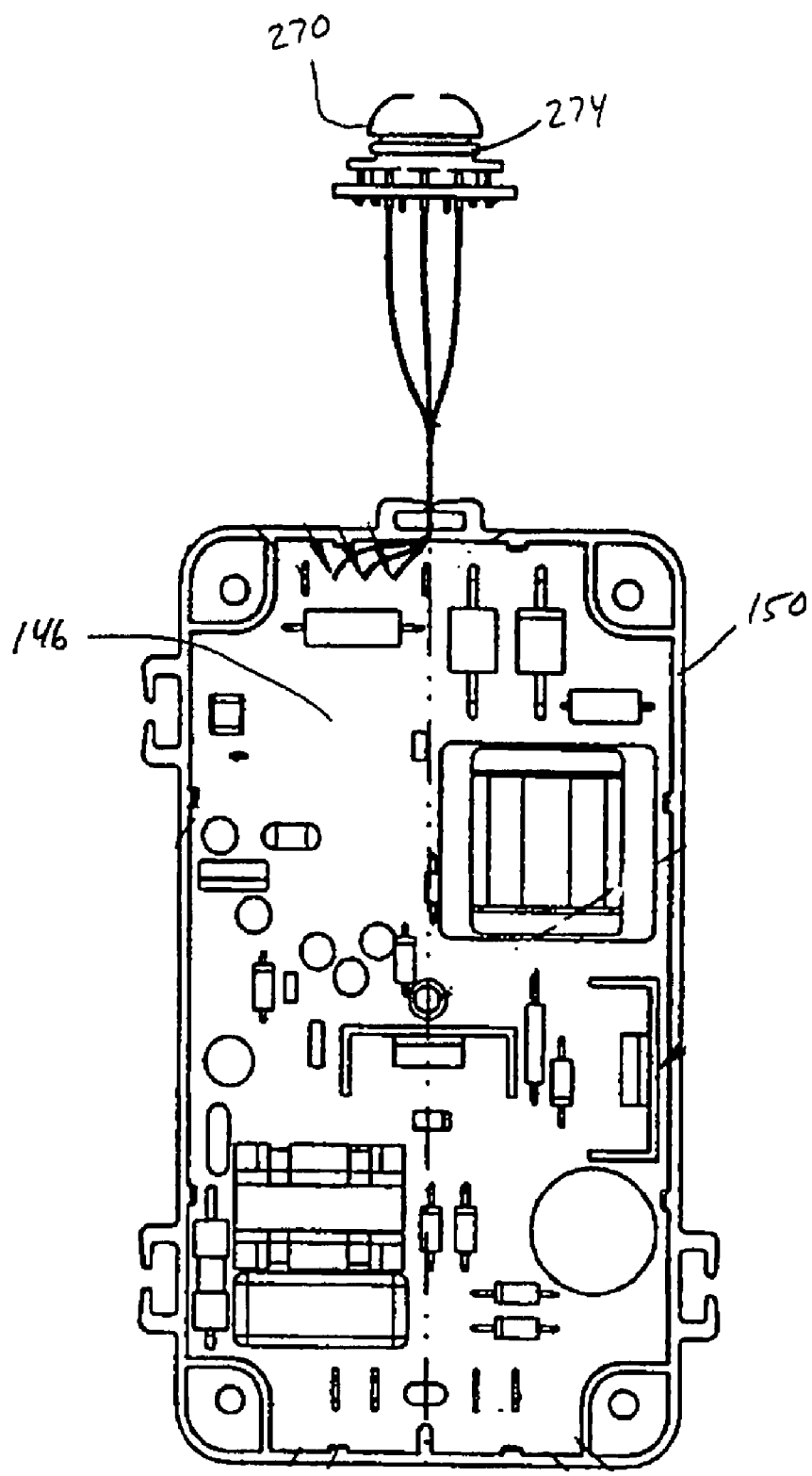
FIG. 46 is a rear view of a mounting board including a charging circuit and showing the LED charge status indicator assembly electrically connecting with the charging circuit.

As shown in FIGS. 45-47, charge status indicators, including light-emitting diodes 266 ("LED"), are electrically connected with the charging circuit 146 to relay the charging status of the battery 102 to the user. The LEDs 266 are designed to emit an amount of light necessary to overcome the intensity of outdoor sunlight. The LEDs 266 are positioned outside of the housing 50 so that the outer perimeter is generally viewable from any direction relative to the housing 50. For example, if the charger 14 was positioned on a surface at eye level (in which the top side of the charger 14 is not viewable), the outer perimeters of the LEDs 266 are still viewable because the LEDs 266 project from the top side of the housing 50. Each LED 266 also includes an LED cover 270 that encloses the portion of the LED 266 that projects from the housing 50. The covers 270, in addition to protecting the LEDs 266, also diffuse the light emitted by the LEDs 266 to increase the viewable distance and viewable angle of the LEDs 266. A gasket 274 is positioned between the cover 270 and the housing 50 to help prevent contamination from entering the housing 50 through the openings in the housing 50 for the LEDs 266.

In other constructions, the LEDs 266 may be positioned on any viewable surface of the housing 50, rather than the top surface of the housing 50. In other constructions (not shown), other visual indicators such as, for example, a potentiometer-based needle or a liquid crystal display window to provide digital charge status information, may be provided.

In other constructions (not shown) and in some aspects of the invention, the charger may utilize an audio indicator rather than a visual indicator to relay battery charge status to the user. Such audio indicators may include electronic bells, chimes, a pre-recorded voice message, etc.

An alternative construction of a battery charger assembly 10A is illustrated in FIGS. 48-71. Reference is made to the above discussion regarding the structure, operation, and alternatives of the battery charger assembly 10 illustrated in FIGS. 1-21. Common elements are identified by the same reference numbers "A".

Figure 48:
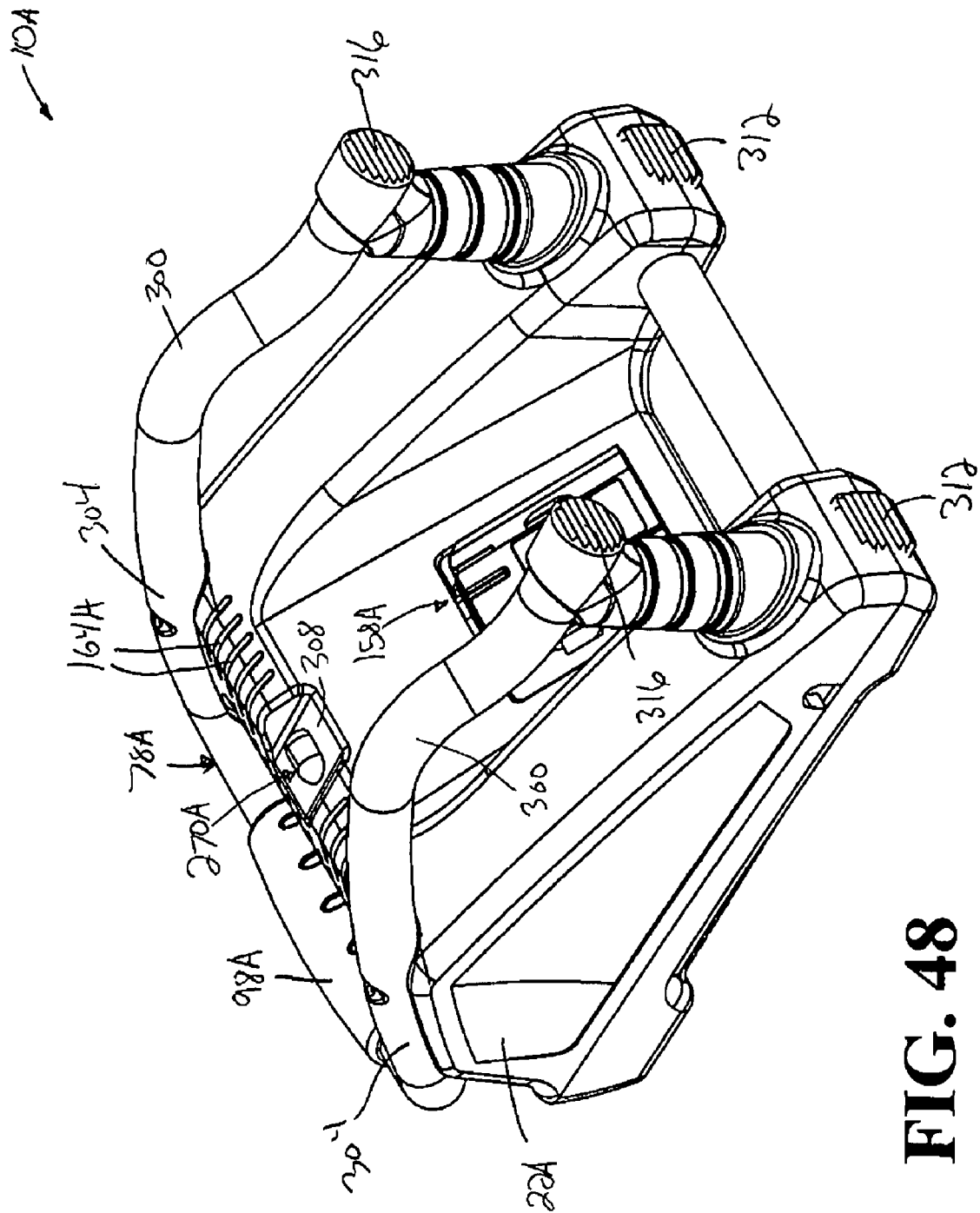
FIG. 48 is a top perspective view of an alternative construction of a battery charger assembly.
Figure 49:
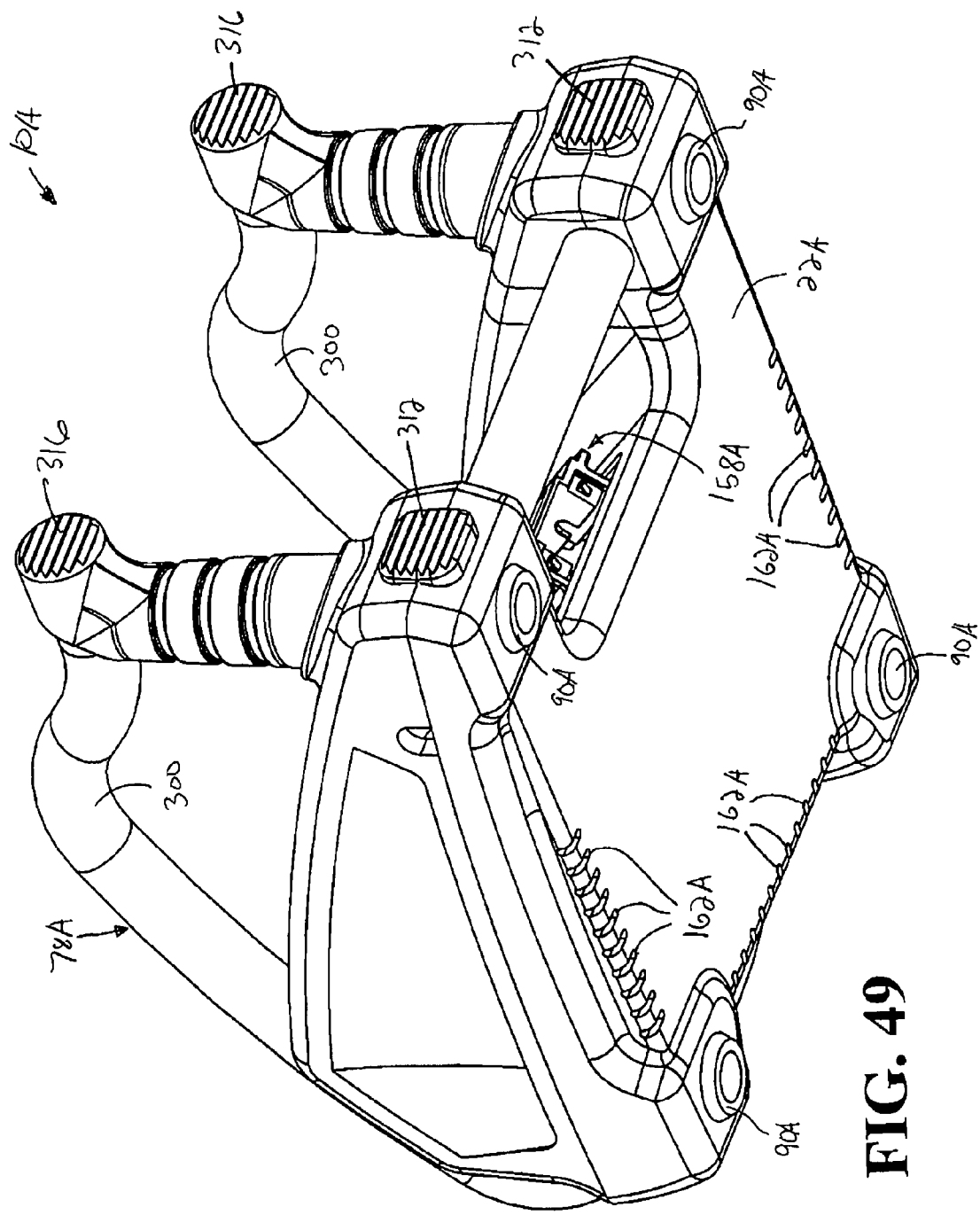
FIG. 49 is a bottom perspective view of the battery charger assembly of FIG. 48.
Figure 50:
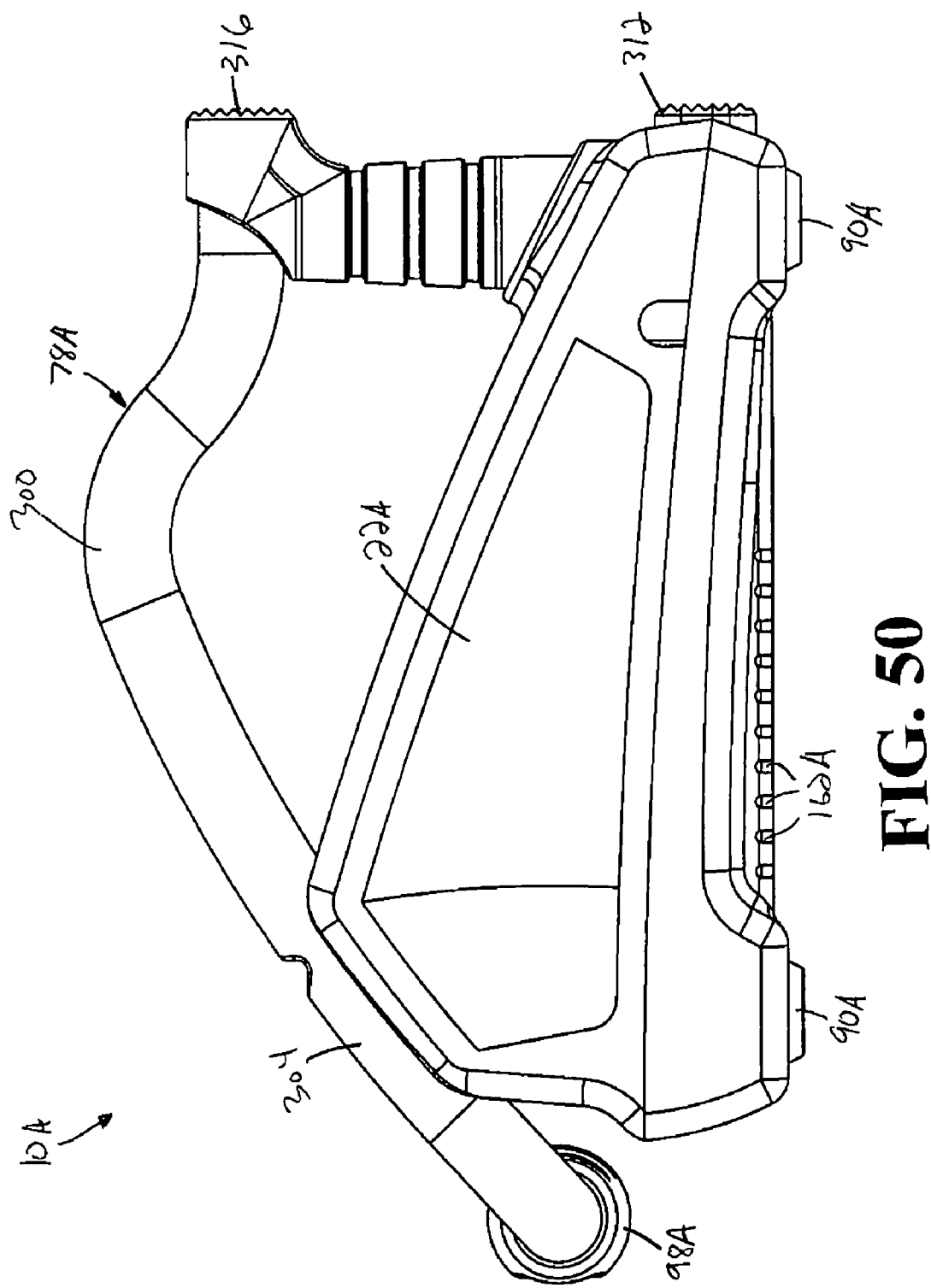
FIG. 50 is a side view of the battery charger assembly of FIG. 48, shown in a first orientation.
Figure 51:
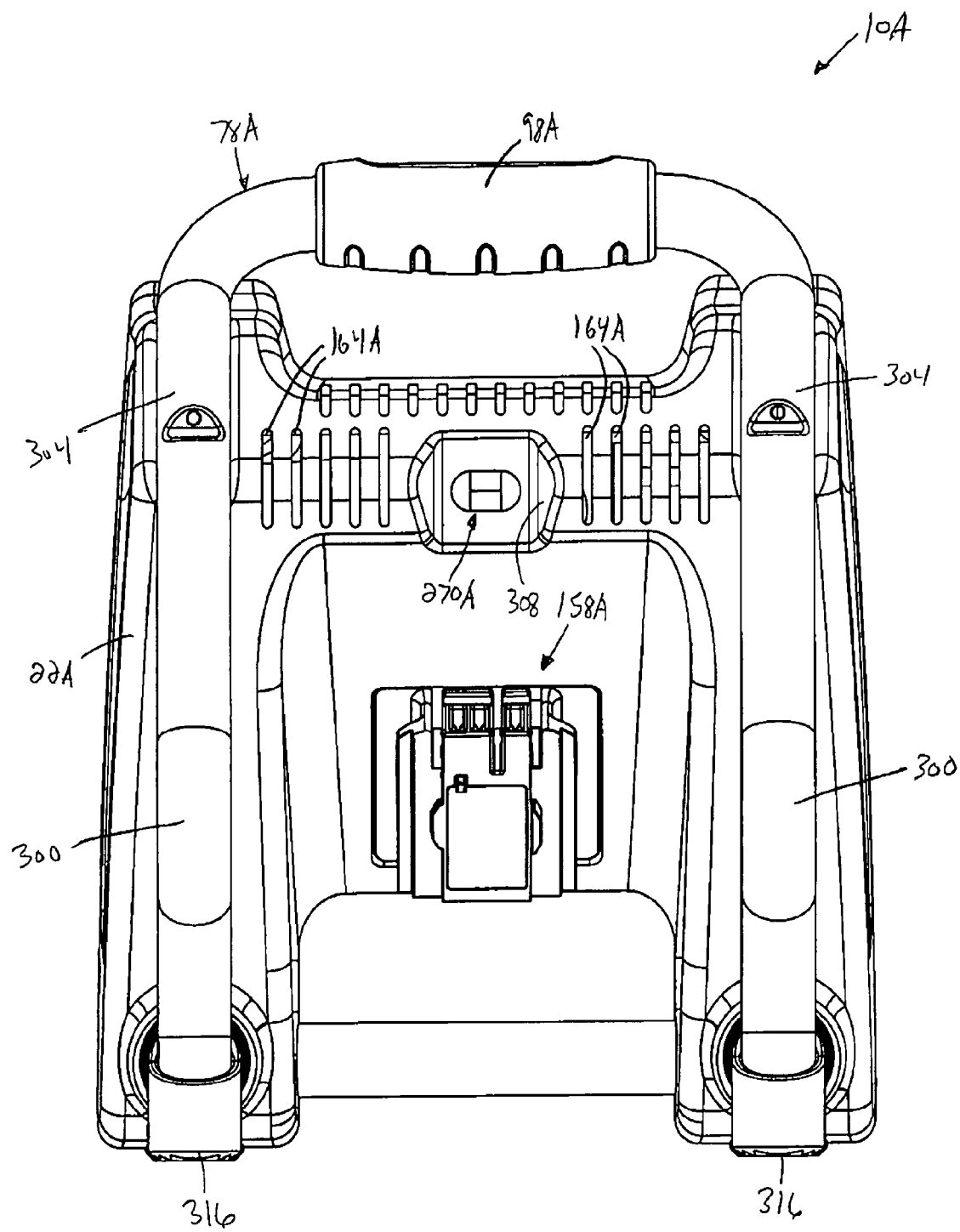
FIG. 51 is a top view of the battery charger assembly of FIG. 48.
Figure 52:
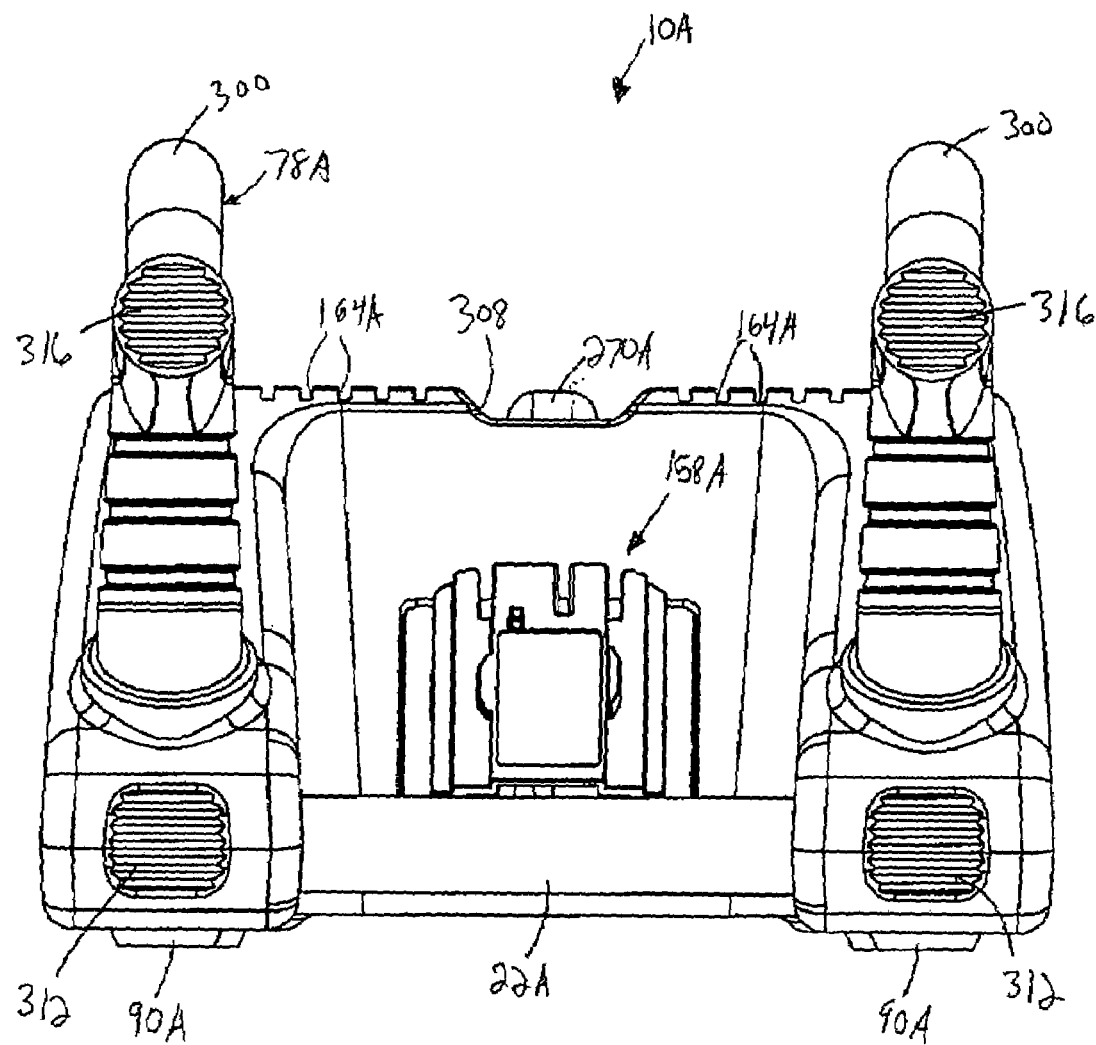
FIG. 52 is a rear view of the battery charger assembly of FIG. 48.
Figure 53:
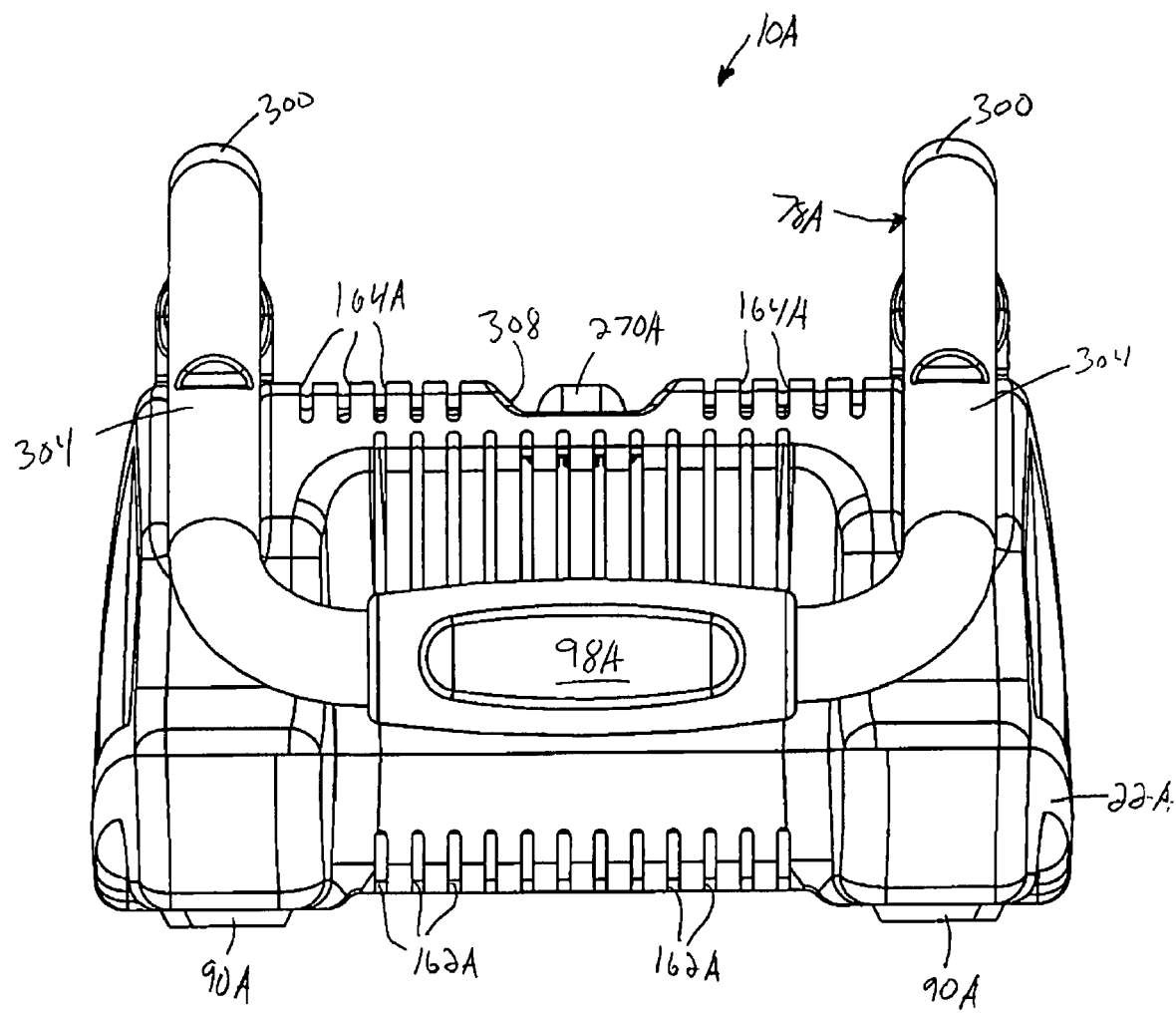
FIG. 53 is a front view of the battery charger assembly of FIG. 48.
Figure 54:
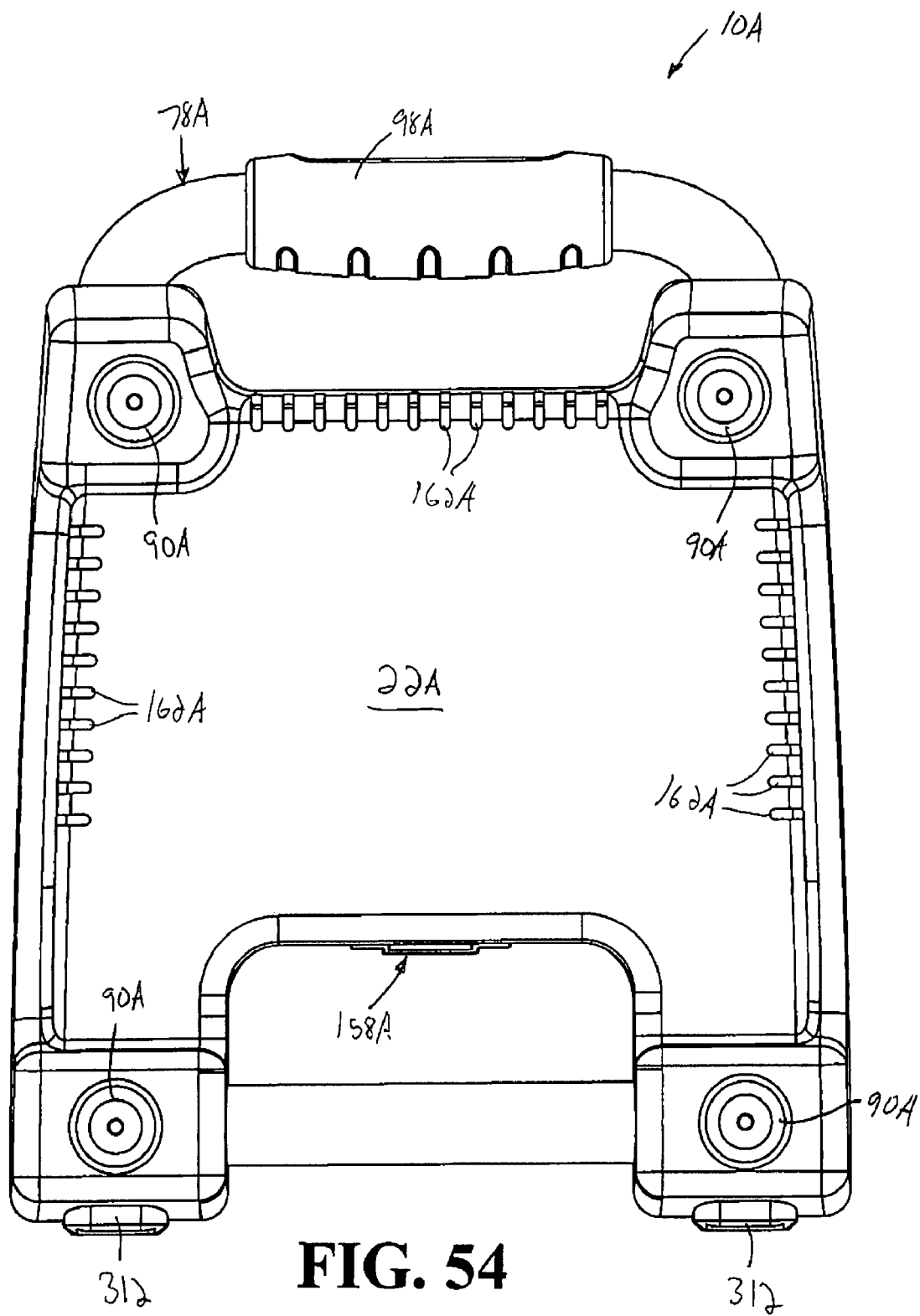
FIG. 54 is a bottom view of the battery charger assembly of FIG. 48.
Figure 59:
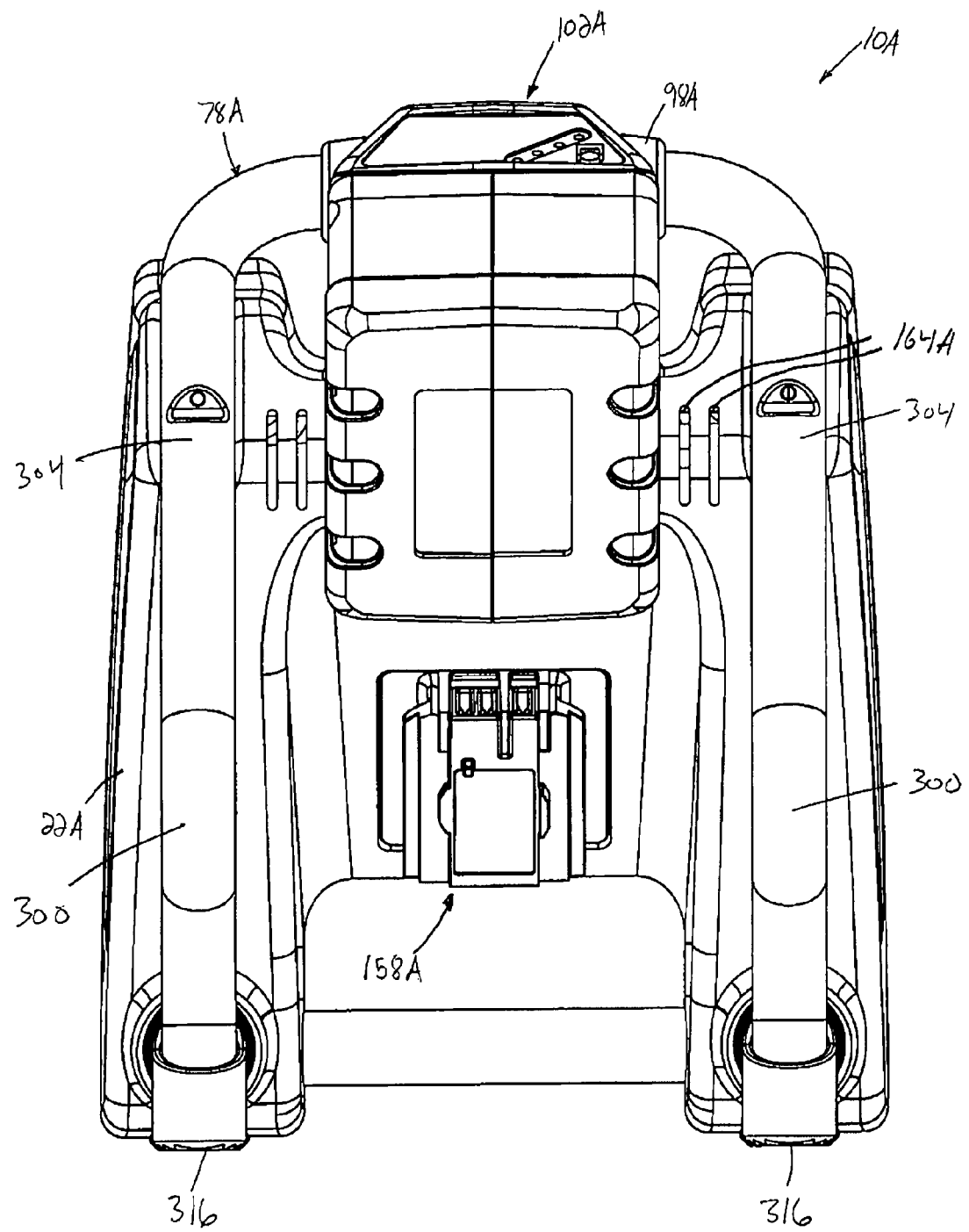
FIG. 59 is a top view of the battery charger assembly and the battery of FIG. 56.
Figure 60:
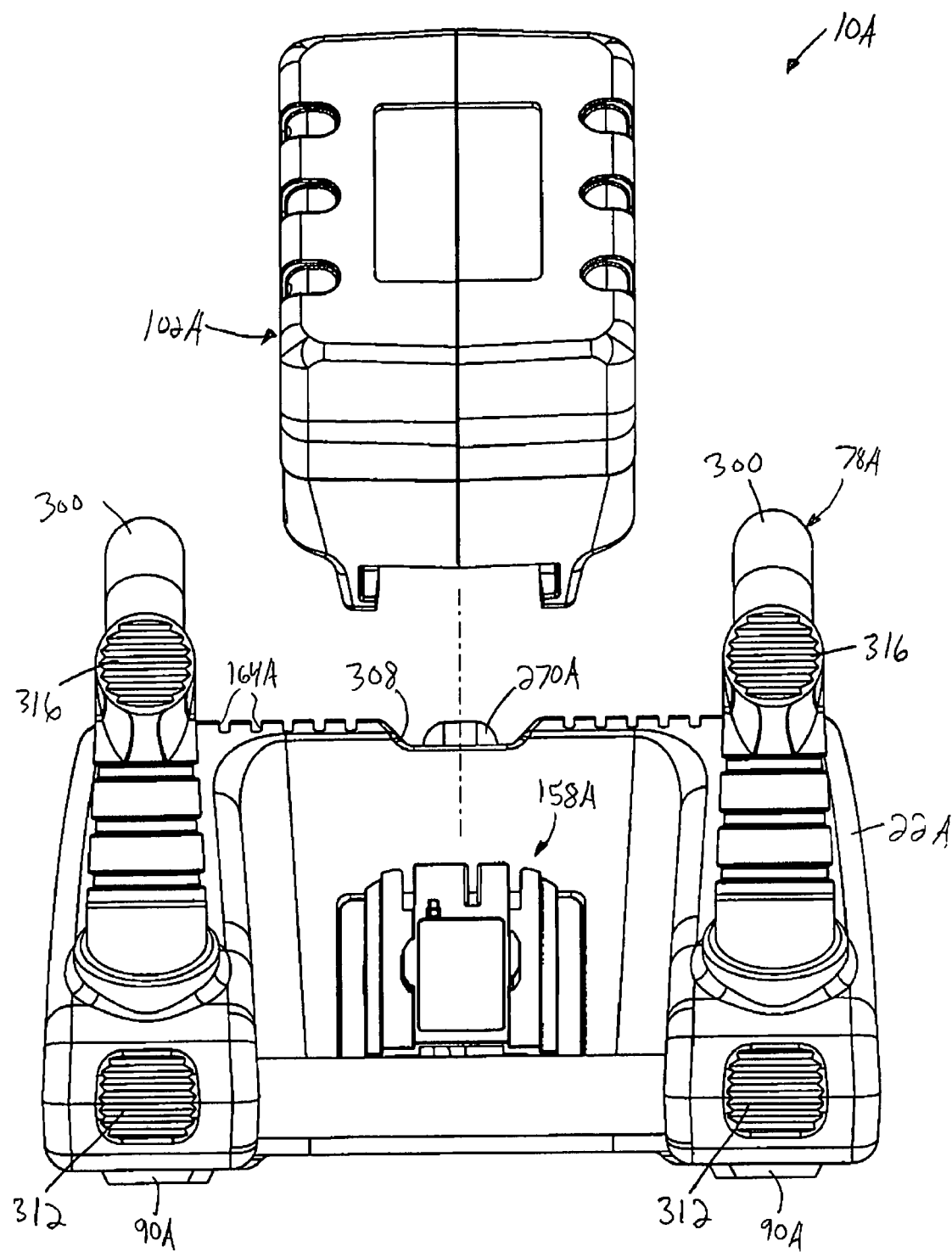
FIG. 60 is rear view of the battery charger assembly and the battery of FIG. 56.
Figure 61:
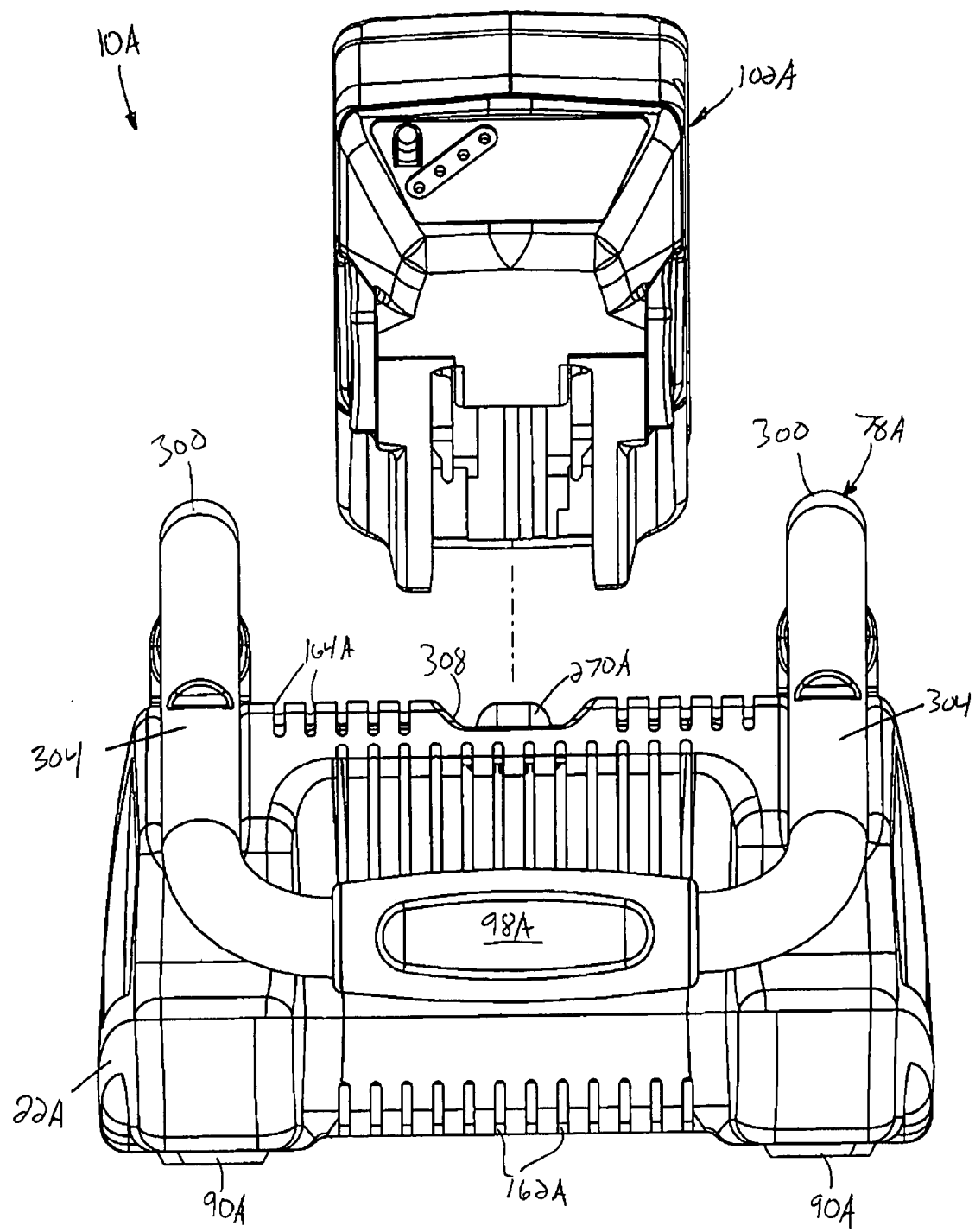
FIG. 61 is a front view of the battery charger assembly and the battery of FIG. 56.
Figure 62:
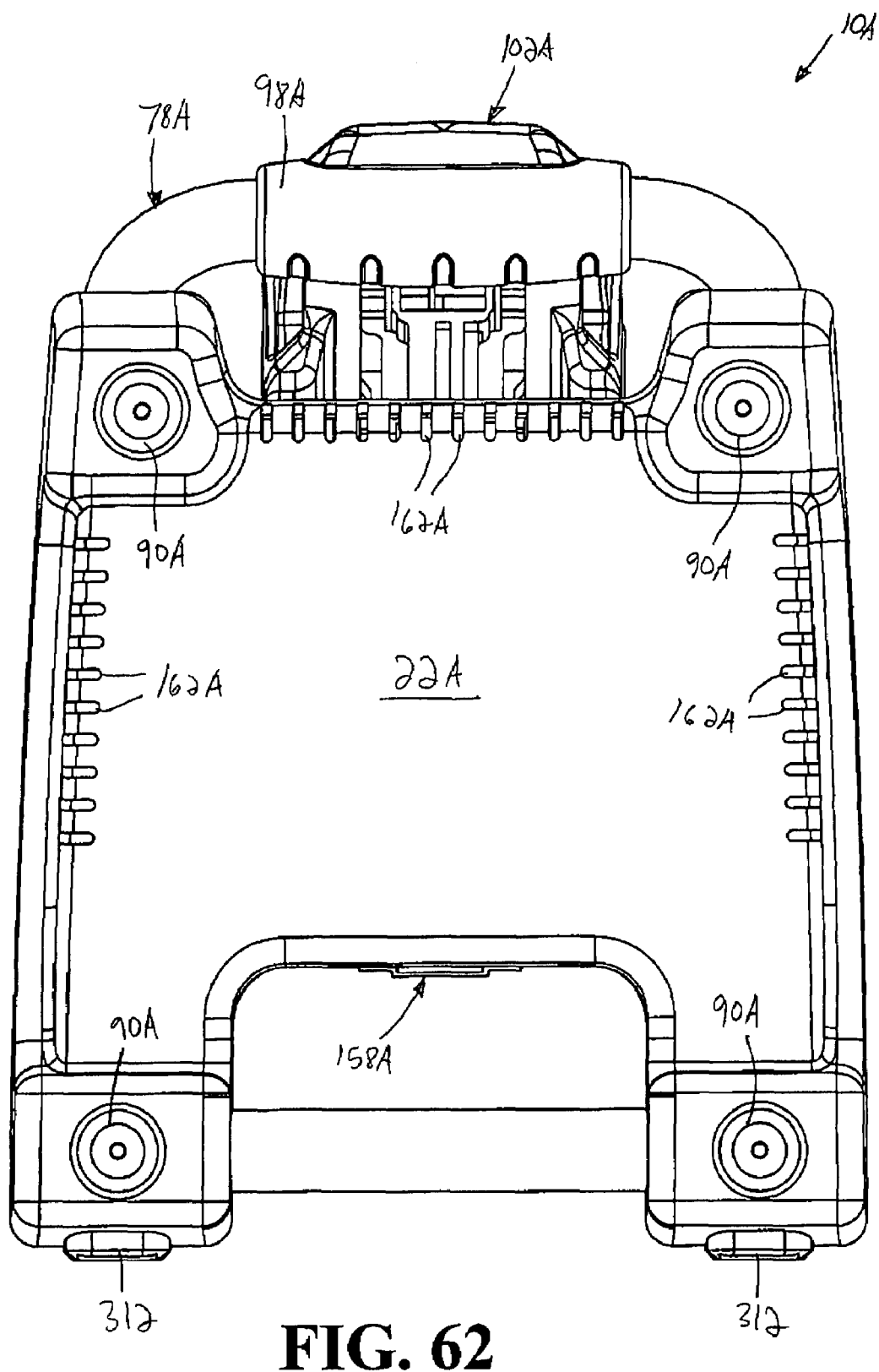
FIG. 62 is a bottom view of the battery charger assembly and the battery of FIG. 56.

The assembly 10A has a heavy-duty construction like the assembly 10 and includes a base 22A having a plurality of feet 90A for supporting the assembly 10A on a support surface, such as, for example a work bench, the ground, and a tool box, in a first orientation (see FIGS. 48 and 59). In the illustrated construction, the base 22A includes four feet 90A. Alternatively, the base 22A can include any number of feet for supporting the assembly 10A on a support surface. The base 22A is designed to buffer and cushion the battery 102A connected to the assembly 10A. The assembly 10A also includes a handle 78A connected to the base 22A. The handle 78A includes a first portion 300 projecting outwardly of the base 22A, a second portion 304 engaging the base 22A and an ergonomic grip 98A extending to one side of the base 22A.

With continued reference to FIGS. 48-71, the assembly 10A further includes a main power cord (not shown) for providing power to the assembly 10A and a battery port 158A for supporting a battery 102A and electrically connecting the battery 102A to a charging circuit (not shown) to charge the battery 102A. The assembly 10A also includes a charge status indicator positioned on the base such that the light emitted from the indicator can be seen from substantially all positions around the assembly. The charge status indicator includes a cover 270A and at least one LED (not shown) and is also positioned within a recessed portion 308 of the base 22A to inhibit impacts on the charge status indicator which may damage the indicator or shear-off the indicator. A plurality of lower and upper contaminant-resistant air vents 162A, 164A are defined in the base 22A for allowing air to access and exit the interior of the base 22A.

With particular reference to FIGS. 64-71, the handle 78A is configured to project outwardly of the battery 102A when the battery 102A is connected to the battery port 158A. The handle 78A may provide some protection to the battery 102A from being impacted by an object or surface wider than the distance defined between the handle 78A. In other constructions (not shown), an additional top cover (not shown) may be provided to protect the battery 102A.

If the assembly 10A were to fall or be impacted during movement around a work site, a combination of the base 22A and the handle 78A would help prevent the attached battery 102A from jarring loose or being damaged upon impact because the base 22A and/or the handle 78A will be impacted first.

Figure 55:
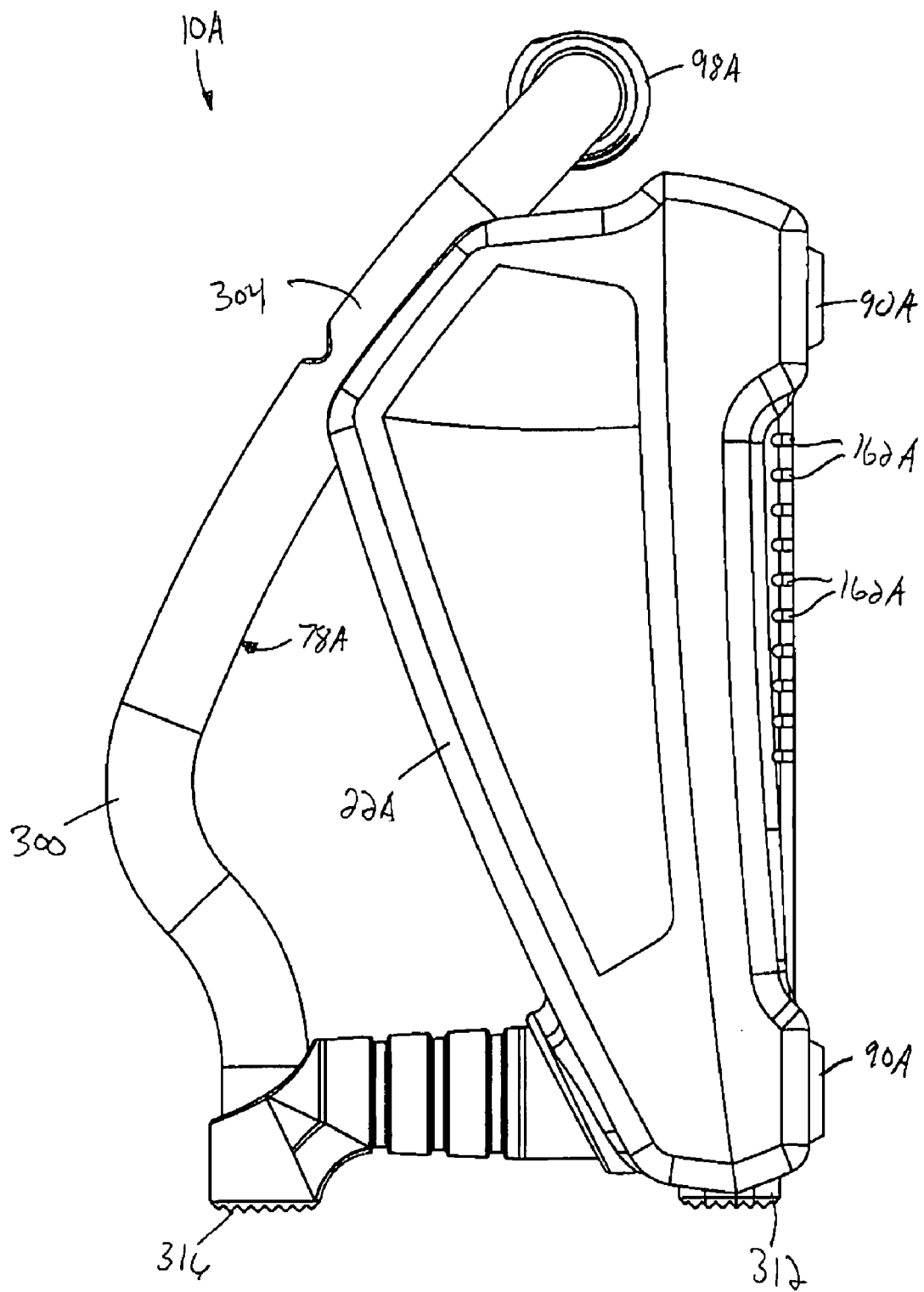
FIG. 55 is a side view of the battery charger assembly of FIG. 48, shown in a second orientation.
Figure 56:
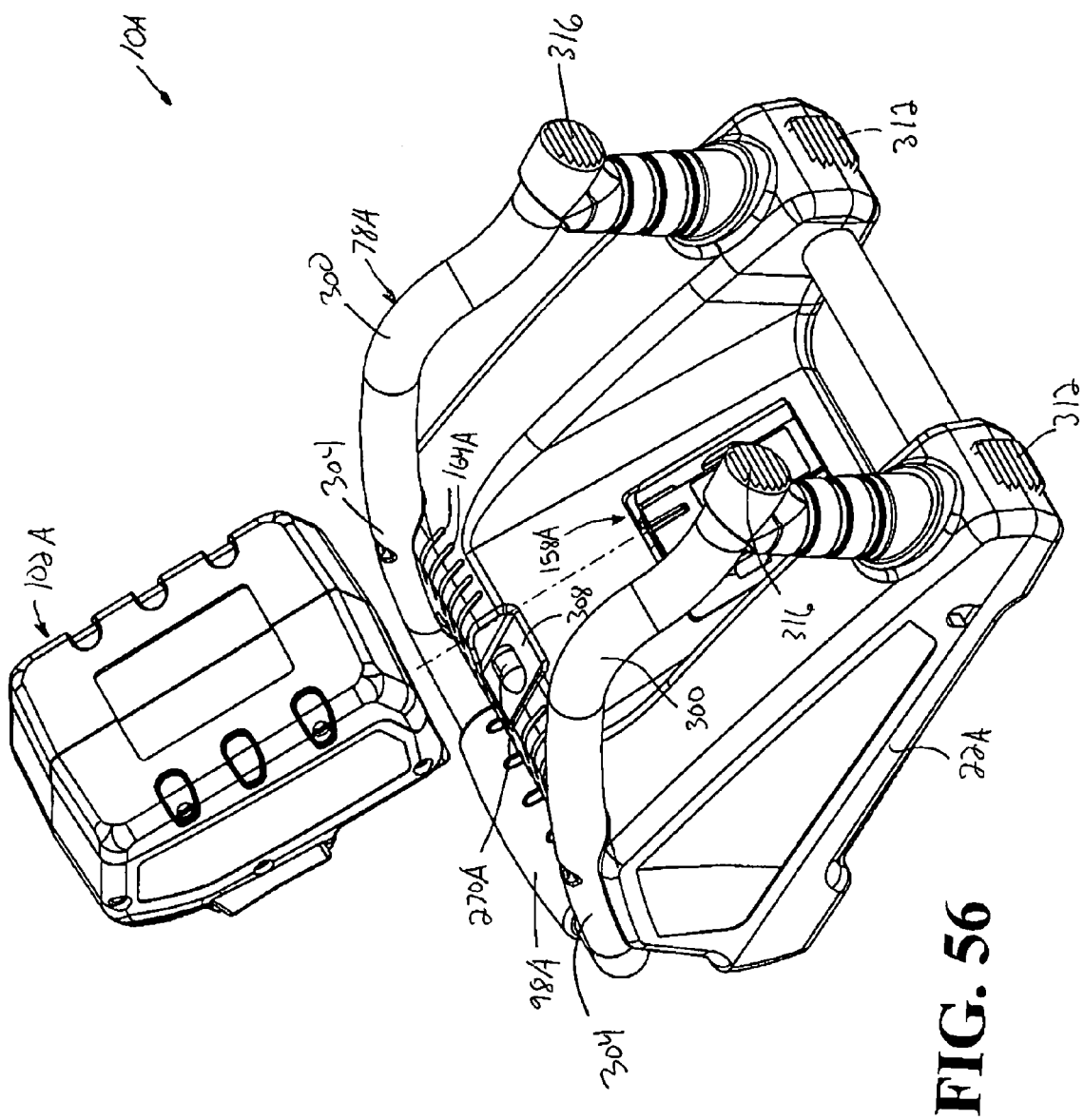
FIG. 56 is a top perspective view of the battery charger assembly of FIG. 48, shown with a battery exploded from the battery charger assembly.
Figure 57:
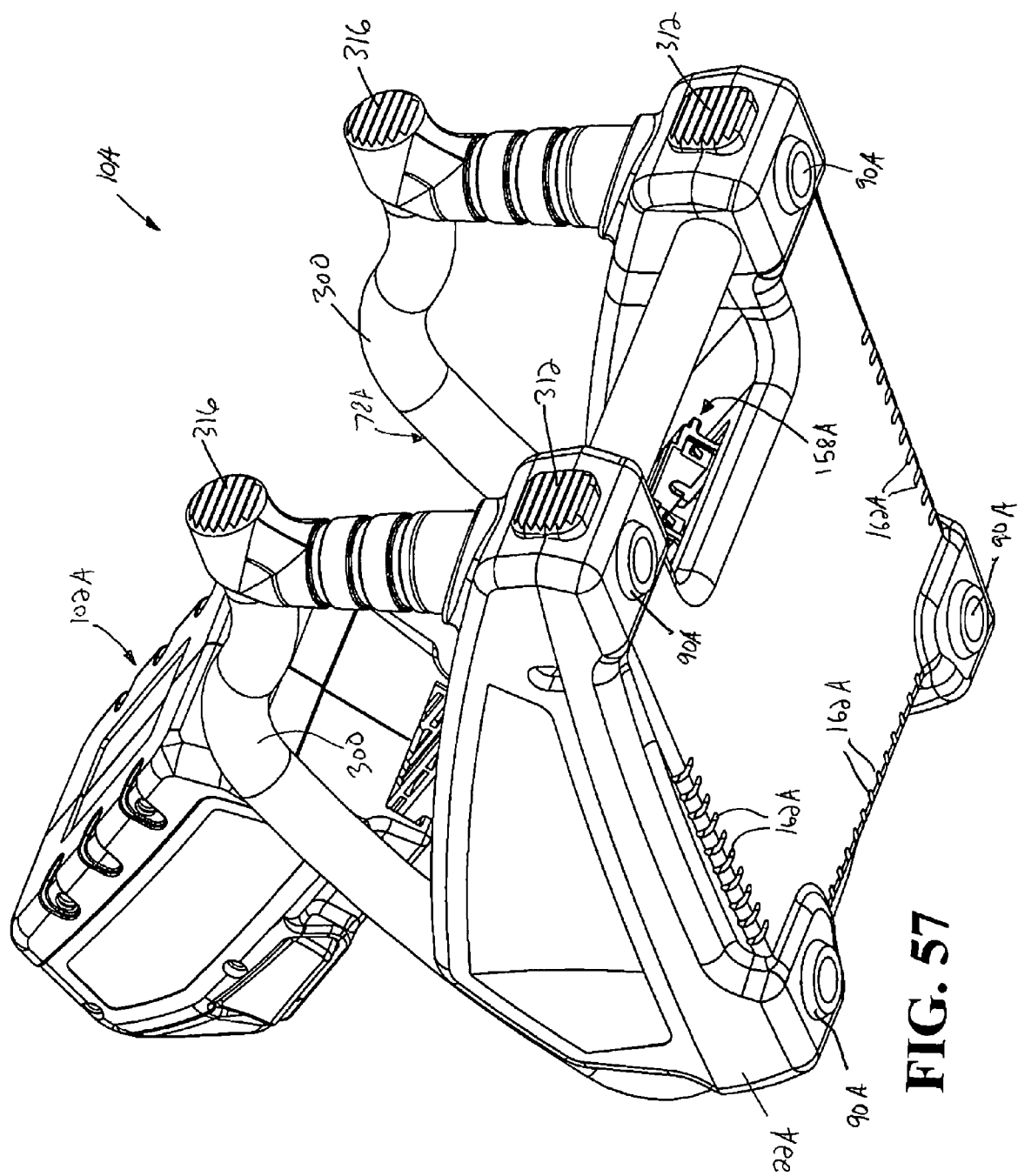
FIG. 57 is a bottom perspective view of the battery charger assembly and the battery of FIG. 56.
Figure 58:
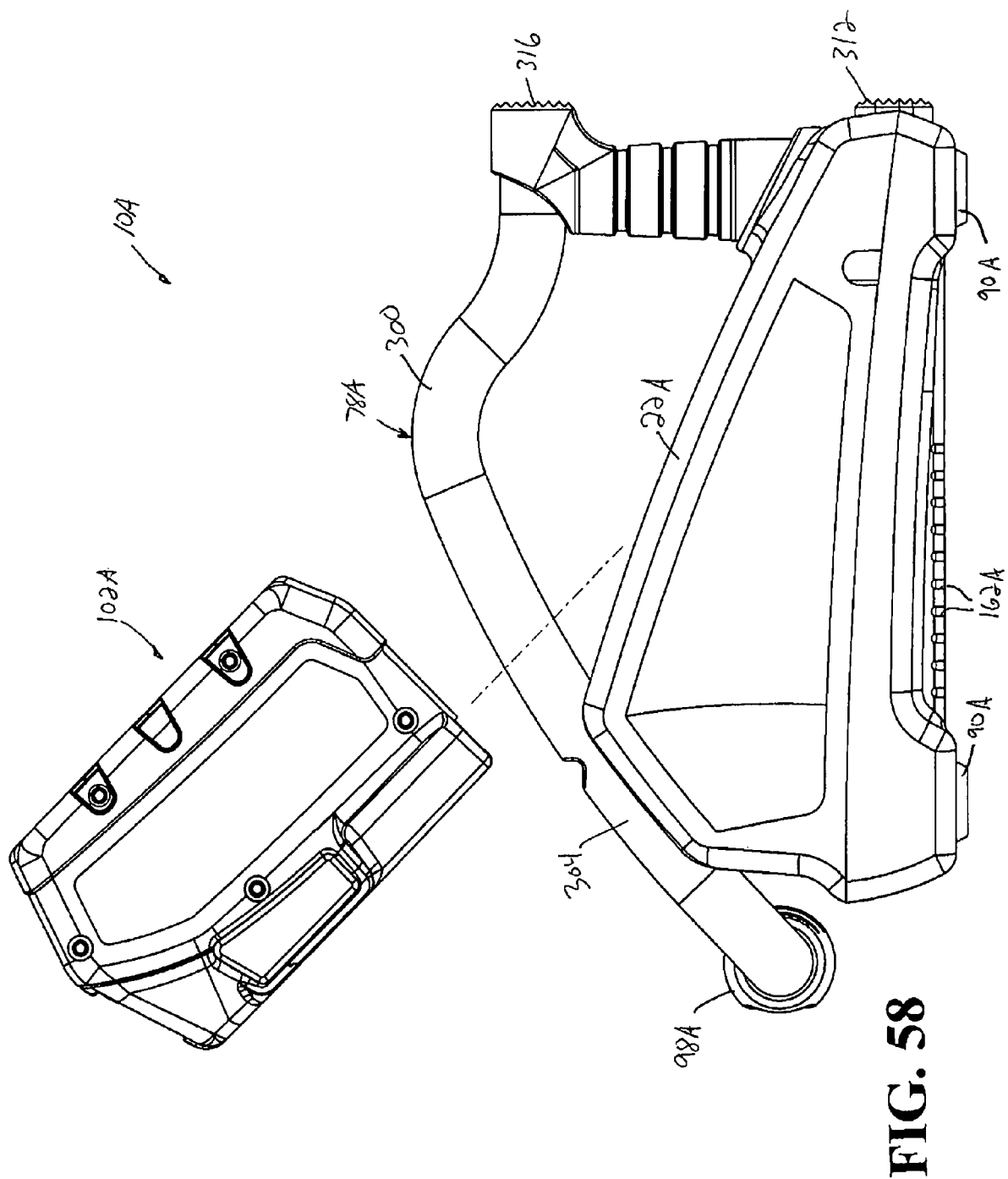
FIG. 58 is a side view of the battery charger assembly and the battery of FIG. 56, shown in a first orientation.
Figure 63:
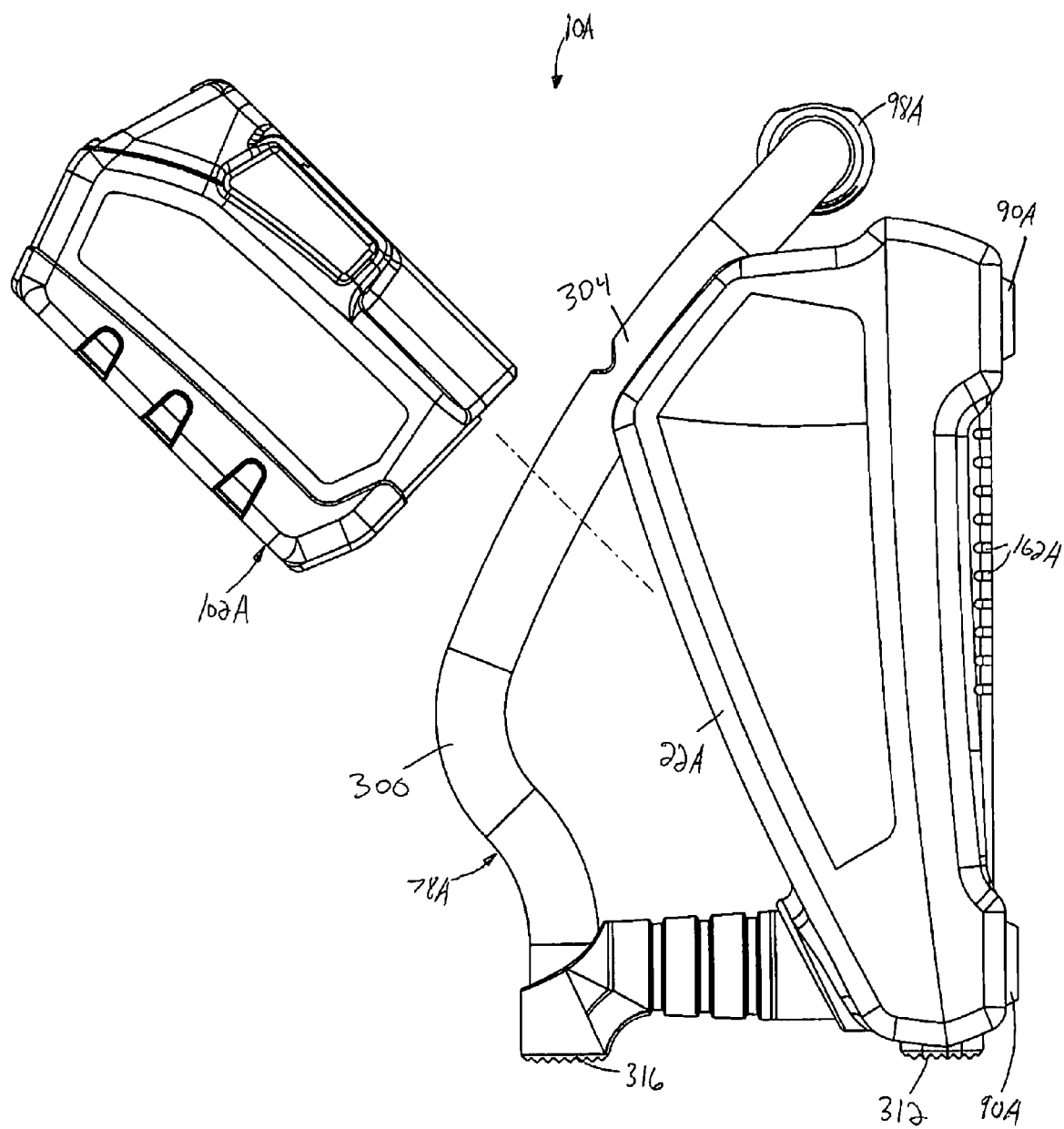
FIG. 63 is a side view of the battery charger assembly and the battery of FIG. 56, shown in a second orientation.
Figure 64:
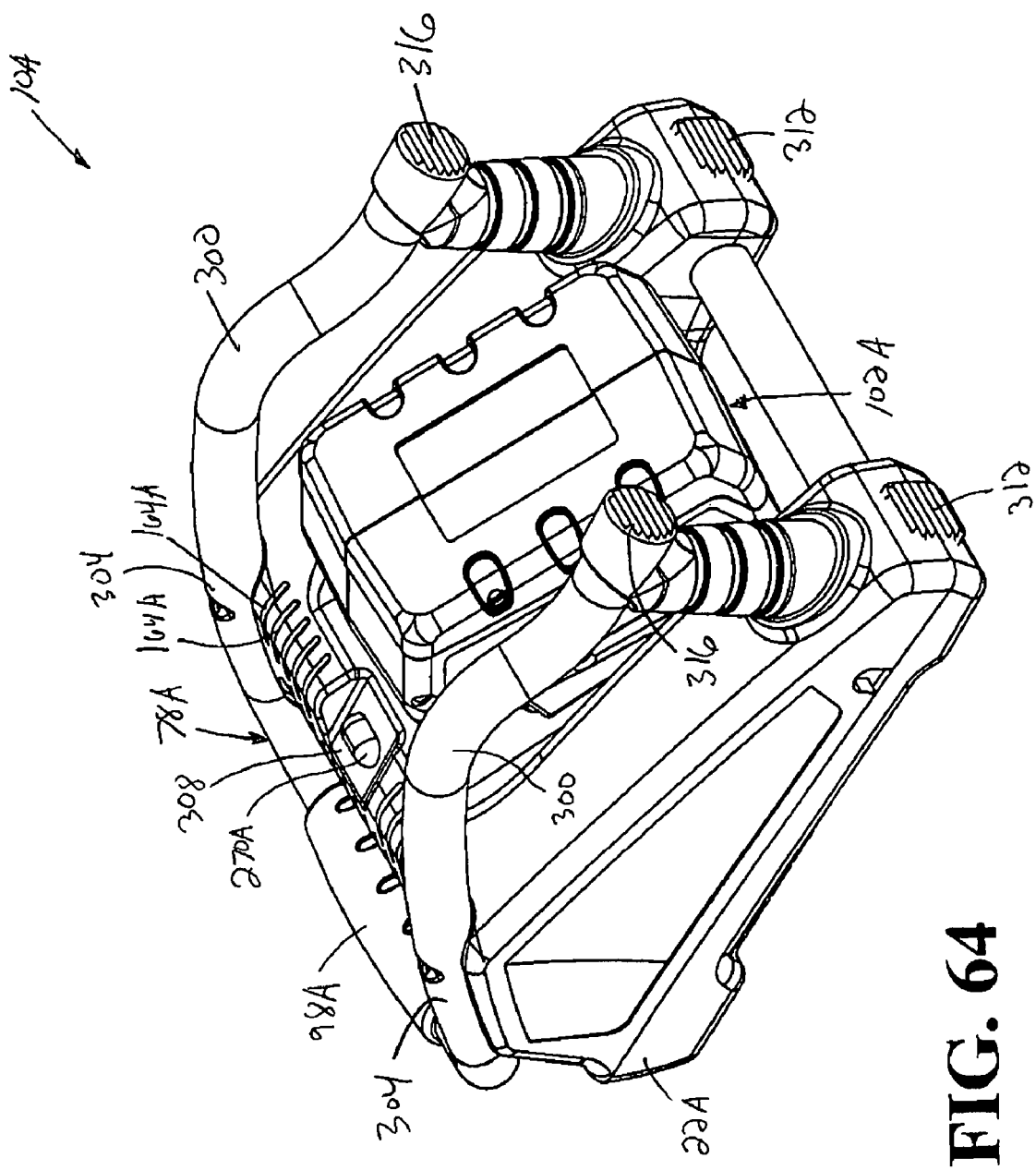
FIG. 64 is a top perspective view of the battery charger assembly of FIG. 48, shown with a battery connected to the charger assembly.
Figure 65:
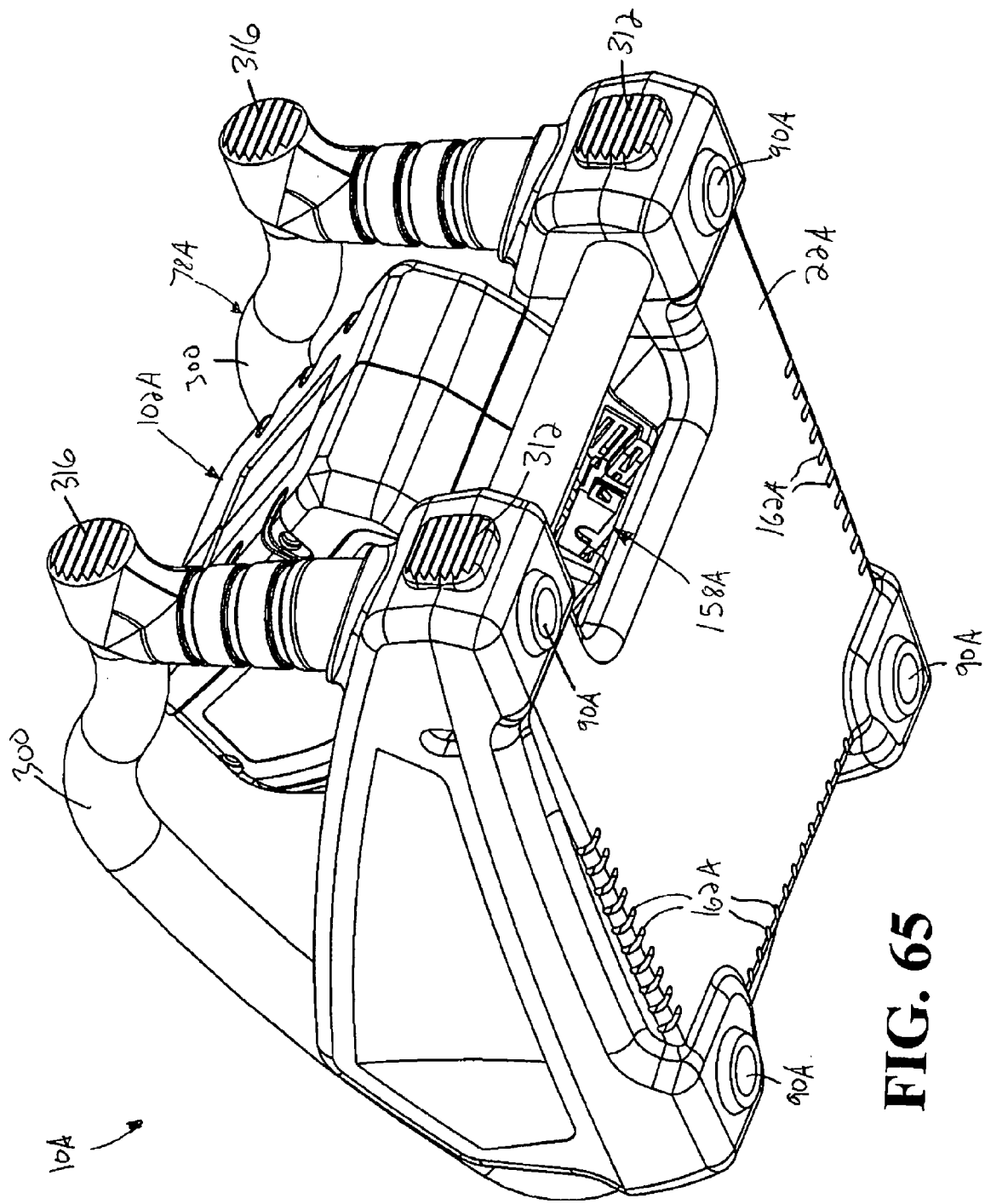
FIG. 65 is a bottom perspective view of the battery charger assembly and the battery of FIG. 64.
Figure 66:
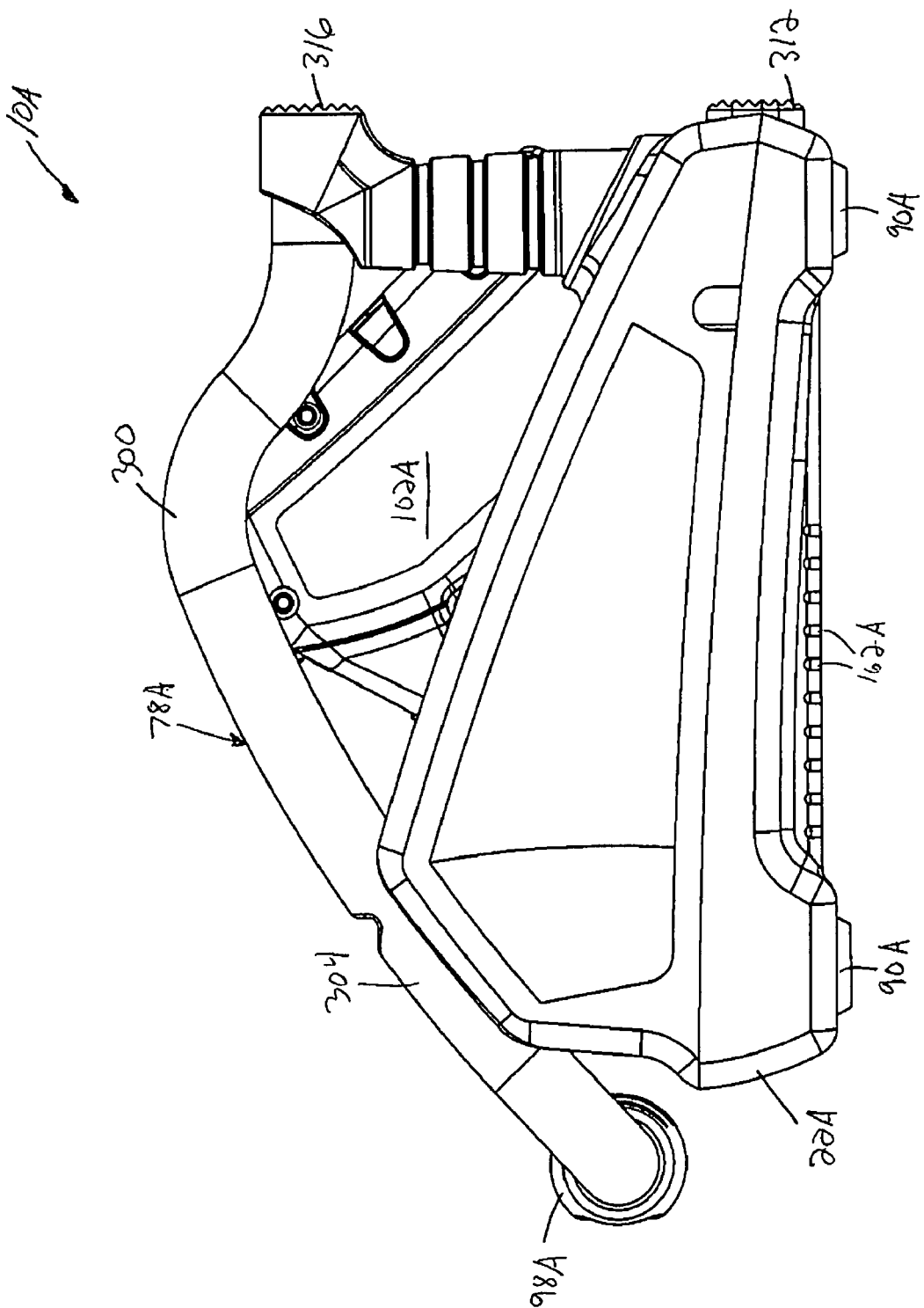
FIG. 66 is a side view of the battery charger assembly and the battery of FIG. 64, shown in a first orientation.
Figure 67:
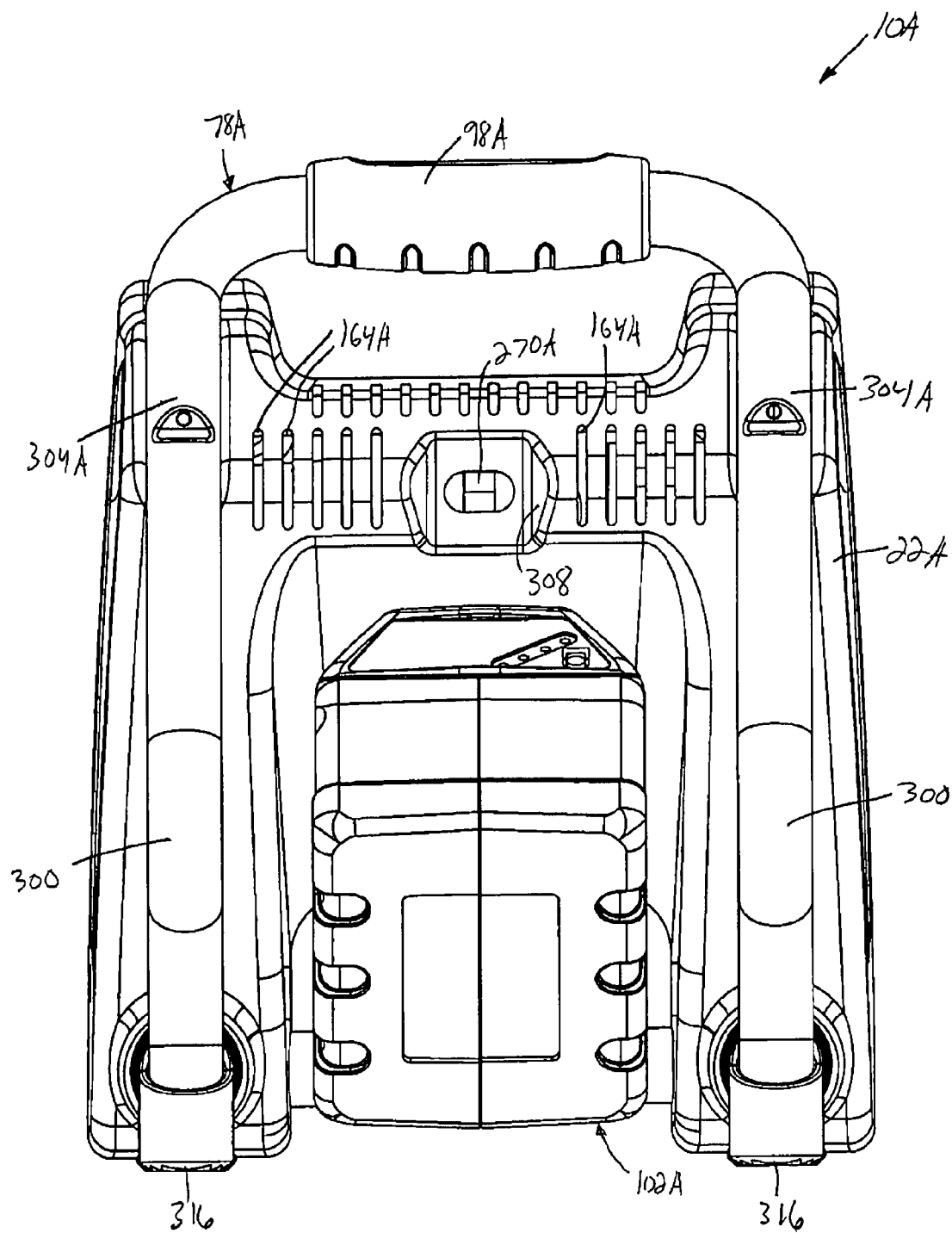
FIG. 67 is a top view of the battery charger assembly and the battery of FIG. 64.
Figure 68:
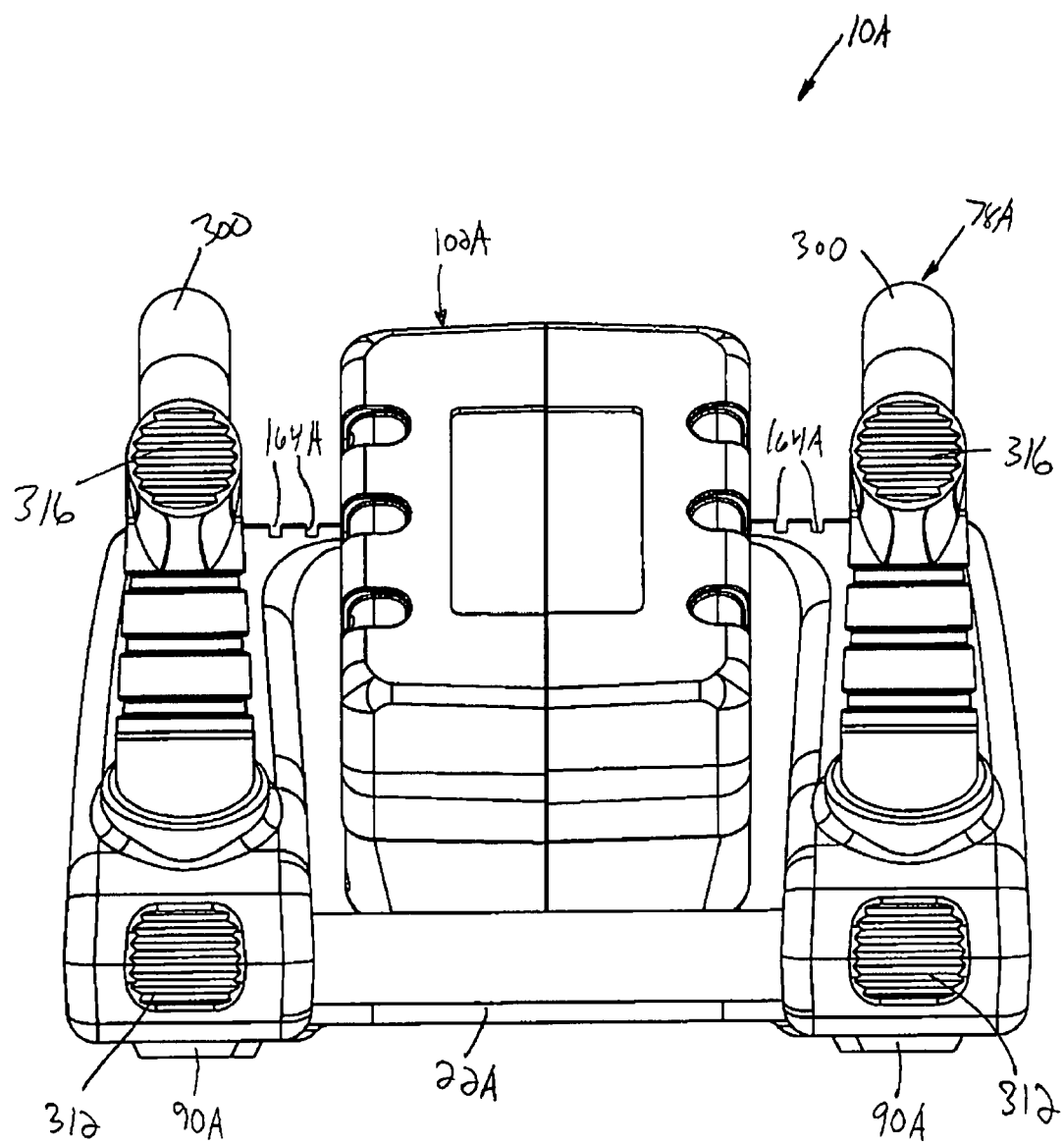
FIG. 68 is a rear view of the battery charger assembly and the battery of FIG. 64.
Figure 69:
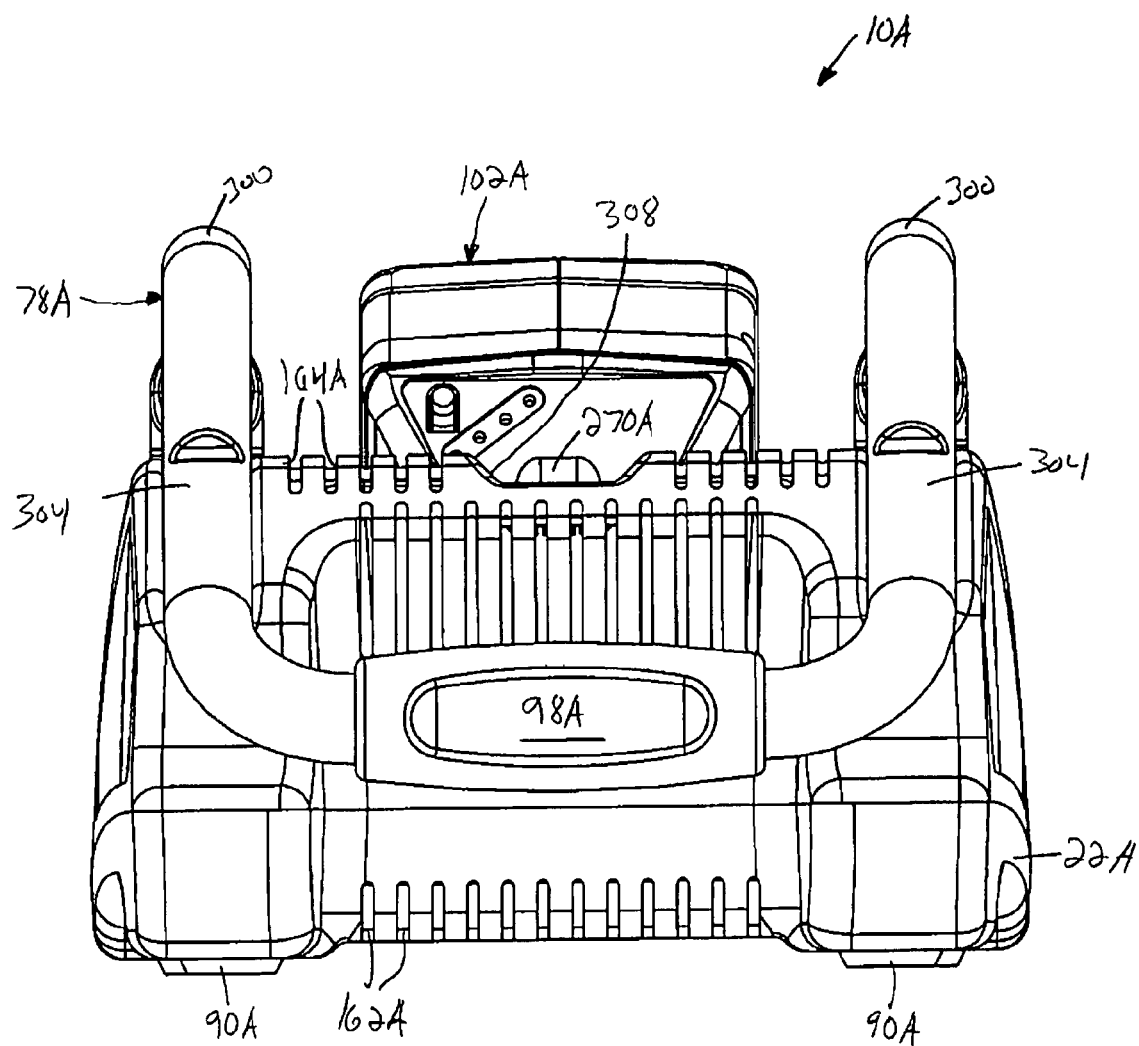
FIG. 69 is a front view of the battery charger assembly and the battery of FIG. 64.
Figure 70:
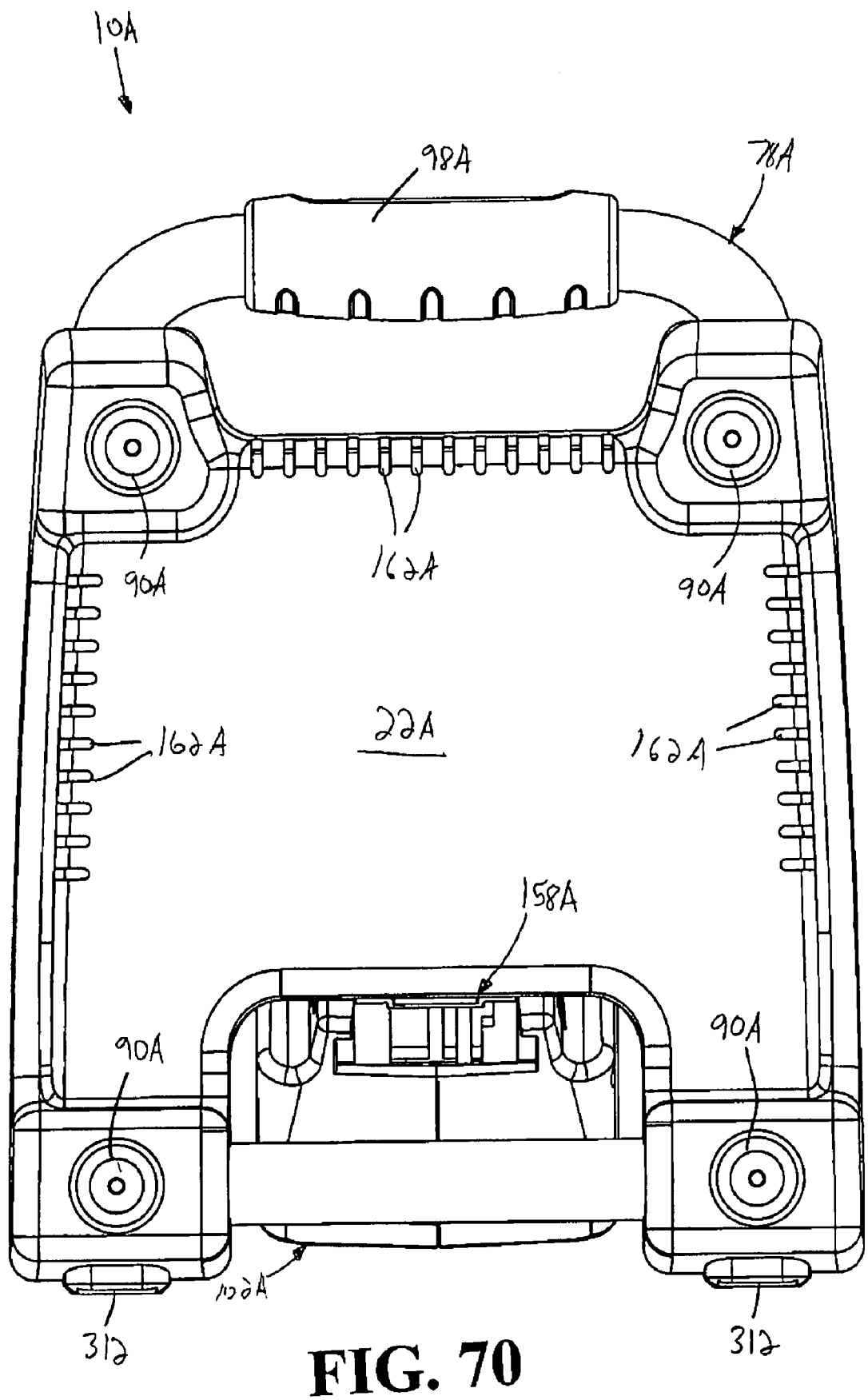
FIG. 70 is a bottom view of the battery charger assembly and the battery of FIG. 64.
Figure 71:
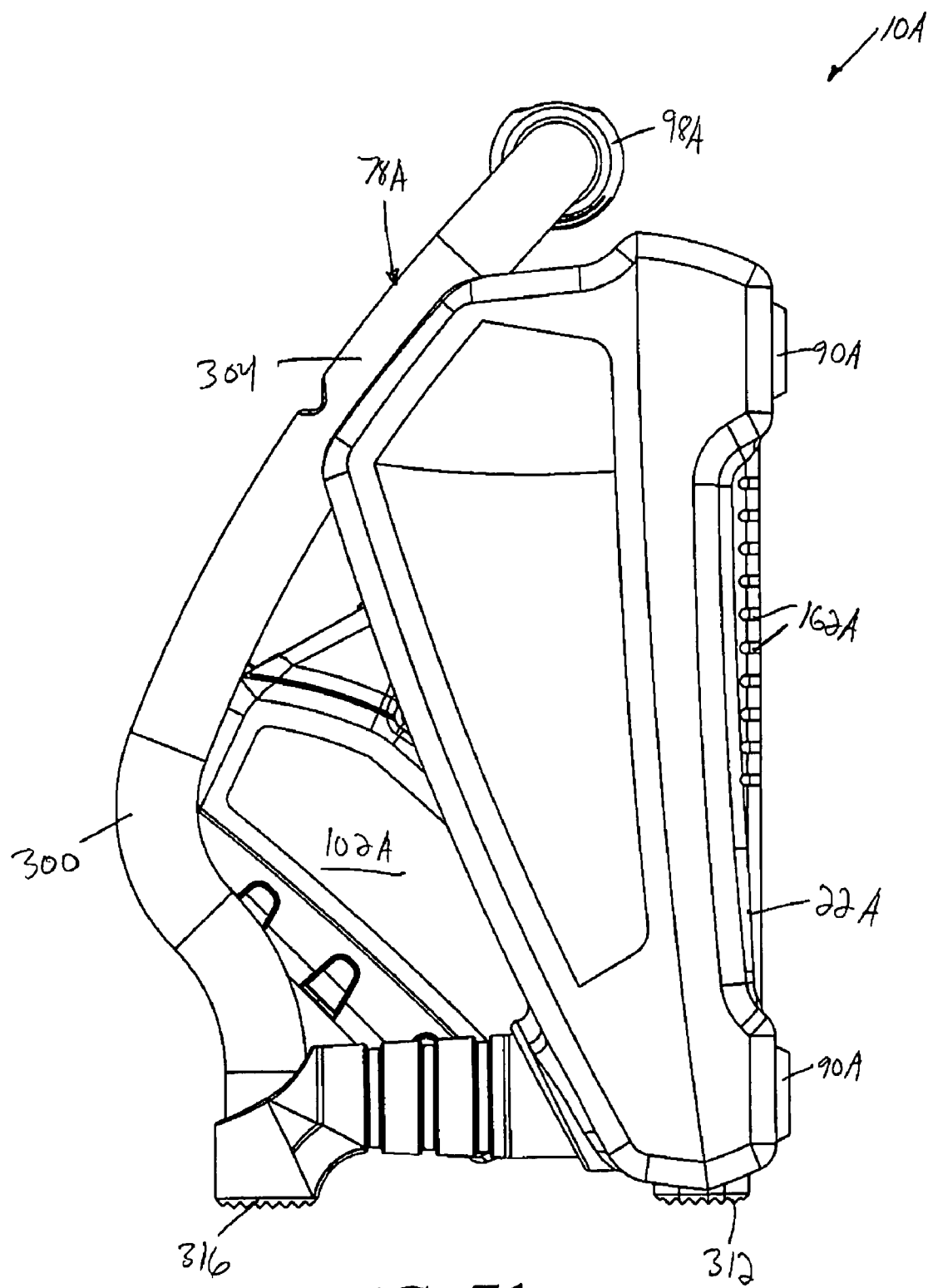
FIG. 71 is a side view of the battery charger assembly and the battery of FIG. 64, shown in a second orientation.
Figure 72:
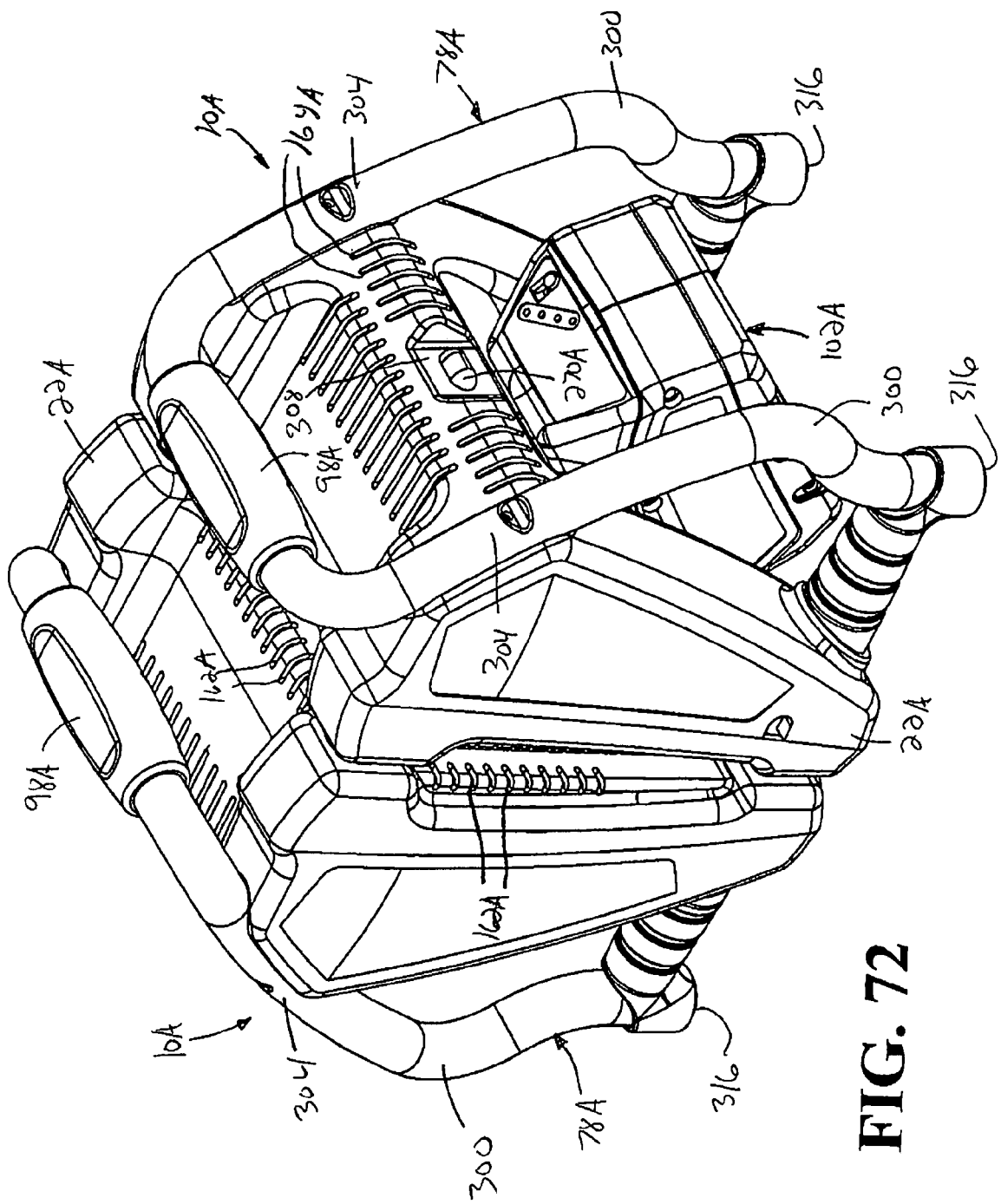
FIG. 72 top perspective view of a pair of battery charger assemblies connected to one another in the second orientation, shown with a battery connected to each battery charger assembly.
Figure 73:
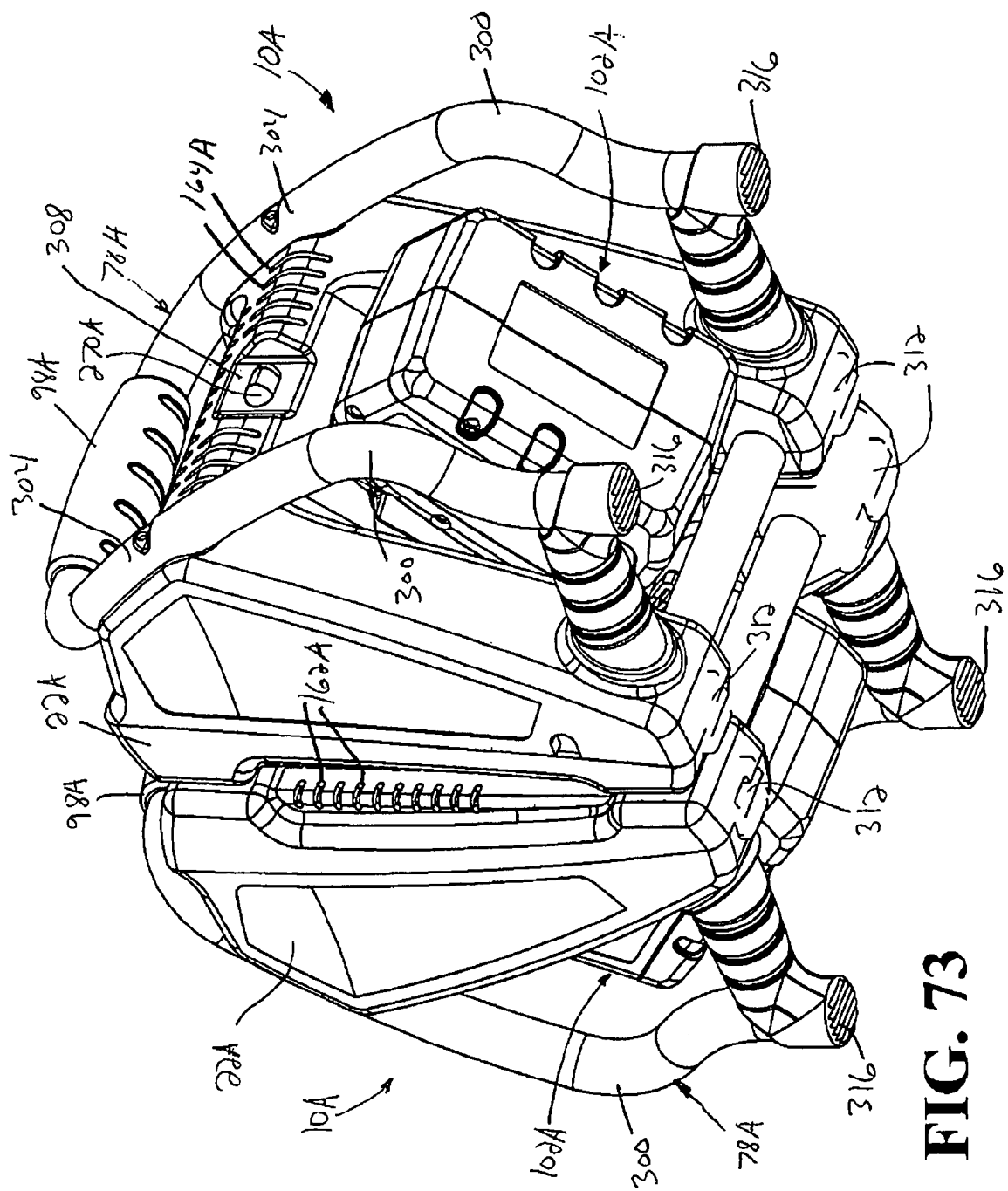
FIG. 73 is a bottom perspective view of the pair of battery charger assemblies and batteries of FIG. 72.
Figure 74:
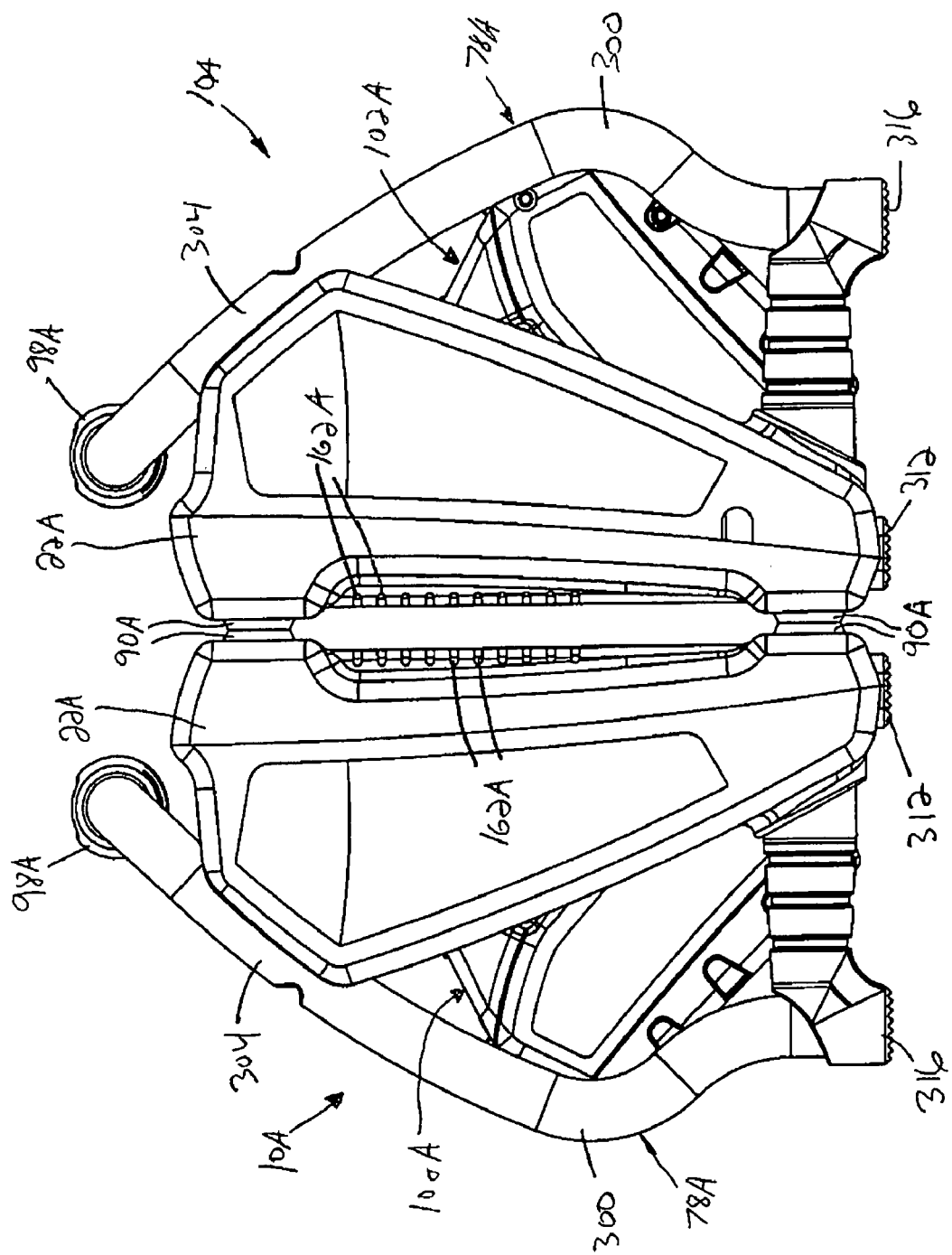
FIG. 74 is a side view of the pair of battery charger assemblies and the batteries of FIG. 72.
Figure 75:
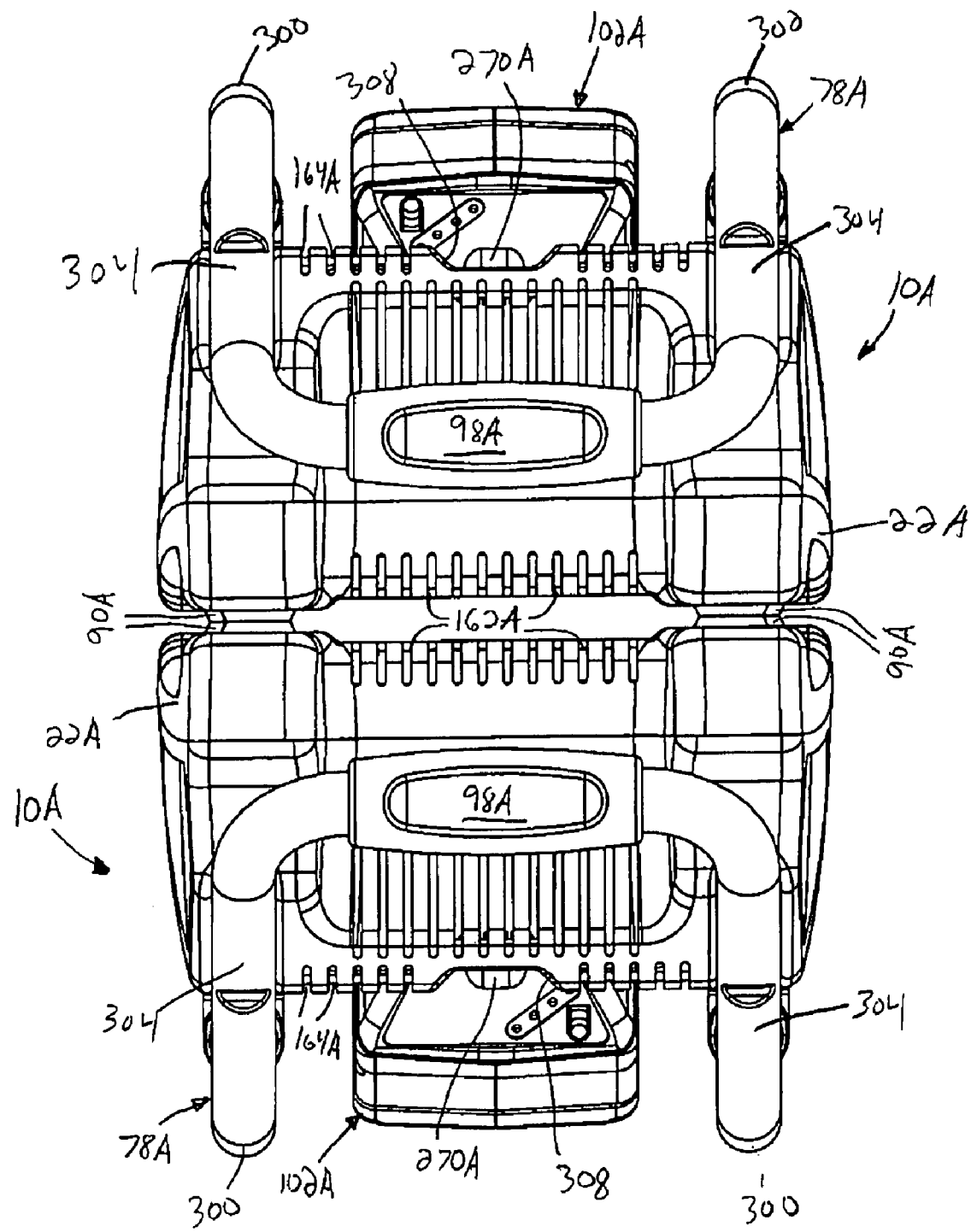
FIG. 75 is a top view of the pair of battery charger assemblies and the batteries of FIG. 72.
Figure 76:
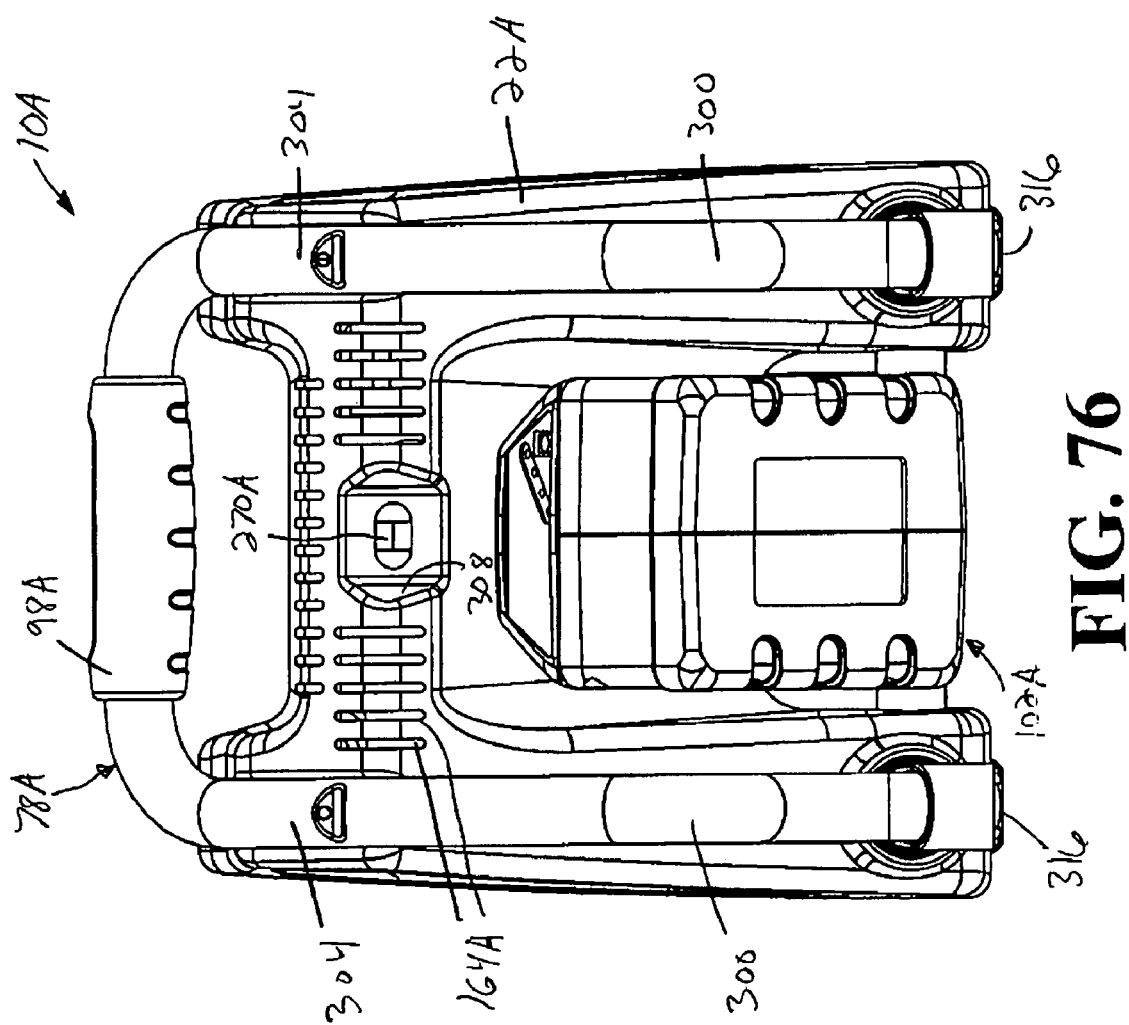
FIG. 76 is a front view of the pair of battery charger assemblies and the batteries of FIG. 72.

With reference to FIGS. 55, 63 and 71, the assembly 10A is positioned in a second orientation. The assembly 10A can support and charge a battery 102A in both the first orientation and the second orientation. The base 22A includes a pair of secondary feet 312 and the handle 78A includes feet portions 316 on each end of the handle 78A. The pair of secondary feet 312 and the feet portions 316 are engageable with a support surface and together support the assembly in the second orientation. The feet portions 316 and the secondary feet 312 are properly positioned relative to one another to support the additional weight of a battery 102A and prevent tipping of the assembly 10A when the battery 102A is connected to the battery port 158A.

The assembly 10A can also be connected to a vertical wall in the second orientation to support and charge a battery 102A. The feet 90A of the base 22A are brought into contact with the wall and the assembly 10A can be connected to the wall in a variety of manners, such as, for example fasteners, magnets and bonding. Such fasteners, magnets or bonding can be utilized between the feet 90A and the wall or can be utilized between some other location(s) on the assembly 10A and the wall. When the assembly 10A is connected to the wall, the feet portions 316 of the handle 78A do not engage a support surface, however, the handle 78A still provides some protection to the battery from being impacted by objects wider than the handle 78A.

In the illustrated construction, the assembly 10A includes two feet portions 316 on the ends of the handle 78A and two secondary feet 312 on the base 22A. Alternatively, the assembly 10A can include any number of feet portions 316 and secondary feet 312. In other constructions (not shown), feet portions 316 are provided by a component (not shown) other than the handle 78A for engaging a support surface and supporting the assembly 10A on the support surface. In such constructions, the component (not shown) including the feet portions can extend from the base 22A or the handle 78A and be positioned relative to the secondary feet 312 to appropriately support the assembly 10A on the support surface both when a battery 102A is connected to the battery port 158A and when a battery 102A is not connected to the battery port 158A.

It should be understood that any of the components illustrated and described with respect to the assembly 10 illustrated in FIGS. 1-47 and not shown on the assembly 10A illustrated in FIGS. 48-71 can be utilized in the assembly 10A. For example, The power outlets 74, the cleats 94 and the movable electrical terminal cover 226, among others, are not shown on the assembly 10A, however, may be utilized with the assembly 10A.

It should also be understood that the internal components, such as, for example the charging circuit 146 and the suspended and cushioned mounting board 150, of the assembly 10 that are not illustrated in FIGS. 48-71 of the assembly 10A, can be incorporated into the assembly 10A.

It should further be understood that any of the plurality of charge termination protocols, including a temperature rate ("TR") termination protocol, and any of the firmware modules, including a trickle module 254, a charge module 258 and an equalization module 262, discussed above with respect to the assembly 10 illustrated in FIGS. 1-47 can be utilized in the assembly 10A illustrated in FIGS. 48-71 to provide control of battery charging.

With reference to FIGS. 72-76, a pair of assemblies 10A are positioned in the second orientation and are connected together. When connected together, the feet 90A of the bases 22A engage each other. The assemblies 10A can be connected together in a variety of manners, such as, for example fasteners, magnets and bonding. Such fasteners, magnets and bonding can be positioned between the feet 90A of the bases 22A or can be positioned between other portions of the assemblies 10A. In the second orientation, the secondary feet 312 and the feet portions 316 of both assemblies 10A all contact a support surface to provide support to the connected assemblies 10A and the batteries 102A connected to the assemblies 10A. The positions of the secondary feet 312 and the feet portions 316 of both assemblies 10A are properly positioned to inhibit tipping of the assemblies 10 both when the batteries 102A are and are not connected to the battery ports 158A. The connected assemblies 10A can be picked-up by grasping either or both hand grips 98A.

Some features and aspects of the chargers 14, the base 22 and the handle 78 may also be similar to the battery charger described in U.S. patent application Ser. No. 10/289,621, filed on Nov. 7, 2002, which is hereby incorporated by reference.

It should be understood that some aspects of the invention may be incorporated into other types of electrical equipment, such as, for example, electric power tools, audio components, etc. For example, the heavy-duty construction may be incorporated into audio components and other relatively-less durable electronic equipment for use in harsh working environments. Also, suspended, cushioned and/or sealed electrical circuits may be incorporated into audio components and such equipment. In addition, independent features of the invention such as, for example, contaminant-resistant air vents 162, 164, contaminant drains 142, movable electrical terminal covers 226 and/or protruding LEDs 266 may be incorporated into electrical equipment such as, for example, electric power tools, generators, audio equipment, communication equipment, etc.

One or more independent features and independent advantages may be set forth in the following claims:

What is claimed is:

1. A combination comprising:
    a first battery charger including
        a first housing, and
        a first charging circuit supported by the first housing and electrically connectable to a power source and to a first battery;
    a second battery charger including
        a second housing, and
        a second charging circuit supported by the second housing and electrically connectable to the power source and to a second battery, the second charging circuit being electrically connectable to the power source independently of the first charging circuit;
    a base operable to connect the first battery charger and the second battery charger as a unit, the first and second battery chargers being independently removable from the base; and
    a bar extending from the base and graspable by a user to hand carry the combination, wherein at least a portion of the bar is positioned above the first and second battery chargers.

2. The combination as set forth in claim 1, wherein the base is blow molded from an impact-resistant plastic material.

3. The combination as set forth in claim 1, further comprising locking structure for releasably locking the first battery charger and the second battery charger with the base.

4. The combination as set forth in claim 3, wherein the locking structure includes a recess defined on one of the first battery charger and the base and a projection provided by the other of the first battery charger and the base, the projection being engageable in the recess to lock the first battery charger to the base.

5. The combination as set forth in claim 4, wherein the projection is movable between a locking position, in which the projection engages the recess to lock the first battery charger to the base, and an unlocking position, in which the first battery charger is removable from the base, and wherein the locking structure further includes an actuator operable to move the projection from at least one of the locking position and the unlocking position to the other of the locking position and the unlocking position.

6. The combination as set forth in claim 4, wherein the locking structure further includes a biasing member biasing the projection toward the locking position.

7. The combination as set forth in claim 4, wherein the locking structure includes a second recess defined on one of the second battery charger and the base and a second projection provided by the other of the second battery charger and the base, the second projection being engageable in the second recess to lock the second battery charger to the base.

8. The combination as set forth in claim 3, wherein the locking structure includes
    a first locking assembly operable to releasably lock the first battery charger to the base, and
    a second locking assembly operable to releasably lock the second battery charger to the base.

9. The combination as set forth in claim 1, further comprising a power distribution assembly at least partially positioned within the base.

10. The combination as set forth in claim 9, further comprising an electrical cord extending from the base and operable to electrically connect the first and second charging circuits to the power source through the power distribution assembly.

11. The combination as set forth in claim 10, further comprising a pair of cleats around which the electrical cord is wrapped to support the electrical cord, wherein at least one of the cleats extends from the bar.

12. The combination as set forth in claim 9, wherein the power distribution assembly includes a plurality of power outlets.

13. The combination as set forth in claim 1, wherein the portion of the bar positioned above the first and second battery chargers includes a grip to facilitate hand carrying the combination.

14. The combination as set forth in claim 1, wherein the bar is a first bar including a first end coupled to a first portion of the base, and a second end coupled to a second portion of the base, and wherein the combination further comprises a second bar extending from the base and coupled to the first bar between the first and second ends of the first bar.

15. The combination as set forth in claim 14, wherein the second bar is fastened to the first bar.

16. The combination as set forth in claim 14, wherein each of the first and second housings lies entirely within an envelope defined by the base and at least one of the first bar and the second bar when viewing the combination from at least two different orthogonal views.

\* \* \* \* \*